(12) United States Patent
Kauffman

(10) Patent No.: US 7,752,064 B2
(45) Date of Patent: Jul. 6, 2010

(54) SYSTEM AND METHOD FOR INFRASTRUCTURE DESIGN

(75) Inventor: Stuart Kauffman, Santa Fe, NM (US)

(73) Assignee: NuTech Solutions, Inc., Charlotte, NC (US)

( * ) Notice: Subject to any disclaimer, the term of this patent is extended or adjusted under 35 U.S.C. 154(b) by 1443 days.

(21) Appl. No.: 11/087,034

(22) Filed: Mar. 22, 2005

(65) Prior Publication Data

US 2005/0197875 A1 Sep. 8, 2005

Related U.S. Application Data

(63) Continuation of application No. 09/785,411, filed on Feb. 20, 2001, now abandoned, and a continuation-in-part of application No. 09/495,756, filed on Feb. 1, 2000, now abandoned, which is a continuation-in-part of application No. PCT/US99/30640, filed on Dec. 22, 1999, and a continuation-in-part of application No. 09/345,441, filed on Jul. 1, 1999, now abandoned.

(60) Provisional application No. 60/183,148, filed on Feb. 17, 2000.

(51) Int. Cl.
*G06F 17/30* (2006.01)

(52) U.S. Cl. ......................................................... 705/7
(58) Field of Classification Search .................... 705/8, 705/7
See application file for complete search history.

(56) References Cited

U.S. PATENT DOCUMENTS

| | | | | |
|---|---|---|---|---|
| 5,016,170 | A | * | 5/1991 | Pollalis et al. ................. 705/7 |
| 5,070,453 | A | * | 12/1991 | Duffany ........................ 705/8 |
| 6,591,232 | B1 | * | 7/2003 | Kassapoglou .................. 703/2 |
| 6,658,467 | B1 | | 12/2003 | Rice et al. |
| 6,661,379 | B2 | | 12/2003 | Stilp et al. |
| 6,662,141 | B2 | | 12/2003 | Kaub |
| 6,684,250 | B2 | | 1/2004 | Anderson et al. |

OTHER PUBLICATIONS

Dale et al (Task-Technology fit and individual performance), Jun. 1995, MIS Quartely v19n2; Dialog file 15, Accession No. 01070892; pp. 213-236.*

* cited by examiner

*Primary Examiner*—Romain Jeanty
(74) *Attorney, Agent, or Firm*—Henry B. Ward, III; Moore & Van Allen, PLLC

(57) ABSTRACT

The present invention relates generally to a system and method for operations management. More specifically, the present invention determines robust processes for performing one or more tasks.

18 Claims, 28 Drawing Sheets

RESOURCE BUS (6): PROPAGATION

- C1 REQUESTS    {B C D}    450
- P1 OFFERS      {A B C D E}    452
- C1 ACCEPTS     {A B C D E}    454
- (IF E NOT REQUESTED, EVENTUALLY LOST)    456
- C1 AS P2 OFFERS    {A B C D}    458
- C2 REQUESTS    {A B C...} ETC...    460

*Fig. 4c*

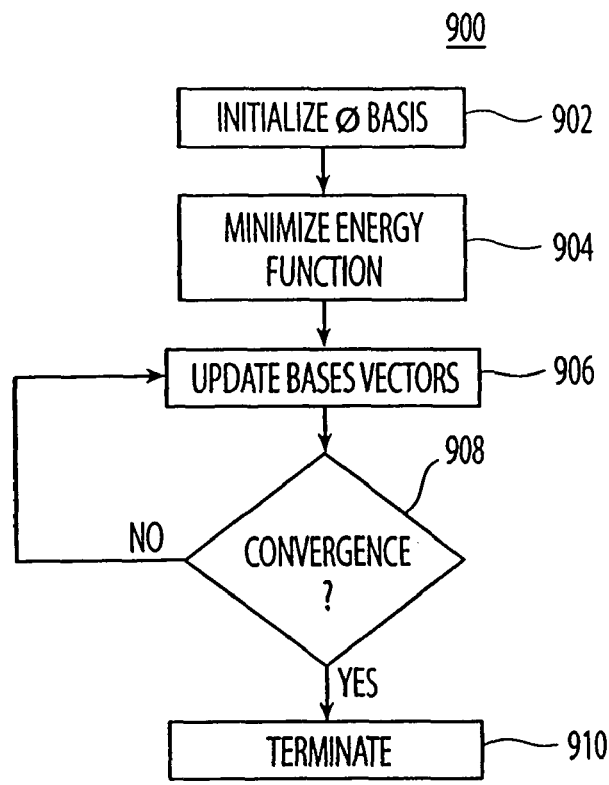
Fig. 9
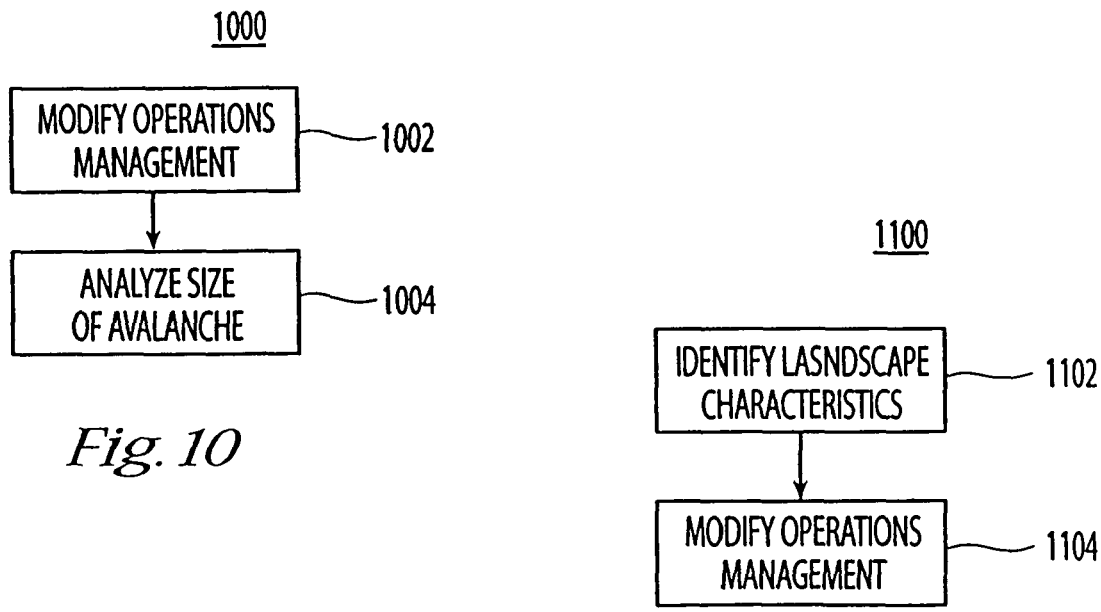
Fig. 10
Fig. 11

$$\begin{pmatrix}
\{1,\ 1,\ \{2,\ -1.\}\} \\
\{1,\ 2,\ \{1,-1.\}\} \\
\{1,\ 3\ \{5,\ -0.629195\}\} \\
\{1,\ 4,\ \{5,\ -0.749052\}\} \\
\{3,\ 5,\ \{3,\ -0.629195\},\ \{4,\ -0.749052\},\ \{24,\ -0.350841\}\} \\
\{1,\ 6,\ \{8,\ -0.3866\}\} \\
\{2,\ 7,\ \{8,\ -0.434322\},\ \{9,\ -0.514114\}\} \\
\{3,\ 8,\ \{6,\ -0.3866\},\ \{7,\ -0.434322\},\ \{9,\ -0.332176\}\} \\
\{2,\ 9,\ \{7,\ -0.514114\},\ \{8,\ -0.332176\}\} \\
\{2,\ 10,\ \{11,\ -1.\},\ \{17,\ -0.333359\}\} \\
\{2,\ 11,\ \{10,\ -1.\},\ \{15,\ -0.311709\}\} \\
\{1,\ 12,\ \{14,\ -0.889441\}\} \\
\{1,\ 13,\ \{14,\ -0.411215\}\} \\
\{2,\ 14,\ \{12,\ -0.889441\},\ \{13,\ -0.4112215\}\} \\
\{3,\ 15,\ \{11,\ -0.311709\},\ \{17,\ -0.593436\},\{18,\ -0.602979\}\} \\
\{2,\ 16,\ \{17,\ -0.503126\},\ \{18,\ -0.52658\}\} \\
\{3,\ 17,\ \{10,\ -0.333359\},\ \{15,\ -0.593436\},\ \{16,\ -0.503126\}\} \\
\{2,\ 18,\ \{15,\ -0.60979\},\ \{16,\ -0.52658\}\} \\
\{1,\ 19,\ \{20,\ -1.\}\} \\
\{1,\ 20,\ \{19,\ -1.\}\} \\
\{1,\ 21,\ \{23,\ -0.770342\}\} \\
\{1,\ 22,\ \{23,\ -0.696416\}\} \\
\{2,\ 23,\ \{21,\ -0.770342\},\ \{22,\ -0.696416\}\} \\
\{1,\ 24,\ \{5,\ -0.350841\}\} \\
\{2,\ 25,\ \{26,\ -0.491271\},\ \{27,\ -0.459285\}\} \\
\{2,\ 26,\ \{25,\ -0.491271\},\ \{27,\ -0.49478\}\} \\
\{2,\ 27,\ \{25,\ -0.459285\},\ \{26,\ -0.49478\}\} \\
\{1,\ 28,\ \{29,\ -1.\}\} \\
\{1,\ 29,\ \{28,\ -1.\}\} \\
\{1,\ 30,\ \{32,\ -0.794733\}\} \\
\{1,\ 31,\ \{32,\ -0.53383\}\} \\
\{2,\ 32,\ \{30,\ -0.794733\},\ \{31,\ -0.53383\}\}
\end{pmatrix}$$

FIG. 22

$$\begin{pmatrix}
\{3., 1\}, \{2., -1\}, \{47., -0.31\}, \{87., -0.3\} \\
\{2., 2., \{1., -1\}, \{46., -0.31\}\} \\
\{2., 3., \{5., -0.63\}, \{80., -0.34\}\} \\
\{1., 4., \{5., -0.75\}\} \\
\{3., 5., \{3., -.063\}, \{4., -0.75\}, \{24., -0.35\}\} \\
\{1., 6., \{8., -0.39\}\} \\
\{2., 7., \{8., -0.43\}, \{9., -0.51\}\} \\
\{4., 8., \{6., -0.39\}, \{7., -0.43\}, \{9., -0.33\}, \{44., -0.35\}\} \\
\{5., 9., \{7., -0.51\}, \{8., -0.33\}, \{54., -0.3\}, \{75., -0.3\}, \{98., -42\}\} \\
\{3., 10, \{11., -1\}, \{17., -0.33\}, \{39., -0.36\}\} \\
\{2., 11., \{10., -1\}, \{15., -0.31\}\} \\
\{3., 12., \{14., -0.89\}, \{62., -0.35\}, \{90., -0.3\}\} \\
\{2., 13., \{14., -0.41\}, \{61., -0.31\}\} \\
\{4., 14., \{12., -0.89\}, \{13., -0.41\}, \{82., -0.32\}, \{89., -0.35\}\} \\
\{5., 15., \{11., -0.31\}, \{17., -0.59\}, \{18., -0.6\}, \{39., -0.31\}, \{80., -0.31\} \\
\{3., 16., \{17., -0.5\}, \{18., -0.53\}, \{82., -0.32\} \\
\{4., 17., \{10., -0.33\}, \{15., -0.59\}, \{16., -0.5\}, \{36., -0.38\}\} \\
\{2., 18., \{15., -0.6\}, \{16., -0.53\}\} \\
\{2., 19., \{20., -1\}, \{42., -0.3\}\} \\
\{1., 20., \{19., -1\}\} \\
\{3., 21., \{23., -0.77\}, \{45., -0.32\}, \{94., -0.3\}\} \\
\{2., 22., \{23., -0.7\}, \{97., -0.32\}\} \\
\{2., 23., \{21., -0.77\}, \{22., -0.7\}\} \\
\{1., 24., \{5., -0.35\}\} \\
\{2., 25., \{26., -0.49\}, \{27., -0.46\}\} \\
\{2., 26., \{25., -0.49\}, \{27., -0.49\}\} \\
\{2., 27., \{25., -0.46\}, \{26., -0.49\}\} \\
\{3., 28., \{29., -1\}, \{48., -0.31\}, \{76., -0.31\}\} \\
\{2., 29., \{28., -1\}, \{77., -0.3\}\} \\
\{1., 30., \{32., -0.79\}\} \\
\{2., 31., \{32., -0.53\}, \{89., -0.31\}\} \\
\{3., 32., \{30., -0.79\}, \{31., -0.53\}, \{46., -0.31\}\} \\
\{2., 33., \{35., -0.46\}, \{39., -0.31\}\} \\
\{1., 34., \{36., -0.39\}\} \\
\{4., 36., \{17., -0.38\}, \{34., -0.39\}, \{35., -0.51\}, \{54., -0.33\}\} \\
\{1., 37., \{38., -1\}\} \\
\{1., 38., \{37., -1\}\} \\
\{4., 39., \{10., -0.36\}, \{15., -0.31\}, \{33., -0.31\}, \{41., -0.49\}\} \\
\{1., 40., \{41., -0.79\}\} \\
\{2., 41., \{39., -0.49\}, \{40., -0.79\}\} \\
\{1., 42., \{19., -0.3\}\} \\
\{3., 43., \{44., -0.43\}, \{45., -0.4\}, \{69., -0.31\}\} \\
\{3., 44., \{8., -0.35\}, \{43., -0.43\}, \{45., -0.53\}\} \\
\{3., 45., \{21., -0.32\}, \{43., -0.4\}, \{44., -0.53\}\} \\
\{3., 46., \{2., -0.31\}, \{32., -0.31\}, \{47., -1\}\} \\
\{2., 47., \{1., -0.31\}, \{46., -1\}\} \\
\{2., 48., \{28., -0.31\}, \{50., -0.74\}\} \\
\{1., 49., \{50., -0.72\}\} \\
\{2., 50., \{48., -0.74\}, \{49., -0.74\}\}
\end{pmatrix}$$

FIG. 23A $$\begin{pmatrix}
\{2., 51., \{53., \underline{-0.62}, \{54., \underline{-0.57}\}\} \\
\{0, 52.\} \\
\{2., 53., \{51., \underline{-0.62}\}, \{94., -.38\}\} \\
\{4., 54., \{9., -0.3\}, \{36., 0.33\}, \{51., \underline{0.57}\}, \{72., 0.31\}\} \\
\{1., 55., \{56., \underline{-1.}\}\} \\
\{1., 56., \{55., \underline{-1.}\}\} \\
\{2., 57., \{59., \underline{-0.61}\}, \{91., -0.47\}\} \\
\{1., 58., \{59., \underline{-0.79}\}\} \\
\{2., 59., \{57., \underline{-0.61}\}, \{58., \underline{-0.79}\}\} \\
\{1., 60., \{63., -0.45\}\} \\
\{3., 61., \{13., -0.31\}, \{62., -0.3\}, \{63., -0.36\}\} \\
\{3., 62., \{12., -0.35\}, \{61., -0.3\}, \{63., \underline{-0.61}\}\} \\
\{3., 63., \{60., -0.45\}, \{61., -0.36\}, \{62., \underline{-0.61}\}\} \\
\{1., 64., \{65., \underline{-1.}\}\} \\
\{1., 65., \{64., \underline{-1.}\}\} \\
\{1., 66., \{68., -0.39\}\} \\
\{1., 67., \{68., \underline{-0.97}\}\} \\
\{2., 68., \{66., -0.39\}, \{67., \underline{-0.97}\}\} \\
\{1., 69., \{43., -0.31\}\} \\
\{1., 70., \{72., -0.45\}\} \\
\{1., 71., \{72., \underline{-0.63}\}\} \\
\{3., 72., \{54., -0.31\}, \{70., -0.45\}, \{71., \underline{-0.63}\}\} \\
\{1., 73., \{74., \underline{-1.}\}\} \\
\{1., 74., \{73., \underline{-1.}\}\} \\
\{2., 75., \{9., -0.3\}, \{77., \underline{-0.74}\}\} \\
\{2., 76., \{28., -0.31\}, \{77., \underline{-0.71}\}\} \\
\{3., 77., \{29., -0.3\}, \{75., \underline{-0.74}\}, \{76., \underline{-0.71}\}\} \\
\{3., 78., \{80., \underline{-0.65}\}, \{81., \underline{-0.6}\}, \{99., -0.31\}\} \\
\{2., 79., \{80., \underline{-0.5}\} \{81., -0.44\}\} \\
\{4., 80., \{3., \underline{-0.34}\}, \{15., -0.31\}, \{78., \underline{-0.65}\}, \{79., -0.5\}\} \\
\{2., 81., \{78., \underline{-0.6}\}, \{79., -0.44\}\} \\
\{3., 82., \{14., -0.32\}, \{16., -0.32\}, \{83., \underline{-1.}\}\} \\
\{1., 83., \{82., \underline{-1.}\}\} \\
\{1., 84., \{86., \underline{-0.59}\}\} \\
\{1., 85., \{86., \underline{-0.85}\}\} \\
\{2., 86., \{84., \underline{-0.59}\}, \{85., \underline{-0.85}\}\} \\
\{1., 87., \{1., -0.3\}\} \\
\{0, 88.\} \\
\{3., 89., \{14., -0.35\}, \{31., -0.31\}, \{90., \underline{-0.92}\}\} \\
\{2., 90., \{12., -0.3\}, \{89., \underline{-0.92}\}\} \\
\{1., 91., \{57., -0.47\}\} \\
\{0, 92.\} \\
\{0, 93.\} \\
\{2., 94., \{21., -0.3\}, \{53., -0.38\}\} \\
\{0, 95.\} \\
\{0, 96.\} \\
\{1., 97., \{22., -0.32\}\} \\
\{1., 98., \{9., -0.42\}\} \\
\{1., 99., \{78., -0.31\}\} \\
\{0, 1.0 \times 10^2\}
\end{pmatrix}$$

FIG. 23b

DETERMINE RELATIONS 2510

CONSTRUCT GRAPH REPRESENTATION 2520

DETERMINE PATHS 2530

DETERMINE GROUP OF RESOURCES ON PATHS HAVING MINIMAL RISK 2540

SYSTEM AND METHOD FOR INFRASTRUCTURE DESIGN

CROSS-REFERENCE TO RELATED APPLICATION

This application is a continuation application of U.S. application Ser. No. 09/785,411, filed Feb. 20, 2001 now abandoned; this application is a continuation-in-part (CIP) of U.S. application Ser. No. 09/345,441, filed Jul. 1, 1999 now abandoned, U.S. application Ser. No. 09/495,756, filed Feb. 1, 2000 now abandoned, and International PCT/US99/30640, filed Dec. 22, 1999; and this application claims the benefit of Provisional Application No. 60/183,148, filed Feb. 17, 2000, the contents of which are incorporated herein in their entirety by reference.

FIELD OF THE INVENTION

The present invention relates generally to a system and method for operations management. More specifically, the present invention determines robust processes for performing one or more tasks.

BACKGROUND

An environment includes entities and resources as well as the relations among them. An exemplary environment includes an economy. An economy includes economic agents, goods, and services as well as the relations among them. Economic agents such as firms can produce goods and services in an economy. Operations management includes all aspects of the production of goods and services including supply chain management, job shop scheduling, flow shop management, the design of organization structure, etc.

Firms produce complex goods and services using a chain of activities which can generically be called a process. The activities within the process may be internal to a single firm or span many firms. A firm's supply chain management system strategically controls the supply of materials required by the processes from the supply of renewable resources through manufacture, assembly, and finally to the end customers. See generally, Operations Management, Slack et al., Pitman Publishing, London, 1995. ("Operations Management").

Other types of entities similarly perform service using processes. As a non-limiting example, military organizations perform logistics within a changing environment to achieve goals such as establishing a beachhead or taking control of a hill in a battlefield.

The activities of the process may be internal to a single firm or span many firms. For those activities which span many firms, the firm's supply chain management system must perform a variety of tasks to control the supply of materials required by the activities within the process. For example, the supply chain management system must negotiate prices, set delivery dates, specify the required quantity of the materials, specify the required quality of the material, etc.

Similarly, the activities of the process may be within one site of a firm or span many sites within a firm. For those activities which span many sites, the firm's supply chain management system must determine the number of sites, the location of the sites with respect to the spacial distribution of customers, and the assignment of activities to sites. This allocation problem is a generalization of the quadratic assignment problem ("QAP").

For the activities of the process within a site of a firm, the firm's job shop scheduling system assigns activities to machines. Specifically, in the job shop scheduling problem ("JSP"), each machine at the firm performs a set of jobs, each consisting of a certain ordered sequence of transformations from a defined set of transformations, so that there is at most one job running at any instance of time on any machine. The firm's job shop scheduling system attempts to minimize the total completion time called the makespan.

Manufacturing Resource Planning ("MRP") software systems track the number of parts in a database, monitor inventory levels, and automatically notify the firm when inventory levels run low. MRP software systems also forecast consumer demand. MRP software systems perform production floor scheduling in order to meet the forecasted consumer demand.

Firms must also design an organization structure. The structure for an organization includes a management hierarchy and a distribution of decision making authority to the people within the organization. The structure of a firm effects the propagation of information throughout the firm.

Previous research for supply chain management has studied the effects of demand on the production rate at earlier or upstream operations along the supply chain. Additional research has classified the different relationships which exist in supply chains. This research has classified supply chain relationships as: integrated hierarchy, semi-hierarchy, co-contracting, coordinated contracting, coordinated revenue links, long term trading commitments and short term trading commitments. See Operations Management, Chapter 14.

Previous research for MRP has produced algorithms to compute material volume requirements and to compute timing requirements for those materials using Gantt charts. Other MRP algorithms such as the Optimized Production (OPT) schedule production systems to the pace dictated by the most heavily loaded resources which are identified as bottle-necks. See Operations Management, Chapter 14.

Additional research has attempted to automate the exchange of goods and services among buyers and sellers. For example, U.S. Pat. No. 5,689,652 discloses a method for matching buy and sell orders of financial instruments such as equity securities, futures, derivatives, options, bonds and currencies based upon a satisfaction profile using a crossing network. The satisfaction profiles define the degree of satisfaction associated with trading a particular instrument at varying prices and quantities. The method for matching buy and sell orders inputs satisfaction profiles from buyers and sellers to a central processing location, computes a cross-product of the satisfaction profiles to produce a set of mutual satisfaction profiles, scores the mutual satisfaction profiles, and executes the trades having the highest scores.

U.S. Pat. No. 5,136,501 discloses a matching system for trading financial instruments in which bids are automatically matched against offers for given trading instruments for automatically providing matching transactions in order to complete trades using a host computer. Likewise, U.S. Pat. No. 5,727,165 presents an improved matching system for trading instruments in which the occurrence of automatically confirmed trades is dependent on receipt of match acknowledgment messages by a host computer from all counter parties to the matching trade.

However, previous research on operations management has not adequately accounted for the effect of failures or changes in the economic environment on the operation of the firm. For example, machines and sites could fail or supplies of material could be delayed or interrupted. Accordingly, the firm's supply chain management, job shop scheduling and organization structure must be robust and reliable to account for the effect of failures on the operation of the firm.

Similarly, the economic environment changes with the introduction of new goods and services, new production technologies, new legislation and the extinction of older goods and services. Similarly, changes in the supply and demand for materials also effects the economic environment. For example, the contingent value to buyer and seller of goods or services, the cost of producing the next kilowatt of power for a power generating plant, and the value of the next kilowatt of power to a purchaser effect the economic environment. Accordingly, the firm's supply chain management, job shop scheduling and organization structure must be flexible and adaptive to account for the effect of changes to the firm's economic environment.

Moreover, previous research for automating the exchange of financial instruments have disadvantages. Most important, these methods have a limited application as they do not apply to the general exchange of goods and services among economic agents. Instead, they are focused towards financial transactions. Next, the trades for each of these systems must be processed at a central computing location. Next, these systems do not have real-time support for trader preferences which vary with time.

Accordingly, there exists a need for a system and method to determine reliable and adaptive processes for performing one or more tasks.

SUMMARY OF THE INVENTION

The present invention presents a system and method to determine reliable and adaptive processes for performing one or more tasks. The present invention presents a framework of features which include technology graphs and risk management to achieve its reliability and adaptability.

It is an aspect of the present invention to present a method for designing an infrastructure to perform one or more tasks in an environment of resources comprising the steps of:

determining one or more relations among the resources;

constructing a graph representation of said relations and the resources;

determining one or more paths through said graph representation wherein each of said paths represents a process for performing at least one of the tasks; and determining at least one group of those of said resources that lie along said one or more paths, said at least one group having a minimal risk.

It is a further aspect of the invention to present a method for designing an infrastructure wherein said determining at least one group having a minimal risk step comprises the steps of:

determining a plurality of anti-correlated families wherein each of said anti-correlated families contains two or more of said resources lying along said one or more paths that are anti-correlated; and determining one or more perspective groups of said resources from said plurality of anti-correlated families.

BRIEF DESCRIPTION OF THE DRAWINGS

FIG. 4c provides one example of a resource with affordances propagating through a resource bus object.

FIG. 9 displays a flow diagram of an algorithm to determine the bases $v_i$ for landscapes.

FIG. 10 shows the flow diagram of an overview of a first technique to identify a firm's regime.

FIG. 11 shows the flow diagram of an algorithm 1100 to move a firm's fitness landscape to a favorable category by adjusting the constraints on the firm's operations management.

FIGS. 22, 23a and 23b display families of anti-correlated stocks that were generated by a method to create a portfolio of a plurality of assets with minimal risk.

FIG. 25 shows a flow diagram of an exemplary method 2500 that uses the determination of redundant pathways in a technology graph with techniques for operation risk management to design an infrastructure that is reliable and adaptive.

DETAILED DESCRIPTION OF THE PREFERRED EMBODIMENT

Figure 1:
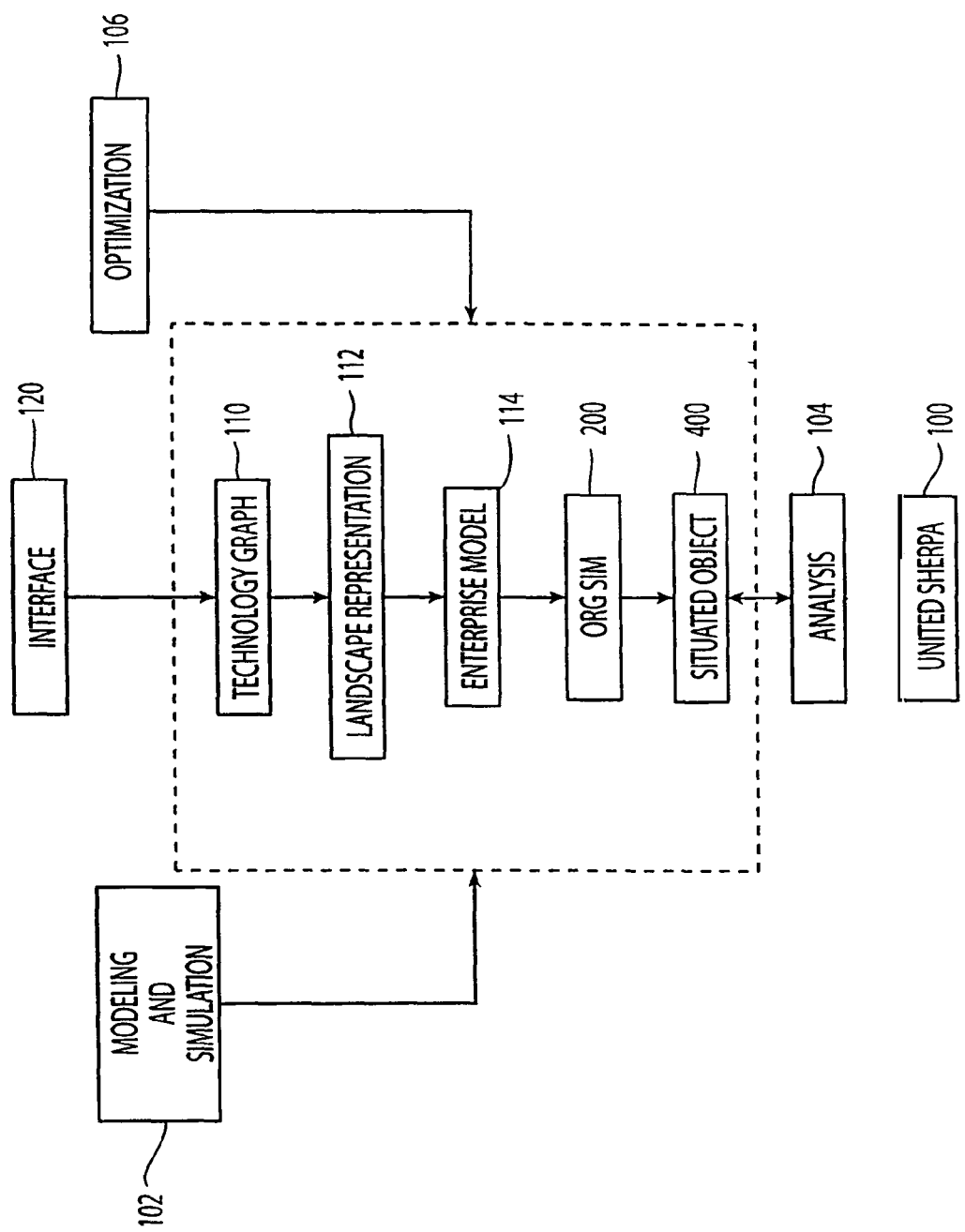
FIG. 1 provides a diagram showing a framework for the major components of the system and method for operations management.

FIG. 1 provides a diagram showing a framework for the major components of the system and method for operations management called United Sherpa 100. The major components of United Sherpa 100 include modeling and simulation 102, analysis 104, and optimization 106. United Sherpa 100 further includes an interface 120. The major components of United Sherpa 100 operate together to perform various aspects of operations management including the production of goods and services including supply chain management, job shop scheduling, flow shop management, the design of organization structure, the identification of new goods and services, the evaluation of goods and services, etc. To accomplish these tasks, the components of United Sherpa 100 create and operate on different data representations including technology graphs 110, landscape representations 112 and the enterprise model 114. An Enterprise model 114 is a model of entities acting within an environment of resources and other entities.

Without limitation, many of the following embodiments of the invention, United Sherpa 100, are described in the illustrative context of the production of goods and services by economic entities acting within an economic environment. However, it will be apparent to persons of ordinary skill in the art that the aspects of the embodiments of the invention are also applicable in any context involving the operation of an entity within an environment of resources and other entities such as the performance of logistics by military organizations acting within a changing battlefield or the evaluation and exchange of financial instruments. These aspects which are applicable in a wide range of contexts include modeling and simulation, analysis, and optimization using technology graphs, landscape representations and automated markets to perform operations management having the reliability and adaptability to handle failures and changes respectively within the economic environment.

Modeling and Simulation

Figure 2:
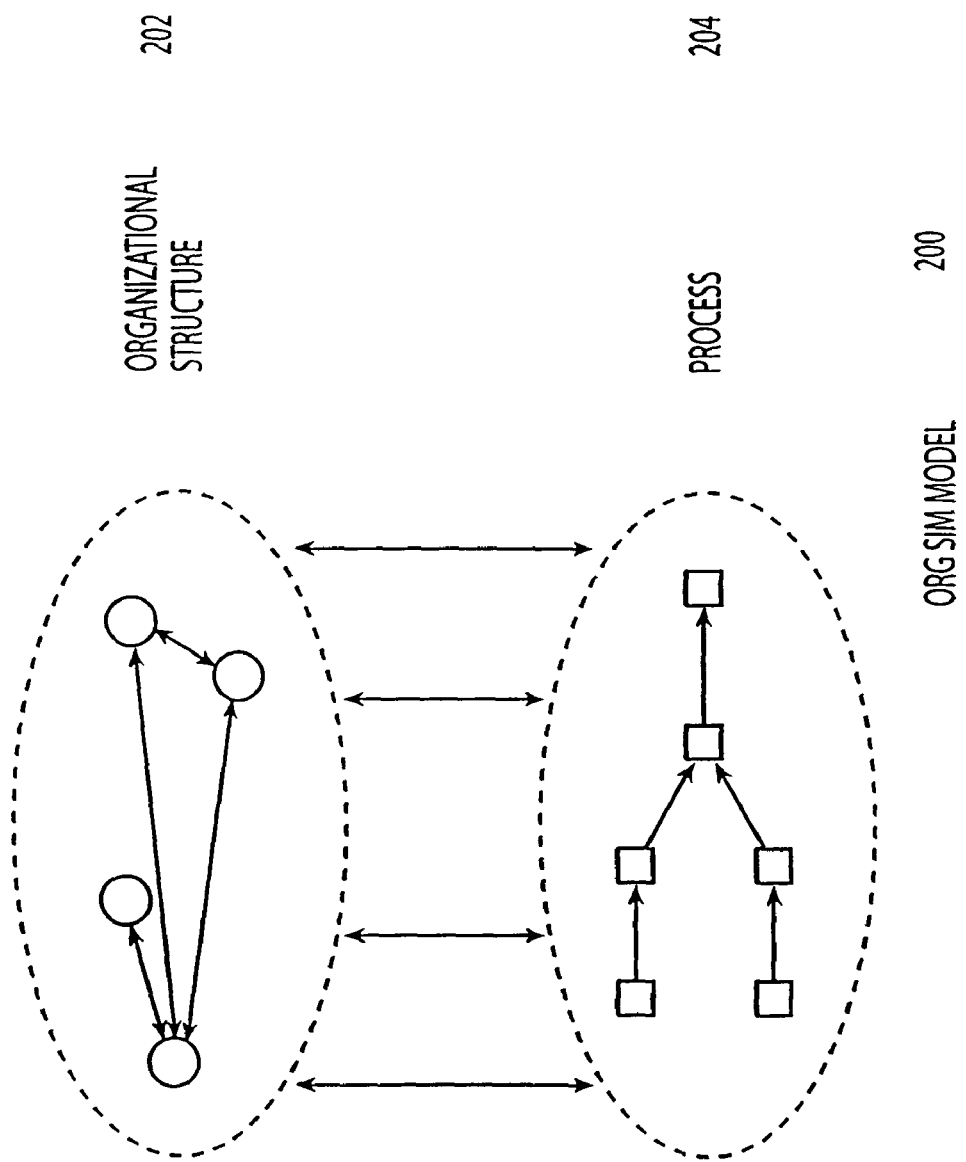
FIG. 2 displays a diagram showing a composite model of a firm's processes and organizational structure including the relation between the firm's processes and organizational structure.

The modeling component 102 of United Sherpa 100 creates the enterprise model 114. An aspect of the modeling component 102 called OrgSim creates organizational structure model 202 and a process model 204 for a firm as shown by an exemplary OrgSim model in FIG. 2. OrgSim represents each decision making unit of a firm with an object.

Without limitation, the following embodiments of the invention, United Sherpa 100, are described in the illustrative context of a solution using object oriented design and graph theory. However, it will be apparent to persons of ordinary skill in the art that other design techniques such as a structured procedural paradigm or an agent-based design could be used to embody the aspects of the present invention which include modeling and simulation, analysis, and optimization using technology graphs, landscape representations and automated markets to perform operations management having the reliability and adaptability to handle failures and changes respectively within the economic environment. Agent-based design is described in, *Go to the ant: Engineering Principles from Natural Multi-Agent Systems*, H. Van Dyke Parunak, Annals of Operations research 75(1997) 69-101, the contents of which are herein incorporated by reference.

As is known to persons of ordinary skill in the art, objects are distinguishable entities and have attributes and behavior. See Object Oriented Modeling and Design, Rumbaugh, J., Prentice hall, Inc. (1991), Chapter 1. Further, objects having the same attributes and behavior are grouped into a class. In other words, objects are instances of classes. Each class represents a type of decision making unit. The representation of real world entities with objects is described in co-pending U.S. patent application Ser. No. 09/080,040, System and Method for the Synthesis of an Economic Web and the Identification of New Market Niches, the contents of which are herein incorporated by reference.

Decision making units in the organizational structure model 202 represent entities ranging from a single person to a department or division of a firm. In other words, the organizational structure model includes an aggregation hierarchy. As is known in the art, aggregation is a "part-whole" relationship among classes based on a hierarchical relationship in which classes representing components are associated with a class representing an entire assembly. See *Object Oriented Modeling and Design*, Chapter 3. The aggregation hierarchy of the organizational structure comprise assembly classes and component classes. An aggregation relationship relates an assembly class to one component class. Accordingly, an assembly class having many component classes has many aggregation relationships.

Figure 3:
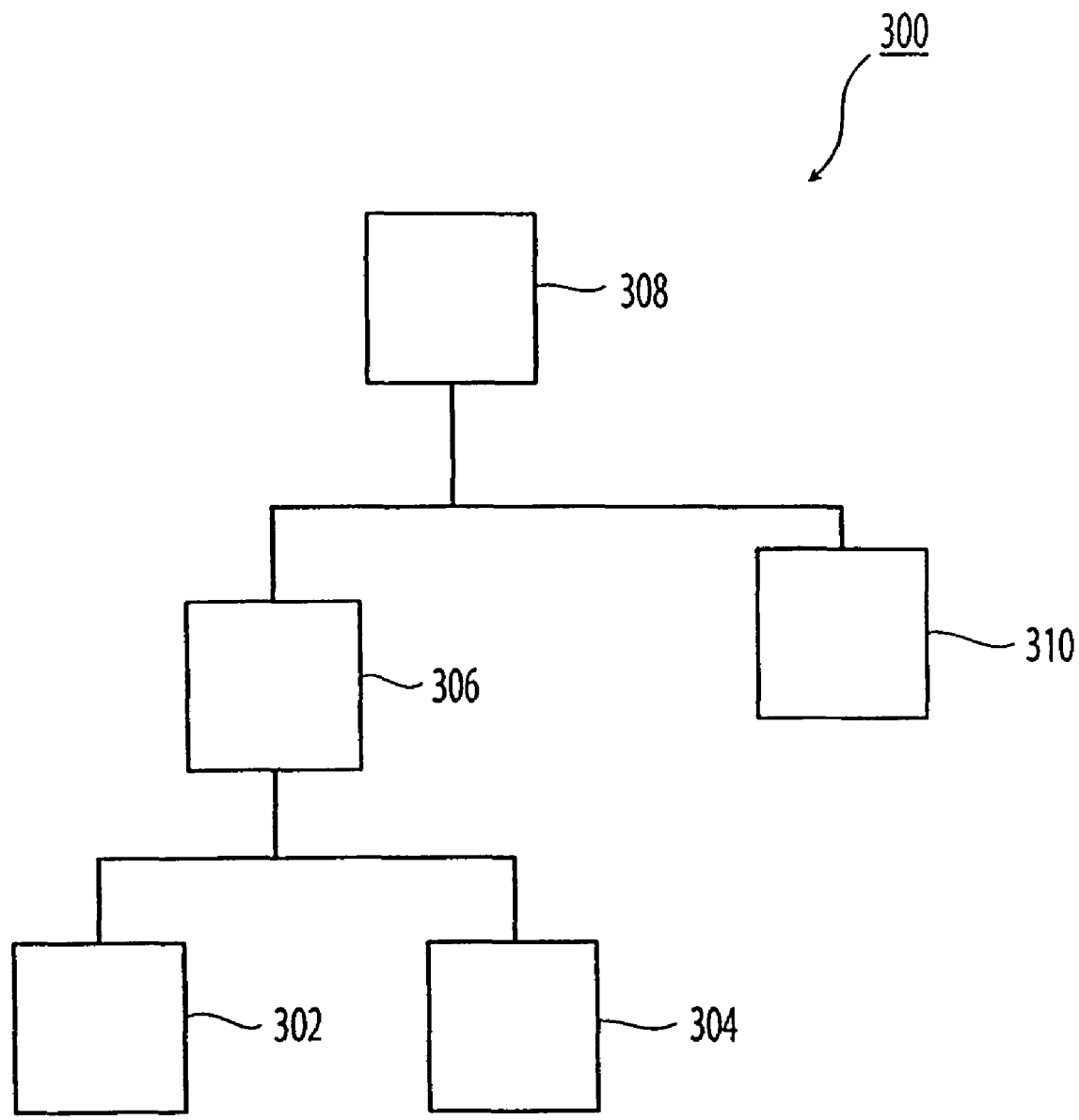
FIG. 3 shows an exemplary aggregation hierarchy 300 comprising assembly classes and component classes.

FIG. 3 shows an exemplary aggregation hierarchy 300 comprising assembly classes and component classes. The engineering department 302 is an assembly class of the engineer component class 304 and the manager component class 306. Similarly, the division class 308 is an assembly class of the engineering department component class 302 and the legal department component class 310. Accordingly, this aggregation hierarchy 300 represents a "part-whole" relationship between the various components of a firm.

Moreover, OrgSim can model decision making units at varying degrees of abstraction. For example, OrgSim can represent decision making units as detailed as an individual employee with a particular amount of industrial and educational experience or as abstract as a standard operating procedure. Using this abstract modeling ability, OrgSim can represent a wide range of organizations. Next, OrgSim 102 can also represent the flow of information among the objects in the model representing decision making units. First, OrgSim 102 can represent the structure of the communication network among the decision making units. Second, OrgSim 102 can model the temporal aspect of the information flow among the decision making units. For instance, OrgSim 102 can represent the propagation of information from one decision making unit to another in the firm as instantaneous communication. In contrast, OrgSim 102 can also represent the propagation of information from one decision making unit to another in the firm as communication requiring a finite amount of time.

These modeling aspects enable OrgSim 102 to simulate the effects of organizational structure and delay on the performance of a firm. For example, OrgSim 102 can compare the performance of an organization having a deep, hierarchical structure to the performance of an organization having a flat structure. OrgSim 102 also determines different factors which effect the quality and efficiency of decision making within an organization such as line of sight, authority, timeliness, information contagion, and capacity constraints. Line of sight determines the effects of a proposed decision throughout an organization in both the downstream and upstream directions. Authority determines whether a decision making unit such as an engineer should make a decision or should forward the responsibility to make a decision to a superior. Timeliness determines the effect of a delay which results when a decision making unit forwards the responsibility to make a decision to a superior instead of immediately making the decision and acting on the decision. Information contagion measures the effect on the quality of decision making when the responsibility for making a decision moves in the organization from the unit which will feel the result of the decision. Capacity constraints measures the effect on delay when the responsibility for making a decision moves toward an overworked decision making unit of the organization.

Through simulation, OrgSim 102 determines the effect of these conflicting factors on the quality of decision making of an organization. For example, OrgSim 102 can determine the effect of the experience level of an economic agent on the decision making of an organization. Further, OrgSim 102 can determine the effect of granting more decision making authority to the units in the lower levels of an organization's hierarchy. Granting decision making authority in this fashion may improve the quality of decision making in an organization because it will decrease the amount of information contagion. Granting decision making authority in this fashion may also avoid the detrimental effects of capacity constraints if the units in the top levels of the organization are overworked. However, granting decision making authority in this fashion may decrease the quality of decision making because units in the lower levels of an organization's hierarchy have less line of sight than units at the higher levels.

OrgSim represents each good, service and economic entity associated with a firm's processes with an object in the process model 204. Renewable resources, intermediate goods and services, finished goods and services, and machines are types of goods and services in the economy. Machines are goods or services which perform sequences of transformations on an input bundle of goods and services to produce an output bundle of goods and services. Accordingly, intermediate goods and services are produced when machines execute their transformations on an input bundle of goods and services. Finished goods and services are the end products which are produced for the consumer.

OrgSim includes an interface to enable a user to define the decision making units, the structure of the communication network among the decision making units, the temporal aspect of the information flow among the decision making units, etc. Preferably, the user interface is a graphical user interface.

Preferably, OrgSim provides support for multiple users, interactive modeling of organizational structure and processes, human representation of decision making units and key activities within a process. Specifically, people, instead of programmed objects, can act as decision making units. Support for these additional features conveys at least two important advantages. First, the OrgSim model 200 will yield more accurate results as people enter the simulation to make the modeling more realistic. Second, the OrgSim model 200 further enables hypothetical or what if analysis. Specifically, users could obtain simulation results for various hypothetical or what if organizational structure to detect unforeseen effects such as political influences among the decision making units which a purely computer-based simulation would miss.

Preferably, OrgSim also includes an interface to existing project management models such as Primavera and Microsoft Project and to existing process models such as iThink.

Without limitation, the following embodiments of the Enterprise model 114 are described in the illustrative context of a solution using situated object webs. However, it will be apparent to persons of ordinary skill in the art that other design techniques could be used to embody the aspects of the Enterprise model 114 which include determining relations among the resources in the economy, determining values for the relations, selecting relations having higher values and performing transformations corresponding to the relations to produce new resources in the economy.

Figure 4A:
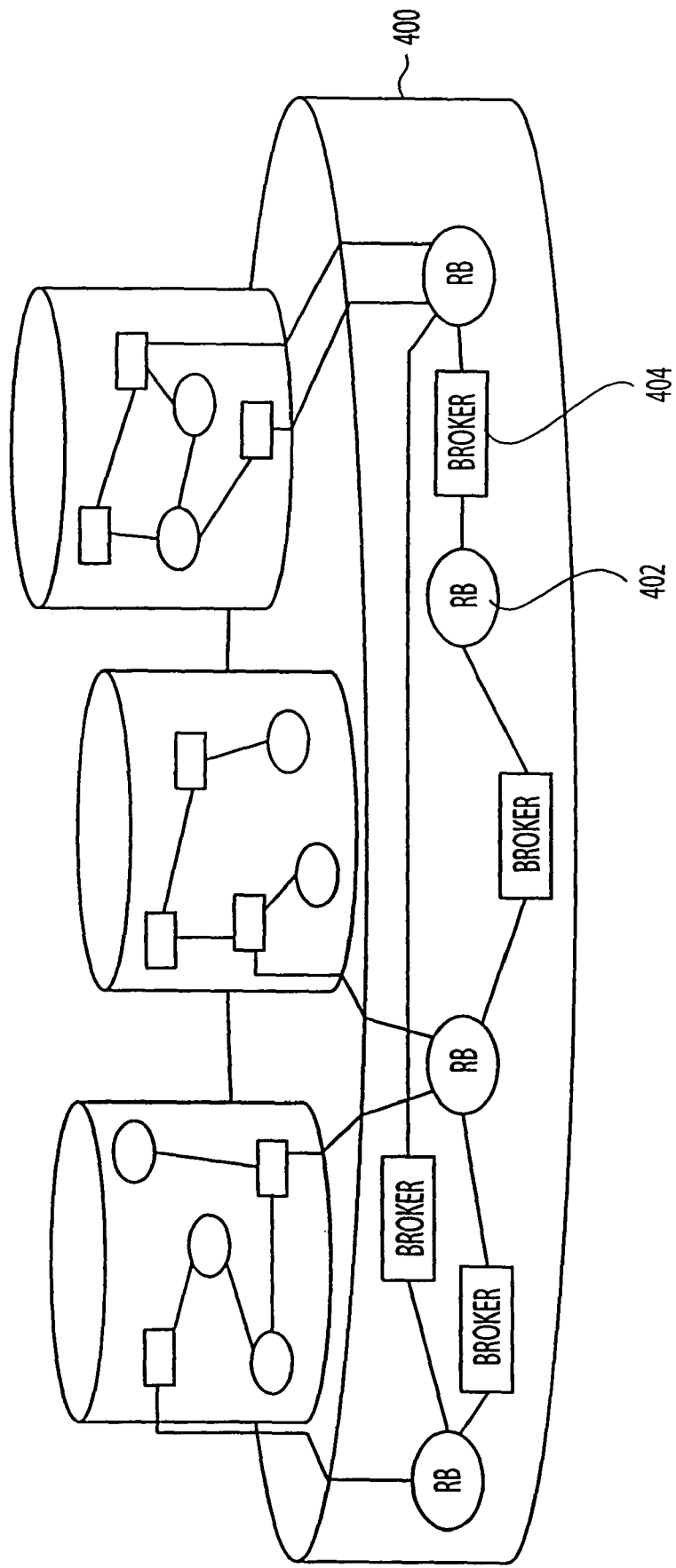
FIG. 4a displays a diagram showing the enterprise model.

The Enterprise model 114 further includes situated object webs 400 as shown in FIG. 4a. Situated object webs 400 represent overlapping networks of resource dependencies as resources progress through dynamic supply chains. Situated object webs 400 include a resource bus 402. A resource bus 402 is a producer/consumer network of local markets. Preferably, broker agents 404 mediate among the local markets of the resource bus 402.

Figure 4B:
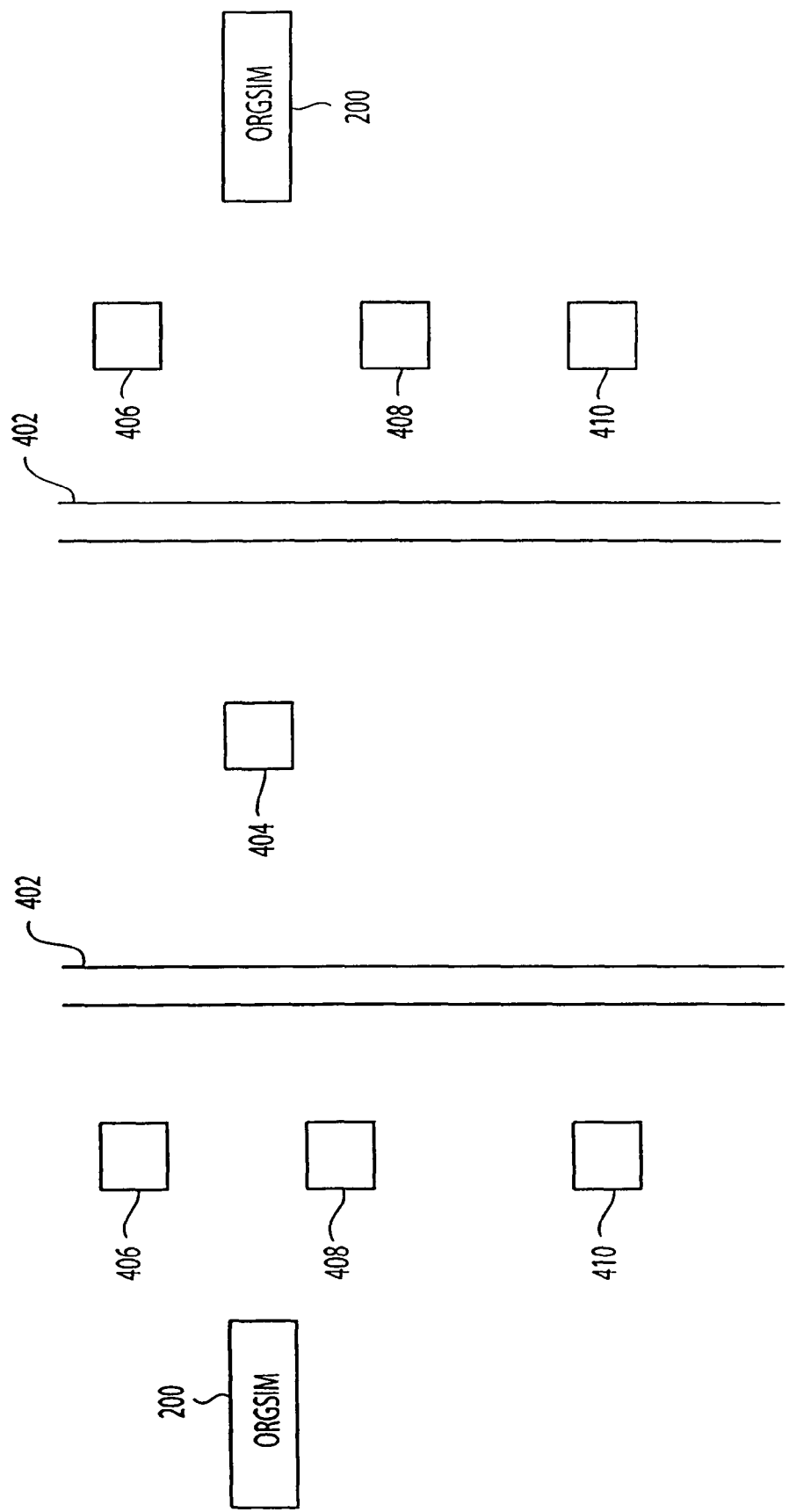
FIG. 4b displays a diagram of the network explorer model.

FIG. 4b shows a detailed illustration of the architecture of the situated object web 400 and the OrgSim model 200. The situated object web 400 includes a RBConsumer object 406. The RBConsumer object 406 posts a resource request to one of the ResourceBus objects 402. The RBConsumer object 406 has a role portion defining the desired roles of the requested resource. Preferably, the RBConsumer object 406 also has a contract portion defining the desired contractual terms for the requested resource. Exemplary contract terms include quantity and delivery constraints. An OrgSim model 200 offers a resource by instantiating an RBProducer object 408. A RBProducer object 408 offers a resource to one of the ResourceBus objects 402. The RBProducer object 408 has a role portion defining the roles of the offered resource. Preferably, the RBProducer object 408 also has a contract portion defining the desired contractual terms for the requested resource.

The ParticipantSupport 310 objects control one or more RBConsumer 302 and RBProducer 308 objects. A ParticipantSupport 310 object can be a member of any number of ResourceBus 304 objects. ParticipantSupport 310 objects join or leave ResourceBus 304 objects. Moreover, ParticipantSupport 310 objects can add RBProducer 308 objects and RBConsumer 302 object to any ResourceBus 304 objects of which it is a member.

Preferably, affordance sets model the roles of resources and the contractual terms. An affordance is an enabler of an activity for a suitably equipped entity in a suitable context. A suitably equipped entity is an economic agent which requests a resource, adds value to the resource, and offers the resulting product into a supply chain. A suitable context is the "inner complements" of other affordances which comprise the resource. Affordances participate in other affordances. Further, an affordance can contain sets of other affordances which are specializations of the affordance. Preferably, the situated object web 400 represents affordances with symbols sets. The symbols set representation scheme is advantageous because it is not position dependent.

Affordances have associated values. For example, a value of an affordance specified by an RBConsumer object 406 for a requested resource for an OrgSim model 200 represents the amount of importance of the affordance to the OrgSim model 200. In other words, the RBConsumer objects 406 specify the amount of importance the affordances or roles of a requested resource to the requesting OrgSim model 400.

The ResourceBus 402 objects relay requested resources and offered resources between RBConsumer objects 406 and RBProducer objects 408. The ResourceBus 402 identifies compatible pairs of requested resources with the offered resources by matching the desired affordances of the requested resource with the affordances of the offered resources. Preferably, the ResourceBus 402 also considers the importance of the affordances when matching the affordances of the requested resources with affordances of the offered resource. The ResourceBus 402 performs a fuzzy equivalency operation to determine the goodness of a match between a requested resource and an offered resource. The goodness of match between a requested resource and an offered resource is determined by performing a summation over the set of roles or affordances wherein the summation is weighted by the importance associated with the affordances and roles. Preferably, the values of the affordances are normalized to the interval [0,1]. Preferably, the goodness of a match is also normalized to the interval [0,1]. Higher values for the goodness of a match indicate more precise matches. Next, more precise matches enhance the economic value of the exchange. A subsequent section titled "Automated Markets", contains additional techniques for finding optimal matches between requested resources and offered resources.

Preferably, the ResourceBus 402 uses an exemplar-prototype copy mechanism to satisfy resource requests with available resources. The ResourceBus 402 provides a copy of an exemplar resource object to a RBConsumer object 406 requesting a resource. The ResourceBus 402 locates the exemplar resource object in accordance with the importance assigned to the affordances by the RBConsumer object 406. Accordingly, the exemplar prototype copy mechanism adds diversity to the resources in the situated web model 400. The copy of the exemplar resource used by the resource bus 402 adds diversity to the resources propagating through the situated object web 400.

For example, if a consumer object requests a complementary object representing a #10, Phillips head, finishing screw, the situated object model returns an object which could be brass plated and self-tapping with a pan-shaped head. Thus, as long as a subset of the attributes match the requested attributes, the remaining attributes of the object can have arbitrary values. Thus, the objects produced by this scheme have copy errors. The introduction of copy errors leads to diversity in goods and services.

The situated object web 400 further includes BrokerAgent objects 404. BrokerAgent objects 404 mediate between ResourceBus 304 objects. BrokerAgent 306 objects will relay resource requests and availabilities between ResourceBus 304 objects if those requests and availabilities cannot be satisfied on the originating ResourceBus 304 object. A BrokerAgent object 404 monitors traffic in at least two ResourceBus objects 402 for orphan resources. Orphan resources are defined as surplus resources offered by RBProducer objects 408 and unmet resource requests from RBConsumer objects 406. Preferably, BrokerAgent objects 404 add transaction costs to matched pairs of requested resources and offered resources. A BrokerAgent object 404 competes among other BrokerAgent objects 404 to provide service to RBConsumer objects 406 and RBProducer objects 408.

As RBProducer objects 408 fulfill resource requests from RBConsumer objects 406 on the ResourceBus 402, resources and their affordances propagate through the situated web model 400. Further, the values of affordances and the values of the resources containing the affordances change as resources propagate through the situated web model 400. The value of an affordance increases as it is requested by more RBConsumer objects 406. Conversely, the value of an affordance decreases if it is not requested by a RBConsumer objet 406. Affordances which are not requested for a sufficiently long time are removed from a resource.

FIG. 4c provides an example of a resource with affordances propagating through a resource bus object 402. In time step 450, a RBConsumer object 406, C1 requests a set of affordances, {B, C, D}. In time step 452, an RBProducer object 408, P1, offers a resource with a set of affordances, {A, B, C, D, E}. In time step 454, RBConsumer object C1 is paired with RBProducer object P1 on a ResourceBus object 402. In other words, RBConsumer object C1 accepts the offered resource with affordances {A, B, C, D, E}. In step 456, affordance E is lost from the set of affordances {A, B, C, D, E} because affordance E was not requested for a predetermined time period and accordingly, was eventually lost. In step 458, C1, acting as a RBProducer object 408, P2 offers the resource with the set of affordances, {A, B, C, D}. In step 460, another RBConsumer object 406, C2 requests a set of affordances, {A, B, C} which creates a possible match with the resource offered by P2 and causes the resource to continue to propagate through a resource bus 402.

Execution of the situated object web 400 as described immediately above creates a model of a firm's processes called a technology graph 110. The next section provides a detailed description of the technology graph 110.

United Sherpa 100 also includes an interface to existing Manufacturing Resource Planning ("MRP") software systems. MRP systems track the number of parts in a database, monitor inventory levels, and automatically notify the firm when inventory levels run low. The MRP software systems also forecast consumer demand. MRP software systems perform production floor scheduling in order to meet the forecasted consumer demand. Exemplary MRP software systems are available from Manugistics, I2 and SAP.

However, the object oriented approach of the present invention has advantages over MRP or other conventional business modeling tools because the object oriented approach provides a more direct representation of the goods, services, and economic agents which are involved in a firm's processes. Conventional business tools typically build numerical models which describe business operations exclusively in terms of numerical quantities. For example, conventional business tools have numerical models representing how the inventory of material resources vary with time. In contrast, the modeling component 102 of the present invention represents each good, service, and economic agent with an object.

In contrast to numerical models, the object oriented approach of the present invention is also amenable to what if analysis. For example, the modeling component 102 of the present invention can represent the percolating effects of a major snow storm on a particular distribution center by limiting the transportation capacity of the object representing the distribution center. Execution of the simulation aspect of OrgSim 102 on the object model with the modified distribution center object yields greater appreciation of the systematic effects of the interactions among the objects which are involved in a process.

As indicated by the previous discussion of FIGS. 2-4c, the modeling and simulation component 102 of United Sherpa 100 provides a mechanism to situate a dynamically changing world of domain objects by explicitly supporting their emergence. The modeling and simulation component 102 develops metrics to show the emergence and propagation of value for entire resources and affordances of the resource. The modeling and simulation component 102 of United Sherpa 100 represents the resources and economic entities of an economy as situated objects because they depend on the contingencies of other resources and economic entities in the economy which produce them. The situated object web 400 constitutes an adaptive supply chain that changes connectivity as the demand for different situated objects change.

OrgSim 102 also includes an interface to existing models of a firm's processes such as iThink or existing project management models such as Primavera and Microsoft Project.

Technology Graph

Figure 5:
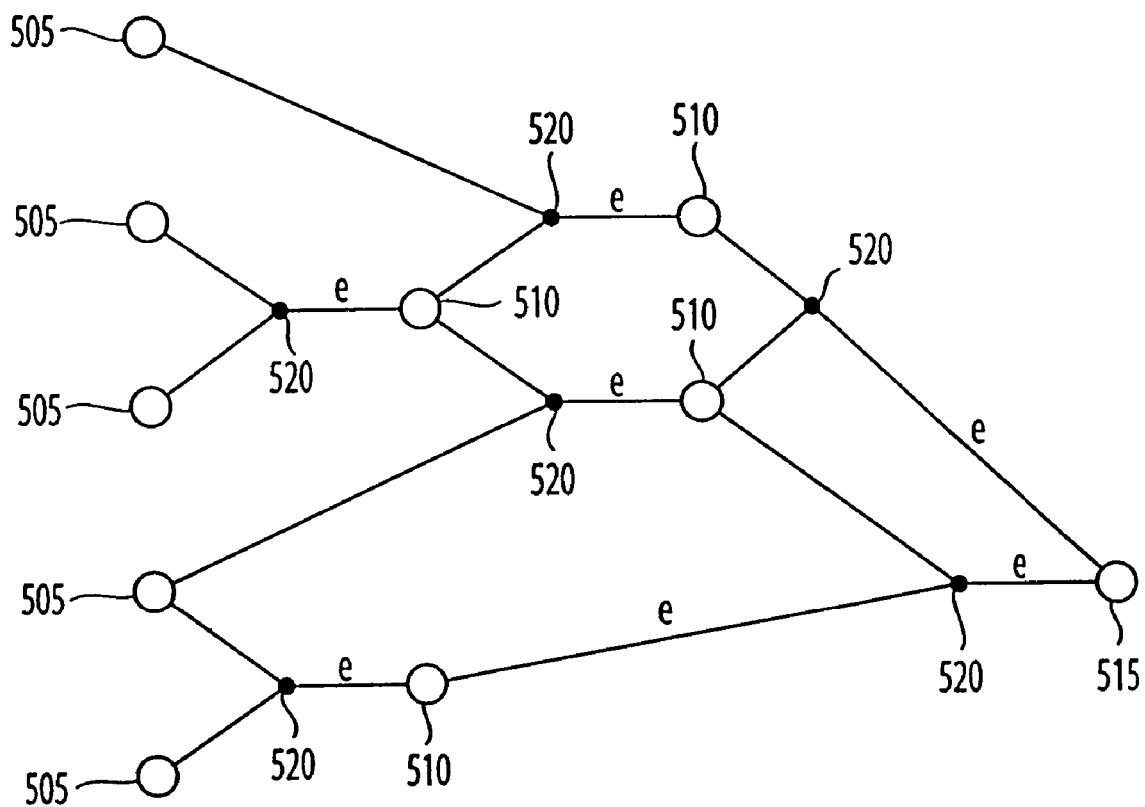
FIG. 5 shows an exemplary technology graph.

FIG. 5 shows an exemplary technology graph. A technology graph is a model of a firm's processes. More specifically, a technology graph is a multigraph representation of a firm's processes. As previously explained, a firm's processes produce complex goods and services. As is known to persons of ordinary skill in the art, a multigraph is a pair (V,E) where V is a set of vertices, E is a set of hyperedges, and E is a subset of P(V), the power set of V. See *Graph Theory*, Bela Bollobas, Springer-Verlag, New York, 1979, ("*Graph Theory*") Chapter 1. The power set of V is the set of subsets of V. See *Introduction to Discrete Structures*, Preparata and Yeh, Addison-Wesley Publishing Company, Inc. (1973) ("*Introduction to Discrete Structures*"), pg 216.

In the technology graph (V,E) of a firm's processes, each vertex v of the set of vertices V represents an object. More formally, there exists a one-to-one correspondence between the set of objects representing the goods, services, and economic agents and the set of vertices V in the technology graph (V,E) of the firm's processes. A function denoted by g: O→V from the set of objects O representing the goods, services, and economic agents to the set of vertices V in the corresponding multigraph (V,E) assigns the vertex v to an object o (g(o)=v).

In the technology graph (V,E) of a firm's processes, each hyperedge e of the set of hyperedges E represents a transformation as shown by FIG. 5. The outputs of the hyperedge e are defined as the intermediate goods and services 510 or the finished goods and services 515 produced by execution of the transformation represented by the hyperedge e. The outputs of the hyperedge e also include the waste products of the transformation. The inputs of the hyperedge e represent the complementary objects used in the production of the outputs of the hyperedge. Complementary objects are goods or services which are used jointly to produce other goods or services.

Resources 505, intermediate goods and services 510, finished goods and services 515, and machines 520 are types of goods and services in the economy. Machines 520 are goods or services which perform ordered sequences of transformations on an input bundle of goods and services to produce an output bundle of goods and services. Accordingly, intermediate goods and services 510 are produced when machines 520 execute their transformations on an input bundle of goods and services. A machine 520 which mediates transformations is represented in the technology graph H=(V, E) as an input to a hyperedge e. In an alternate embodiment, a machine 520 which mediates transformations is represented as an object which acts on the hyperedge e to execute the transformation. Finished goods and services 515 are the end products which are produced for the consumer.

The objects and transformations among the objects in the technology graph H=(V, E) constitute a generative grammar. As is known by persons of ordinary skill in the art, context-free grammars represent transformations or productions on symbol strings. Each production specifies a substitute symbol string for a given symbol string. The technology graph H=(V, E) extends the principles of context-free grammars from symbol strings and transformations among symbol strings to objects and transformations among objects. The expressiveness of the technology graph H=(V, E) is higher than that of context-free grammars as hypergraphs can represent multidimensional relationships directly. The technology graph H=(V, E) also expresses a context sensitive grammar.

Each transformation in the technology graph H=(V, E) may specify a substitute hypergraph for a given hypergraph. Accordingly if a subgraph within a hypergraph matches a given hypergraph in a transformation, the subgraph is removed and replace by the substitute hypergraph. The resulting hypergraph is derived from the original hypergraph.

Figure 6:
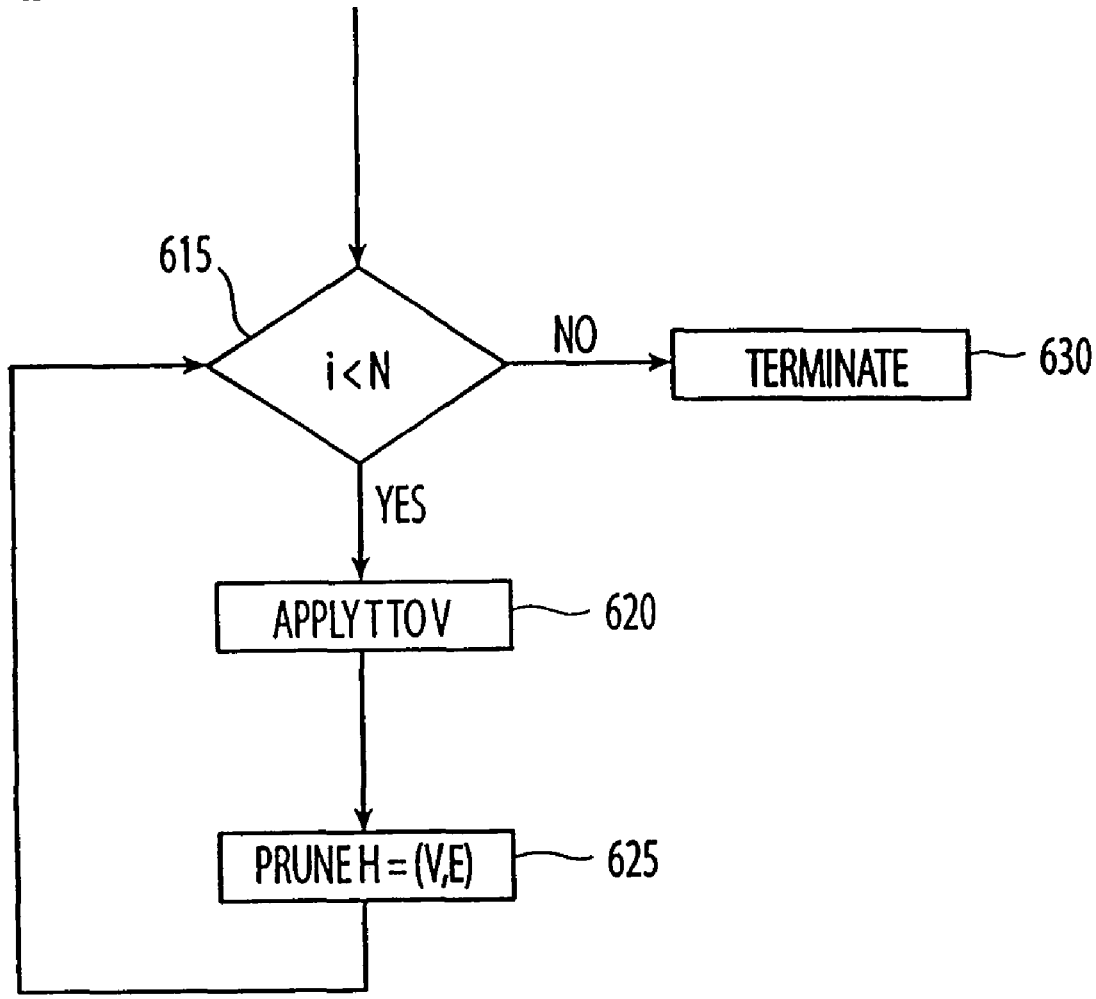
FIG. 6 provides a dataflow diagram 600 representing an overview of a method for synthesizing the technology graph.

FIG. 6 provides a dataflow diagram 600 representing an overview of a method for synthesizing the technology graph. As is known to persons of ordinary skill in the art, a dataflow diagram is a graph whose nodes are processes and whose arcs are dataflows. See *Object Oriented Modeling and Design*, Rumbaugh, J., Prentice Hall, Inc. (1991), Chapter 1.

In step 610, the technology graph synthesis method performs the initialization step. The technology graph synthesis method initializes the set of vertices V of the technology graph H=(V, E) to a founder set of objects. The founder set contains the most primitive objects. Thus, the founder set could represent renewable resources. The founder set can have from zero to a finite number of objects. The method also initializes a set of transformations, T, with a finite number of predetermined transformations in step 610. Finally, the method initializes an iterate identifier, i, to 0 in step 610.

In step 615, the method determines whether the iterate identifier is less than a maximum iterate value, I. If the iterate identifier is not less than the maximum iterate value, I, the method terminates at step 630. If the iterate identifier is less than the maximum iterate value, I, then control proceeds to step 620.

In step 620, the technology graph synthesis method applies the set of transformations, T, to the set of vertices V. In the first iteration of the loop of the flow diagram of FIG. 6, step 620 applies the set of transformations, T, to the objects in the founder set. First, step 620 applies each transformation in the set of transformations, T, to each object in the founder set. Next, step 620 applies each transformation in the set of transformations, T, to all pairs of objects in the founder set. Step 620 similarly continues by applying each transformation in the set of transformations, T, to each higher order subset of objects in the founder set. Execution of step 620 in iteration, i yields the i th technology adjacent possible set of objects. Execution of step 620 in iteration, i, also yields a modified technology graph H=(V, E). The modified technology graph H=(V, E) contains additional vertices corresponding to the i th technology adjacent possible set of objects and additional hyperedges e corresponding to the transformations applied in the i th iteration of the loop of the flow graph of FIG. 6.

In one embodiment, the method maintains all vertices created by execution of step 620 in the technology graph H=(V, E). In an alternate embodiment, step 625 prunes all vertices representing duplicate elements of the ith technology adjacent possible set of objects from the technology graph H=(V, E). Accordingly, in the first embodiment of step 625, every object constructed at each iteration of the method is kept in the technology graph H=(V, E). Execution of the technology graph synthesis method 600 using the first embodiment of step 625 produces a full technology graph H=(V, E). In the alternate embodiment, only objects which were not elements in the founder set and which were not created in previous iterations of the loop of the flow diagram of FIG. 6 are added to the technology graph H=(V, E). Execution of the technology graph synthesis method 600 using the alternate embodiment with the pruning of step 625 produces a minimal technology graph H=(V, E). After execution of step 625, control returns to step 615.

In subsequent iterations of the loop of the flow graph of FIG. 6, step 620 applies the set of transformations, T, to the objects in the set of vertices V of the technology graph H=(V, E) produced by the execution of the previous iteration of the loop.

The set of transformations T can be held fixed throughout the execution of the technology graph synthesis method 600. Alternatively, new transformations could be added to the set of transformations and old transformations could be removed. For example, objects representing machines could also be included in the founder set of objects. Next, the set of transformations T could be applied to the objects representing machines just as they are applied to the other objects in the technology graph H=(V, E). Consequently, the set of transformations T could be limited to the transformations which are mediated by those machine objects represented by vertices of the technology graph H=(V, E).

Technology Graph Applications

The paths in the technology graph H=(V, E) which begin at vertices corresponding to objects in the founder set and end at vertices corresponding to finished goods represent the processes for producing the finished goods from the objects in the founder set. A path $P_i$ of a hypergraph H=(V, E) is defined as an alternating sequence of vertices and edges $v_{i1}$, $e_{i1}$, $v_{i2}$, $e_{i2}$, $v_{i3}$, $e_{i3}$, $v_{i4}$, $e_{i4}$ ... such that every pair of consecutive vertices in $P_i$ are connected by the hyperedge e appearing between them along $P_i$. As previously discussed, the vertices of the technology graph represent renewable resources, intermediate objects and finished objects and the hyperedges of the technology graph represent transformations. Accordingly, a path $P_i$ in the technology graph H=(V, E) from a founder set to a finished good identifies the renewable resources, the intermediate objects, the finished objects, the transformations and the machines mediating the transformations of the process. Thus, a process is also referred to as a construction pathway.

The technology graph H=(V, E) also contains information defining a first robust constructability measure of a terminal object representing a finished good or service. The first robust constructability measure for a terminal object is defined as the number of processes or construction pathways ending at the terminal object. Process redundancy for a terminal object exists when the number of processes or construction pathways in a technology graph exceeds one. Failures such as an interruption in the supply of a renewable resource or the failure of a machine cause blocks along construction pathways. Greater numbers of processes or construction pathways to a terminal object indicate a greater probability that a failure causing blocks can be overcome by following an alternate construction pathway to avoid the blocks. Accordingly, higher values of the first robust constructability measure for a terminal object indicate higher levels of reliability for the processes which produce the finished good or service represented by the terminal object. Further, the technology graph extends the traditional notion of the makespan.

The technology graph H=(V, E) also contains information defining a second robust constructability measure of a terminal object representing a finished good or service. The second robust constructability measure for a terminal object is defined as the rate at which the number of processes or construction pathways ending at the terminal object increases with the makespan of the process. For example, suppose a terminal object can be constructed with a makespan of N time steps with no process redundancy. Since there is no process redundancy, a block along the only construction pathway will prevent production of the terminal object until the cause of the block is corrected. The relaxation of the required makespan to N+M time steps will increase the number of construction pathways ending at the terminal object. Accordingly, failures causing blocks can be overcome by following an alternate construction pathway to the terminal object. In other words, while the minimum possible makespan increased by M time steps, the resulting greater numbers of processes or construction pathways to the terminal object led to greater reliability. Thus, the present invention extends the notion of a makespan to include the concept of robust constructability.

The technology graph H=(V, E) contains additional robust constructability measures of a class or family of terminal objects representing different finished goods or services. As previously discussed, objects having common attributes and behavior are grouped into a class. See *Object Oriented Modeling and Design*, Chapter 1. In the technology graph H=(V, E), each class represents a set of objects having common attributes and behavior. Exemplary attributes and behavior which are used to group terminal objects into classes include, without limitation, structural and functional features. Structural and functional features include attributes and behavior such as "needs a", "is a", "performs a", "has a", etc.

The additional robust constructability measures involve vertices which exist within the construction pathways of two or more terminal objects. These objects represented by these vertices are called poly-functional intermediate objects because two or more terminal objects can be constructed from them. For example, consider two terminal objects representing a house and a house with a chimney. The poly-functional intermediate objects are the objects represented by vertices which exists within a construction pathway of the house and within a construction pathway of the house with the chimney. Thus, if a consumer requests a chimney in a house after a firm has constructed the house without a chimney, the firm can add the chimney to the house by backtracking along the construction pathway of the house to a poly-functional intermediate object and proceeding from the poly-functional intermediate object along a construction pathway of the house with a chimney.

Figure 7:
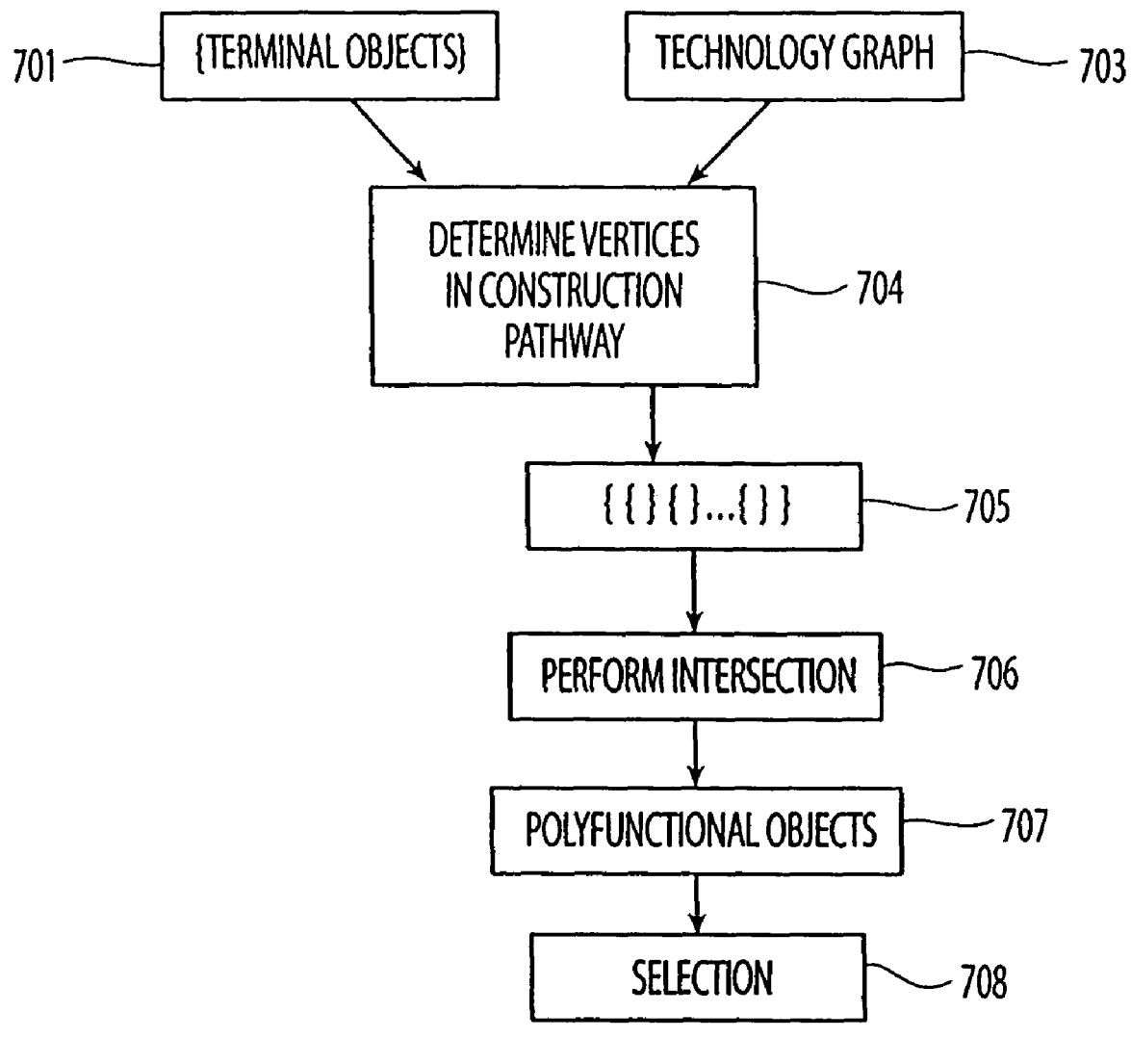
FIG. 7 provides a flow diagram 700 for locating and selecting poly-functional intermediate objects for a set of terminal objects 701 having a cardinality greater than or equal to two.

FIG. 7 provides a flow diagram 700 for locating and selecting poly-functional intermediate objects for a set of terminal objects 701 having a cardinality greater than or equal to two. In step 704, the method determines the vertices which exist within the construction pathways of each terminal object in the set of terminal objects 701 in the technology graph H=(V, E). Execution of step 704 yields a set of vertices 705 for each terminal object in the set of terminal objects 701. Accordingly, the number of sets of vertices 705 resulting from execution of step 704 is equal to the cardinality of the set of terminal objects 701. In step 706, the method performs the intersection operation on the sets of vertices 705. Execution of step 706 yields the vertices which exist within the construction pathways of every terminal object in the set of terminal objects 701. In other words, execution of step 706 yields the poly-functional intermediate objects 707 of the set of terminal objects 701.

In step 708, the method performs a selection operation on the poly-functional intermediate objects 707. Preferably, step 708 selects the poly-functional intermediate object 707 with the smallest fractional construction pathway distance. The fractional construction pathway distance of a given poly-functional intermediate object is defined as the ratio of two numbers. The numerator of the ratio is the sum of the smallest distances from the given poly-functional intermediate object to each terminal object in the set of terminal objects 701. The denominator of the ratio is the sum of the numerator and the sum of the smallest distances from each object in the founder set to the given poly-functional intermediate object. The distance between two vertices along a construction pathway in the technology graph H=(V, E) is defined as the number of hyperedges e on the construction pathway between the two vertices. The smallest distance between two vertices in the technology graph H=(V, E) is the number of hyperedges e on the shortest construction pathway.

Alternatively, step 708 considers the process redundancy in addition to the fractional construction pathway distance in the selection of the poly-functional intermediate objects 707.

This alternative selection technique first locates the poly-functional intermediate object 707 having the smallest fractional construction pathway distance. Next, the alternative technique traverses the construction pathways from the poly-functional intermediate object 707 having the smallest fractional construction pathway distance toward the founder set until it reaches a poly-functional intermediate object 707 having a sufficiently high value of process redundancy. A sufficiently high value of process redundancy can be predetermined by the firm.

The method of FIG. 7 for locating and selecting poly-functional intermediate objects for a set of terminal objects 501 can also be executed on different subsets of the power set of the set of terminal objects 701 to locate and select poly-functional intermediate objects for different subsets of the set of terminal objects.

As indicated by the preceding discussion, the present invention identifies and selects the poly-functional object which leads to process redundancy to achieve reliability and adaptability. Specifically, a firm should ensure that there is an adequate inventory of the selected poly-functional object to enable the firm to adapt to failures and changes in the economic environment.

Fitness Landscape

The Analysis Tools 106 of United Sherpa 100 shown in FIG. 1 create a fitness landscape representation of the operations management problem. As is known to persons of ordinary skill in the art, a fitness landscape characterizes a space of configurations in terms of a set of input parameters, defines a neighborhood relation among the members of the configuration space and defines a figure of merit or fitness for each member of the configuration space.

More formally, a landscape is defined over a discrete search space of objects X and has two properties:

(1) Objects $x \in X$ have a neighbor relation specified by a graph G. The nodes in G are the objects in G with the edges in C connecting neighboring nodes. G is most conveniently represented by its adjacency matrix.

(2) A mapping $f: X \rightarrow \mathbb{R}$ gives the cost of every object $x \in X$. For purposes of simplicity, the cost is assumed to be real but more generally may be any metric space.

Without limitation, the following embodiments of the landscape synthesis and analysis features of the analysis component 104 of the present invention are described in the illustrative context of fitness landscapes which are defined over bit strings of length n, i.e. $X=\{0, 1\}^n$. However, it is apparent to persons of ordinary skill in the art that the landscape synthesis and analysis features of the present invention are also applicable to landscapes which are defined by a mixture of discrete and continuous parameters. The fitness of a landscape is any mapping of bit strings to real numbers. For example, the fitness of a bit string x f(z) is equal to the number of 1's in x.

For example, without limitation, a fitness landscape can represent the job shop scheduling problem. As previously discussed, in the job shop scheduling problem, each machine at the firm performs a set of jobs. Each job consists of a certain ordered sequence of transformations from a defined set of transformations, so that there is at most one job running at any instance of time on any machine. The job shop scheduling problem consists of assigning jobs to machines to minimize the makespan. The set of all possible workable or non-workable schedules defines the configuration space for the job shop scheduling problem. The neighborhood relation can be defined as a permutation of the assignment of jobs to machines. Specifically, one way to define the neighborhood relation is to exchange the assignment of a pair of jobs to a pair of machines. For example if jobs a and b are assigned to machines 1 and 2 respectively in a job shop schedule then a neighboring job shop schedule is defined by assigning jobs a and b to machines 2 and 1 respectively. The fitness of each job shop schedule is defined as its makespan.

The Analysis component 104 performs tasks for United Sherpa 100 to address many of the problems associated with finding optimal, reliable and flexible solutions for operations management. First, it is difficult to predict the effect of changes in one or more of the input parameters on the outcome or fitness as the outcome may depend on the input parameters in a complex manner. For example, it might be difficult to predict the effect of adding a machine to a job shop, moving a manufacturing facility or contracting with another supplier on the reliability and flexibility of a firm's operations. The fitness landscape characterizes the effect of changes of the input parameters on the outcomes by defining a neighborhood relation.

Next, for most problems, only a small fraction of the fitnesses of the configuration space can be determined through actual observations or simulation because of the large size of the configuration space. The Analysis Component 104 of United Sherpa 100 addresses this difficulty by providing a method which predicts the outcomes for input parameter values which are neither observed nor simulated. In other words, the Analysis Component 104 provides a method for learning the landscape from a relatively small amount of observation and simulation.

Next, simulation and observation are not deterministic. In other words, the simulation or observation of the same input parameter values may yield different outcomes. This problem may be attributed to limitations associated with the selection of input parameters, errors associated with the setting of input parameters and errors associated with the observation of input parameters and outcomes because of noise. The analysis component 104 of United Sherpa 100 addresses this difficulty by assigning an error bar to its predictions.

Figure 8:
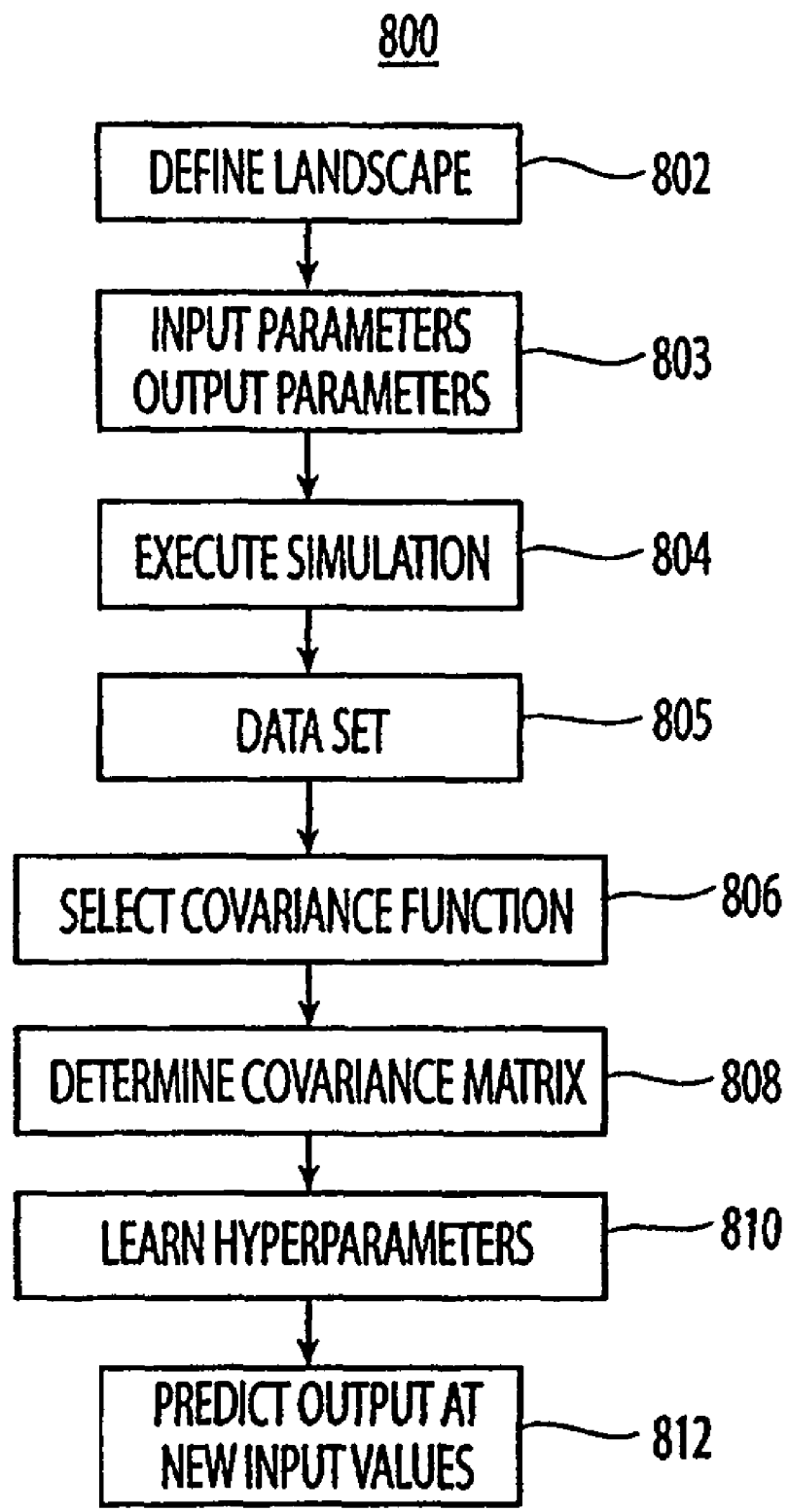
FIG. 8 displays a flow diagram of an algorithm to perform landscape synthesis.

The Analysis component 104 of United Sherpa 100 performs landscape synthesis 800 using the algorithm illustrated by the flow diagram of FIG. 8. In step 802, the landscape synthesis method defines the input parameters and the neighborhood relation for the fitness landscape. The input parameters are discrete rather than continuous because of the nature of the configuration space associated with operations management. Moreover, discrete input parameters could also be used to represent the values of a continuous variable as either below a plurality of predetermined threshold values or above the predetermined threshold values. For example, the input parameters could be binary variables having values that are represented by a string of N binary digits (bits). Preferably, step 802 defines the neighborhood relation such that the distance between input parameter values is the Hamming distance. If $x^{(i)}$ and $x^{(j)}$ represent a string of binary digits, then the Hamming distance is the number of binary digit positions in which $x^{(i)}$ and $x^{(j)}$ differ. The Hamming distance measure ranges from 0 when $x^{(i)}=x^{(j)}$ to N when $x^{(i)}$ and $x^{(j)}$ differ in every position for bit strings of length N. For example, the Hamming distance between the bit strings of length five, 00110 and 10101, is three since these bit strings differ at positions 1, 4, and 5. Similarly, the Hamming distance between bit strings of length five, 02121 and 02201, is also three since these bit strings differ at positions 3, 4, and 5. For strings composed of symbols taken from an alphabet of size A, there are $(A-1)*L$ immediate neighbors at distance one.

In step 804, the landscape synthesis method performs simulation on a domain of input parameters to produce corresponding output parameter values and stores the input/ output values in a data set: $D=\{x^{(1)}, y^{(1)}, \ldots, x^{(d)}, y^{(d)}\}$. If the simulation is not deterministic, step 804 performs multiple simulation runs to produce multiple sets of corresponding output parameter values. Next, step 804 computes the average value for each output parameter to produce the corresponding output parameter values and stores the input/output value pairs in a data set:

$D=\{x^{(1)}, y^{(1)}, \ldots, x^{(d)}, y^{(d)}\}$. This technique decreases the effect of noise and obtains more accurate output parameter values. Preferably, OrgSim 102 performs the simulation of step 804.

In step 806, the method chooses the covariance function $C(x^{(i)}, x^{(j)}, \Theta)$ which is appropriate for the neighbor relation selected in step 802. The correlation $\rho$ in output values at $x^{(i)}$ and $x^{(j)}$, assuming the average output is zero and the variance of outputs is 1, is the expected value for the product of the outputs at these two points: $E(y(x_1)y(x_2))$. The correlation for many landscapes decays exponentially with distance as $\rho(s)=\rho^s$, where $-1 \leq \rho \leq 1$ is the correlation in outcomes between neighboring strings (i.e. strings having a Hamming distance of 1). See P. F. Stadler, *Towards a theory of Landscape*, in Complex Systems and Binary Networks. Eds: R Lopez-Pena. R. Capovilla, R Garcia-Pelayo. H Waelbroeck, and F. Zertuche, Springer-Verlag Berlin, 1995. Assuming that this correlation depends only on the Hamming distance between the strings $x^{(i)}$ and $x^{(j)}$ step 806 defines a covariance matrix for discrete landscapes as $$C(x^{(i)}, x^{(j)}, \Theta) = \Theta_1 C_s(x^{(i)}, x^{(j)}) + \Theta_2 + \delta_{i,j}\Theta_3 \qquad (1)$$

wherein $$C_s(x^{(i)}, x^{(j)}) = \prod_{1 \leq k \leq N} \varrho_k^{x_k^{(i)} \wedge x_k^{(j)}}$$

$C_s(x^{(i)}, x^{(j)})$ is the stationary part of the covariance matrix. The parameters $\Theta=(\Theta_1, \Theta_2, \Theta_3)$ and the parameters $\rho_1$ through $\rho_N$ describing the covariance function are called hyper-parameters. These hyper-parameters identify and characterize different possible families of functions. The hyper-parameters $\rho_1$ through $\rho_N$ are variables having values between negative one and positive one inclusive. The hyper-parameters $\rho_1$ through $\rho_N$ are interpreted as the degree of correlation in the landscape present along each of the N dimensions. Next, $x_k^{(i)}=0,1$ is the $k^{th}$ bit of $x^{(i)}$. The $\wedge$ operator in the exponent has a value of one if the symbols at position k differ. Otherwise, the $\wedge$ operator has a value of zero.

In step 808, the landscape synthesis method forms the d×d covariance matrix, $C_d(\Theta)$, whose (i, j) element is given by $C(x^{(i)}, x^{(j)}, \Theta)$. For example, the covariance matrix for a data set of input/output values produced by simulation with inputs, $x^{(1)}=010$, $x^{(2)}>=101$, and $x^{(3)}=110$ is $$C_d(\Theta) = \begin{bmatrix} \Theta_1 + \Theta_2 + \Theta_3 & \Theta_1\rho_1\rho_2\rho_3 + \Theta_2 & \Theta_1\rho_1 + \Theta_2 \\ \Theta_1\rho_1\rho_2\rho_3 + \Theta_2 & \Theta_1 + \Theta_2 + \Theta_3 & \Theta_1\rho_2\rho_3 + \Theta_2 \\ \Theta_1\rho_1 + \Theta_2 & \Theta_1\rho_2\rho_3 + \Theta_2 & \Theta_1 + \Theta_2 + \Theta_3 \end{bmatrix}. \qquad (2)$$

The covariance matrix $C_d(\Theta)$ determined in step 808 must satisfy two requirements. First, the covariance matrix $C_d(\Theta)$ must be symmetric. Second, the covariance matrix $C_d(\Theta)$ must be positive semi-definite. The covariance matrix $C_d(\Theta)$ is symmetric because of the symmetry of the $\wedge$ operator.

The covariance matrix $C_d(\Theta)$ is also positive semi-definite. The contribution from $\theta_3$ is diagonal and adds $\theta_3 I$ to C. Moreover, the contribution from $\theta_3$ is the same for all matrix elements and can be written as $\theta_3 11^t$ where 1 is the vector of all ones. These matrices are positive definite and positive semi-definite respectively. Since the sum of positive semi-definite matrices is positive semi-definite we can prove that $C_d(\Theta)$ is positive semi-definite by showing that the matrix $[C_{i,j}^s] = C_s(x^{(i)}, x^{(j)})$ is positive semi-definite.

Assuming the discrete variables x are binary variables b, note that $C_s(x^{(i)}, x^{(j)}) = [C_{i,j}^s]$ wherein $$c_{i,j}^s = \prod_k \rho_k^{b_k^{(i)} \wedge b_k^{(j)}} \equiv \prod_k c_{i,j}^s(k).$$

where $c_{i,j}^s(k) = \rho^{b_k^{(i)} \wedge b_k^{(j)}}$. If we define the matrix $C_k = [c_{i,j}^s(k)]$ then the matrix $C_s$ can be written as the Hadamard or element-wise product, $\circ$, of the $C_k$:

$$C_s = \circ_k C_k.$$

Now it is well known that the Hadamard product of positive semi-definite matrices is itself positive semi-definite as indicated by the Schur product theorem. Thus if we can show that $C_k$ is positive semi-definite then the proof is complete.

Note first that the matrix elements $C_{i,j}^s(k)$ are either 1 if $b_k^{(i)} = b_k^{(j)}$ or $\rho$ if $b_k^{(i)} \neq b_k^{(j)}$ so we can express $C_{i,j}^s(k)$ as $$c_{i,j}^s(k) = 1 + (\rho-1)(b_k^{(i)} + b_k^{(j)} - 2b_k^{(i)}b_k^{(j)}).$$

Thus we can write the matrix $C_k$ as $$C_k = 11^t + (\rho-1)(b_k 1^t + 1 b_k^t - 2 b_k b_k^t) \qquad (3)$$

where 1 is the vector of 1s and $b_k$ is the binary vector $[b_k^{(1)}, \ldots, b_k^{(N)}]^t$. To prove that $C_k$ is positive semi-definite we must show that $x^t C_k x \geq 0$ for all x. Let us consider this matrix product in light of Eq. (3):

$$\begin{aligned} x^t C_k x &= (x^t 1)(1^t x) + (\rho-1)((x^t b_k)(1^t x) + (x^t 1)(b_k^t x) - \\ & \quad 2(x^t b_k)(b_k^t x)) \\ &= (x^t 1)^2 + 2(\rho-1)x^t b_k (x^t 1 - x^t b_k) \\ &= (x^t 1)^2 + 2(\rho-1)x^t b_k x^t \tilde{b}_k \end{aligned} \qquad (4)$$

where $\tilde{b}_k = 1 - b_k$ is another binary vector. To complete the proof we must show that Eq. (4) is non-negative for $|\rho| \leq 1$.

Noting that $1 = b_k + \tilde{b}_k$ Eq. (4) can be rewritten as $$x^t C_k x = (x^t b_k)^2 + 2\rho x^t b_k x^t \tilde{b}_k + (x^t \tilde{b}_k)^2.$$

Diagonalizing this quadratic form we find that $$x^t C_k x = \frac{1+\rho}{2}(x^t b_k + x^t \tilde{b}_k)^2 + \frac{1-\rho}{2}(x^t b_k - x^t \tilde{b}_k)^2$$

which is clearly non-negative as long as $|\rho| \leq 1$.

In an alternate embodiment, the covariance function is extended to include input dependent noise, $\Theta_3(x)$ and input dependent correlations $\rho_1(x)$.

In step 810, the landscape synthesis method determines the values of the hyper-parameters, $\Theta=(\Theta_1, \Theta_2, \Theta_3)$ to enable the characterization of the landscape in terms of the values of the hyper-parameters. Preferably, the method selects the values of the hyper-parameters which maximizes a likelihood function. A likelihood function expresses the probability of making the observations in the data set: $D=\{x^{(1)}, y^{(1)}, \ldots, x^{(d)}, y^{(d)}\}$ given the covariance function $C(x^{(i)}, x^{(j)}, \Theta)$ for the different values of the hyper-parameters, $\Theta=(\Theta_1, \Theta_2, \Theta_3)$. Preferably, the method determines the values of the hyper-parameters which maximize the logarithm of the likelihood function, log $$L(\Theta) = -\frac{1}{2}$$

log det $$C_d(\Theta) - \frac{1}{2} y' C_d^{-1}(\Theta) y$$

using the conjugate gradient method. However, as is known in the art, the method can use any standard optimization technique to maximize the logarithm of the likelihood function. As is known in the art, the gradient of the logarithm of the likelihood function can be determined analytically. See M. N. Gibbs. *Bayesian Gaussian Process for Regression and Classification*, ("Bayesian Gaussian Process for Regression and Classification"), Ph.D University of Cambridge, 1997.

Since the determination of the values of the hyper-parameters, $\Theta=(\Theta_1, \Theta_2, \Theta_3)$, which maximize the log likelihood function can be problematic if the log likelihood surface has many local extrema, an alternate embodiment determines the values of the hyper-parameters, $\Theta=(\Theta_1, \Theta_2, \Theta_3)$ which maximize the posterior probability distribution of the hyper-parameters $\Theta=(\Theta_1, \Theta_2, \Theta_3)$ given the observed data $D=\{x^{(1)}, y^{(1)}, \ldots, x^{(d)}, y^{(d)}\}$. The logarithm of the posterior probability distribution of the hyper-parameters $\Theta=(\Theta_1, \Theta_2, \Theta_3)$ is: $\log L(\Theta) + \log P(\Theta)$, where $P(\Theta)$ is a prior probability distribution of the hyper-parameters $\Theta=(\Theta_1, \Theta_2, \Theta_3)$. The inclusion of the prior probability distribution into the expression for the logarithm of the posterior probability distribution of the hyper-parameters $\Theta=(\Theta_1, \Theta_2, \Theta_3)$ smoothes the landscape to simplify the optimization problem.

Preferably, $P(\Theta)$, the prior probability distribution of the hyper-parameters $\Theta=(\Theta_1, \Theta_2, \Theta_3)$ is a modified beta distribution. Since the hyper-parameters $\Theta=(\Theta_1, \Theta_2, \Theta_3)$ are being determined with a maximum posterior estimate, the prior probability distribution over the $\rho$ hyper-parameters are constrained to lie within the range from −1 to 1. The modified beta distribution satisfies this constraint. As is known in the art, other distributions could be used to represent the prior probability distribution, $P(\Theta)$, as long as the distribution satisfies this constraint.

Next, step 812 predicts the outcome for each new value for the input parameters, $x^{(d+1)}$ using the previously determined covariance function $C(x^{(i)}, x^{(j)}, \Theta)$ and previously determined values for the hyper-parameters $\Theta=(\Theta_1, \Theta_2, \Theta_3)$. The probability of the outcomes has a Gaussian distribution with expected value $y^{(d+1)}$ and variance $\sigma_{y^{(d+1)}}^2$ given by:

$$y^{(d+1)}(\Theta) = y' C_{d+1}^{-1}(\Theta^*) k \tag{5}$$

$$\sigma_{y^{(d+1)}}^2 = \kappa - k' C_{d+1}^{-1}(\Theta^*) k \tag{6}$$

In the preceding two equations, y is a d-vector of previously observed outputs given by $y'=(y^1, \ldots, y^d)$, k is a d-vector of covariances with the new input point and is given by $k'=(C$ $(x^{(1)}, x^{(d+1)}; \Theta), \ldots, C(x^{(d)}, x^{(d+1)}; \Theta))$, $\kappa$ is a scalar given by $\kappa=C(x^{(d-1)}, x^{(d+1)}; \Theta)$ and $C_{d+1}(\Theta)$ is the (d+1)×(d+1) matrix given by:

$$C_{d+1}(\Theta) = \begin{bmatrix} C_d(\Theta) & k \\ k' & \kappa \end{bmatrix} \tag{7}$$

$C_{d+1}^{-1}(\Theta)$ is the matrix inverse of $C_{d+1}(\Theta)$ and can be determined analytically from standard matrix results. As is known in the art, the matrix calculations in Equations 5 and 6 are straightforward and can be accomplished in $O(d^3)$ time. In addition, faster but approximate matrix inversion techniques can be used to speed calculations to times of $O(d^2)$. See *Bayesian Gaussian Process for Regression and Classification*.

The following example shows the results obtained by executing the landscape synthesis method 800 on an NK model of a fitness landscape. In the NK model, N refers to the number of components in a system. Each component in the system makes a fitness contribution which depends upon that component and upon K other components among the N. In other words, K reflects the amount of cross-coupling among the system components as explained in *The Origins of Order*, Kauffman, S., Oxford University Press (1993), ("*The Origins of Order*"), Chapter 2, the contents of which are herein incorporated by reference. 40 random bit strings of length 10 were generated and their outcomes (or y values) determined by the NK model with N=10 and K=1. Noise having a Zero mean and a standard deviation of 0.01 was added to the model.

Execution of the discrete fitness landscape synthesis method 800 on the NK model described above determined the following values for the hyper-parameters: $\rho_1=0.768$, $\rho_2=0.782$, $\rho_3=0.806$, $\rho_4=0.794$, $\rho_5=0.761$, $\rho_6=0.766$, $\rho_7=0.775$, $\rho_8=0.751$, $\rho_9=0.765$, $\rho_{10}=0.769$, $\Theta_1=0.252$, $\Theta_2=0.227$, and $\Theta_3=0.011$. Theoretical results for the NK model described above indicate that all the $\rho$ values should be identical. Accordingly, the $\rho$ values determined by the discrete fitness landscape synthesis method 800 were consistent with the theoretical results as the $\rho$ values determined by the method are very similar to each other. Further, the discrete fitness landscape synthesis method 800 accurately estimated the noise level $\Theta_3$ present in the landscape. Finally, the discrete fitness landscape synthesis method 800 accurately constructed a fitness landscape of the NK model as indicated by the comparison of the outcomes predicted by the method 800 and their associated standard deviation values for unseen input strings with the actual outcomes without the added noise in the table below. As shown by the table, the outcomes predicted by the method 800 appeared on the same side of 0.5 as the actual values for 13 of the 15 input strings.

| x | predicted (standard deviation) | actual |
| --- | --- | --- |
| 1100000011 | 0.439 (0.290) | 0.410 |
| 1011011001 | 0.441 (0.324) | 0.434 |
| 0100111101 | 0.514 (0.365) | 0.526 |
| 0111111010 | 0.525 (0.293) | 0.563 |
| 0101101100 | 0.522 (0.268) | 0.510 |
| 0001001001 | 0.454 (0.320) | 0.372 |
| 0010101001 | 0.428 (0.317) | 0.439 |
| 1000001111 | 0.516 (0.302) | 0.514 |
| 1100010011 | 0.499 (0.291) | 0.448 |
| 0111000000 | 0.502 (0.308) | 0.478 |
| 1111100111 | 0.475 (0.257) | 0.476 |
| 0000000000 | 0.530 (0.269) | 0.531 |
| 1101110010 | 0.572 (0.306) | 0.572 |
| 1011101000 | 0.456 (0.314) | 0.444 |
| 0001101000 | 0.507 (0.315) | 0.480 |

The determination of the hyper-parameters $\Theta=(\Theta_1, \Theta_2, \Theta_3)$ for the covariance function $C(x^{(i)},x^{(j)},\Theta)$ is valuable in itself because the hyper-parameters supply easily interpretable information such as noise levels, the range of correlation, the scale of fluctuation, etc. about the landscape. Thus, the discrete fitness landscape synthesis method 800 characterizes the landscape with the hyper-parameters $\Theta=(\Theta_1, \Theta_2, \Theta_3)$.

The analysis component 104 of United Sherpa also performs landscape synthesis for multiple objectives.

We assume a data set D consisting of vector output values $\tau=\{t^{(1)}, \ldots, t^{(D)}\}$ at the corresponding points $\{x^{(1)}, \ldots, x^{(D)}\}$. Following the standard Gaussian Processes approach we define a covariance function which parameterizes a family of landscapes. In the vector output case the covariance function is no longer a scalar but rather an M×M matrix of covariances between the M outputs, i.e.

$$C(x,x')=E(y(x)y^t(x')).$$

Before parameterizing matrix covariances functions suitable for regression on vector outputs we derive formulas which predict the y value at a previously unseen x.

The task at hand is to predict the outputs $y^{(D+1)}$ at a new input point $x^{(D+1)}$. We start from the standard launching point for Gaussian Processes modified for matrix-valued covariances:

$$P(y^{(D+1)} | D, x^{(D+1)}) = \frac{Z_D}{Z_{D+1}} \exp\left[-\frac{1}{2}\left([\tau^t, t^t_{D+1}]C^{-1}_{D+1}\begin{bmatrix}\tau \\ t_{D+1}\end{bmatrix} - \tau^t C^{-1}_D \tau\right)\right]. \quad (8)$$

We recall that $\tau$ is a vector of length M×D given by $\tau=\Sigma_{i=1}^{D} e_i \otimes t^{(i)}$ and that $C_{D+1}$ is an [M×(D+1)]×[M×(D+1)] matrix given by $C_{D+1}=\Sigma_{i,j=1}^{D} E_{i,j} \otimes C(x^{(i)},x^{(j)})$. The D-vector, $e_i$, is a unit vector in the ith direction and the D×D matrix $E_{i,j}$ has all zero elements except for element i,j which is one. The $\otimes$ operator is the standard tensor product defined for an m×n matrix $A=[A_{i,j}]$ and a p×q matrix $B=[B_{i,j}]$ by $$A \otimes B = \begin{bmatrix} A_{1,1}B & \ldots & A_{1,n}B \\ \vdots & \ddots & \vdots \\ A_{n,1}B & \ldots & A_{m,n}B \end{bmatrix}$$

To determine the probability distribution for $t_{D+1}$ we need to invert the matrix $C_{D+1}$. We begin by writing $$C_{D+1} = \begin{bmatrix} C_D & K \\ K^t & \kappa \end{bmatrix}$$

where K is the (M×D)×M matrix $K=\Sigma_{i=1}^{D} e_i \otimes C(x_i,x_{D+1})$ and $\kappa$ is the M×M matrix $\kappa=C(x_{D+1},x_{D+1})$. The inverse of $C_{D+1}$ is given by $$C^{-1}_{D+1} = \begin{bmatrix} (C_D - K\kappa^{-1}K^t)^{-1} & C^{-1}_D K(K^t C^{-1}_D K_{-\kappa})^{-1} \\ (K^t C^{-1}_D K_{-\kappa})^{-1} K^t C^{-1}_D & (\kappa - K^t C^{-1}_D K)^{-1} \end{bmatrix}.$$

It is convenient for our purposes to use the matrix inversion lemma to rewrite the 1,1 matrix element of the inverse so that $$C^{-1}_{D+1} = \begin{bmatrix} C^{-1}_D - C^{-1}_D K(K^t C^{-1}_D K_{-\kappa})^{-1} K^t C^{-1}_D & C^{-1}_D K(K^t C^{-1}_D K_{-\kappa})^{-1} \\ (K^t C^{-1}_D K_{-\kappa})^{-1} K^t C^{-1}_D & (\kappa - K^t C^{-1}_D K)^{-1} \end{bmatrix}.$$

This result can now be used to simplify the argument in the exponential of Eq. (8) to $$[\tau^t, t^t_{D+1}]C^{-1}_{D+1}\begin{bmatrix}\tau \\ t_{D+1}\end{bmatrix} - \tau^t C^{-1}_D \tau = t^t_{D+1}(\kappa - K^t C^{-1}_D K)^{-1} t_{D+1} -$$
$$\tau^t C^{-1}_D K(\kappa - K^t C^{-1}_D K)^{-1} t_{D+1} - t^t_{D+1}(\kappa - K^t C^{-1}_D K)^{-1} K^t C^{-1}_D \tau + cst$$

where cst is a term independent of $t_{D+1}$. Completing the square on the above equation and substituting into Eq. (8) we find $$P(t_{D+1} | D, x_{D+1}, C(\Theta)) \sim$$
$$\exp\left[-\frac{1}{2}(t_{D+1} - K^t C^{-1}_D \tau)^t (\kappa - K^t C^{-1}_D K)^{-1} (t_{D+1} - K^t C^{-1}_D \tau)\right].$$

Thus the predicted values, $\hat{t}_{D+1}$, for $t_{D+1}$, and the estimated matrix of errors (covariances), $\hat{\Sigma}$, are $$\hat{t}_{D+1}=K^t C^{-1}_D \tau$$
$$\hat{\Sigma}=\kappa-K^t C^{-1}_D K$$

where we recall the definition $\tau=\Sigma_{i=1}^{d} e_i \otimes t^{(i)}$, $K=\Sigma_{i=1}^{D} e_i \otimes C(x^{(i)},x^{(D+1)})$ and $\kappa=C(x^{(D+1)},x^{(D+1)})$. These results are the natural extension of the analogous results for scalar valued outputs.

With these results all the standard techniques (e.g. determination of or integration over hyperparameters) for scalar output GP can naturally be extended to the case of vector outputs.

With these results, we now need to parameterize a useful family of M×M covariance functions of M objectives. The most natural covariance matrix function to pick is the matrix generalization of the scalar representations. For example, for multiple landscapes defined over bitstrings we might use $$C(b^{(i)}, b^{(j)}; \Theta) = \Theta_1(\alpha, \beta) \prod_{1 \leq k \leq N} \rho_k^{b_k^{(i)} \wedge b_k^{(j)}}(\alpha, \beta) + \Theta_2(\alpha, \beta) + \delta_{i,j}\Theta_3(\alpha, \beta).$$

where the Greek indices label all possible $$\binom{M}{2}$$

pairs of landscapes. Viewed as an M×M matrix for a fixed pair of input points the matrix C represents the covariances across the different objectives. Thus, it must be positive semi-definite. Let $C_{b^{(i)},b^{(j)}}$ be the M×M matrix of covariances of fitness. Then we can write $$C_{b^{(i)},b^{(j)}}=\Theta_1 \circ P_{b^{(i)},b^{(j)}}+\Theta_2+\delta_{i,j}\Theta_3$$

where $\Theta_1$, $\Theta_2$, and $\Theta_3$ are M×M matrices of parameters, $$P_{b(i),b(j)} = \prod_k \rho_k^{b_k^{(i)} \wedge b_k^{(j)}}(\alpha, \beta)$$

and ∘ is the Hadamard or element-wise product of matrices. Since each $\rho_k(\alpha,\beta) \in [-1,+1]$ the matrix $P_{b^{(i)},b^{(j)}}$ is positive semi-definite. It is well known that the Hadamard product of positive semi-definite matrices is also positive semi-definite (Schur product theorem). Thus, $C_{b^{(i)},b^{(j)}}$ will be positive semi-definite as long as the matrices $\Theta_1$, $\Theta_2$, and $\Theta_3$ are positive semi-definite.

To implement GP over landscapes we can maximize the log likelihood function directly to determine a maximum likelihood estimate of Θ and use this Θ for prediction. However, the log likelihood function is usually multi-modal and gradient ascent on the log likelihood is easily trapped on local maxima. Consequently, it is usually better to add a regularizing term through a prior P(Θ). We supply some tunable prior distributions that can be used for this purpose.

The parameters in the covariance function $\Theta_1$, $\Theta_2$, and $\Theta_3$ are all constrained to be positive. We consider two distributions over positive variables that are appropriate to use as priors over these variables.

A common distribution used to parameterize positive variables is the gamma distribution.

$$P(\Theta \mid \alpha, \beta) = \frac{\Theta^{\alpha-1} \exp[-\Theta/\beta]}{\Gamma(\alpha)\beta^\alpha}$$

The hyperparameters α and β control the position and shape of the distribution. In terms of the mean m and and variance v of the distribution $\alpha = m^2/v$ and $\beta = v/m$.

For numerical stability in maximizing the posterior robability it is convenient to write this distribution in terms of variables which range over the entire real line. Consequently, we set Θ=exp [θ] and determine the distribution over θ as $$\tilde{P}(\theta \mid \alpha, \beta) = \frac{\exp[\alpha\theta]\exp[-\exp[\theta]/\beta]}{\Gamma(\alpha)\beta^\alpha}$$

Since we wish to maximize the logarithm of the posterior probability we note for completeness that $$\log[\tilde{P}(\theta \mid \alpha, \beta)] = -\log[\Gamma(\alpha)] - \alpha\log\beta + \alpha x - \frac{\exp[\theta]}{\beta}.$$

Another useful prior over positively constrained hyperparameters is the inverse gamma distribution. The inverse gamma distribution is $$P(\theta \mid \alpha, \beta) = \frac{\Theta^{-(\alpha+1)}\exp[-1/(\Theta\beta)]}{\Gamma(\alpha)\beta^\alpha}.$$

The α and β parameters given in terms of the mean and variance are:

$$\alpha = 2 + \frac{m^2}{v} \text{ and } \beta = \frac{v/m}{v + m^2}.$$

Transforming to coordinates θ=log Θ which range over the entire real line we then have $$\tilde{p}(\theta \mid \alpha, \beta) = \frac{\exp[-\alpha\theta]\exp[-\exp[-\theta]/\beta]}{\Gamma(\alpha)\beta^\alpha}$$

The logarithm of the prior probability in this case is $$\log[\tilde{p}(\theta \mid \alpha, \beta)] = -\log[\Gamma(\alpha)] - \alpha\log\beta - \alpha\theta - \frac{\exp[-\theta]}{\beta}.$$

The ρ parameters are constrained to lie in |ρ|<1. Most often ρ is positive so we consider this special case before presenting a general prior.

For positively constrained landscapes (so that 0≦ρ<1) like those generated by the NK model an appropriate prior over the ρ variables is a beta distribution:

$$p(\Theta \mid \alpha, \beta) = \frac{\Gamma(\alpha+\beta)}{\Gamma(\alpha)\Gamma(\beta)} \Theta^{\alpha-1}(1-\Theta)^{\beta-1}.$$

The α and β parameters are determined in this case as $$\alpha = -\frac{m(v+m^2-m)}{v} \text{ and } \beta = \frac{(v+m^2-m)(m-1)}{v}$$

Again we transform coordinates so that the real line is mapped to the unit interval. In this case we write Θ as a sigmoid function of θ: Θ=(1+exp [−θ])$^{-1}$ so that the distribution over θ is $$\tilde{p}(\theta \mid \alpha, \beta) = \frac{\Gamma(\alpha+\beta)}{\Gamma(\alpha)\Gamma(\beta)} \frac{\exp[-\beta\theta]}{(1+\exp[-\theta])^{\alpha+\beta}}$$

The log prior probability in this case is $$\log[\tilde{p}(\theta \mid \alpha, \beta)] = \log\left[\frac{\Gamma(\alpha+\beta)}{\Gamma(\alpha)\Gamma(\beta)}\right] - \beta\theta - (\alpha+\beta)\log[1+\exp[-\theta]]$$

When we need to include the possibility of negative ρ we can modify the Beta distribution to cover the interval Θ∈[−1, 1] so that $$p(\theta \mid \alpha, \beta) = \frac{\Gamma(\alpha+\beta)}{2^{\alpha+\beta-1}\Gamma(\alpha)\Gamma(\beta)}(1+\Theta)^{\alpha-1}(1-\Theta)^{\beta-1}$$

The mean and variance of this distribution are $m=(\alpha-\beta)/(\alpha+\beta)$ and $v=4\alpha\beta/((\alpha+\beta)^2(\alpha+\beta+1))$ so that $$\alpha = \frac{1+m}{2}\left(\frac{1-m^2}{v} - 1\right) \text{ and } \beta = \frac{1-m}{2}\left(\frac{1-m^2}{v} - 1\right)$$

It is also useful to convert to a variable $\theta$ which assumes values over the entire real line. This can be accomplished by defining $\theta$ through $\Theta = \tan h\theta$. The $\theta$ distribution is then $$\tilde{p}(\theta \mid \alpha, \beta) = \frac{\Gamma(\alpha+\beta)}{2^{\alpha+\beta-1}\Gamma(\alpha)\Gamma(\beta)}(1+\tanh\theta)^\alpha(1-\tanh\theta)^\beta$$

with $\alpha$ and $\beta$ given as above. The log prior probability in this case is $$\log[\tilde{P}(\theta \mid \alpha, \beta)] = \log\left[\frac{\Gamma(\alpha+\beta)}{2^{\alpha+\beta-1}\Gamma(\alpha)\Gamma(\beta)}\right] + \alpha\log[1+\tanh\theta] + \beta\log[1-\tanh\theta].$$

The Analysis component 104 of United Sherpa 100 includes additional techniques to provide a more informative characterization of the structure of landscapes. These additional techniques characterize a fitness landscape or a family of fitness landscapes by determining the sparse bases for them. The sparse bases techniques offer a number of benefits including 1) compression, 2) characterization, 3) categorization, 4) smoothing, and 5) multiresolution.

The sparse bases techniques of the present invention compress the information in a landscape into a manageable size. In order to make use of landscapes, there must be a way to represent them with a concise description. Even for a landscape defined over bit strings of length n=20 there are over $10^6$ pieces of information needed to completely specify the landscape. Moreover, a complete description of the landscape is usually exponential in the parameters of the landscape. For example, the information necessary to describe a n=30 landscape is 1000 times larger than the already large n=20 landscape. Accordingly, landscapes must be represented by a concise, compressed description to serve as a useful technique for operations management.

The sparse bases techniques also characterize landscapes to identify the salient features of a class of landscapes. This characterization is useful because the optimization algorithms within the optimization component 106 of United Sherpa 100 are specifically designed to exploit the salient features of the class of landscapes.

United Sherpa 100 also uses the compressed descriptions of landscapes to form categories of landscapes. To find good solutions to a new optimization problem, the analysis component 104 of United Sherpa 100 creates a landscape representation of the problem as previously discussed. Next, the analysis component 104 determines the sparse base representation of the landscape. Next, the analysis component 104 identifies the class of landscapes which is most similar to the new landscape. Finally, after identifying the landscape's class, the optimization component 106 can execute that class's corresponding algorithms to find good solutions to the new optimization problem.

The sparse bases techniques also allow smoothing of landscapes which are polluted with noise such as intrinsic noise and noise introduced by measurement. Specifically, the analysis component 104 achieves smoothing by changing all coefficients which fall below a predetermined threshold to zero. While smoothing loses information, it has the benefit of removing details which do not have global structure such as noise.

The sparse bases techniques also achieve a multi-resolution description. In other words, the bases extracted for the landscape describe the structure of the landscape in many ways for use by the optimization component 106 of United Sherpa 100.

To determine sparse representations of landscapes the analysis component 104 uses a set F of n landscapes from which to construct a set of basis vectors $\phi_j(x)$ so that any landscape $f_i \in F$ can be represented as:

$$f_i(x) = \sum_j a_j^{(i)} \phi_j(x)$$

The basis $\phi = \{\phi_j\}$ may be complete or overcomplete and it is not assumed the basis vectors are orthogonal. Let $a = \{a_j^{(1)}, \ldots, a_j^{(m)}\}$ denote the set of expansion coefficients for each of the n landscapes. For the basis to be sparse any $f_i \in F$ can be represented reasonably accurately with few basis vectors, i.e. most of the $a_j^{(i)}$ are zero. The analysis component 104 of United Sherpa 100 includes two approaches for determining the bases $\phi = \{\phi_j\}$ for landscapes.

In the first approach, the analysis component 104 of United Sherpa 100 applies principal components analysis to discrete landscapes. In this approach, the analysis component 104 begins by constructing the $|\chi| \times |\chi|$ correlation matrix R of outcomes at input points across the family of landscapes F. The positive definite covariance matrix R is defined with elements:

$$R_{j,k} \equiv R(x_j, x_k) \equiv \langle f_i(x_j) f_i(x_k) \rangle \equiv \frac{1}{n} \sum_{i=1}^n f_i(x_j) f_i(x_k)$$

To form the complete and orthogonal basis $\phi$, the analysis component 104 diagonalizes R such that:

$$R(x, x') = \sum_{r=1}^{2^N} \lambda_r \phi_r(x) \phi_r(x')$$

The complete and orthogonal basis $\phi$ is called the principle component basis. The small number of $\phi$ vectors having the largest eigenvalues suffice to capture most of the features of R. In other words, $n \ll |\chi|$ so f defines a small subspace of $R^x$.

Many algorithms are known in the art to diagonalize a matrix to find the eigenvalues. Preferably, for large matrices, the analysis component 104 uses faster techniques such as the Lanczos methods to find the largest eigenvalues. The reconstruction of the landscapes using the principal component basis has the minimum squared reconstruction error.

After the analysis component 104 diagonalizes R, any function $f_i \in f$ can then be expanded in the n basis vectors which span this subspace having at most n dimensions as:

$$f_i(\vec{s}) = \sum_{r=1}^n a_r^{(i)} \phi_r(\vec{s}) \text{ with } a_r^{(i)} = \frac{\sum_{\vec{s}} \phi_r(\vec{s}) f_i(\vec{s})}{\sum_{\vec{s}} \phi_r(\vec{s}) \phi_r(\vec{s})}$$

Preferably, the basis is ordered in decreasing order of the eigenvalues. From a computational viewpoint, finding these n basis vectors is considerably simpler than diagonalizing the entire $|\chi| \times |\chi|$ correlation matrix $R_{x,x'}$.

The principal component analysis representation of f offers a number of advantages. First, it is uncorrelated in the sense that $$\langle a_r^{(i)} a_q^{(i)} \rangle = \frac{1}{n} \sum_{i=1}^{n} a_r^{(i)} a_q^{(i)} = \lambda_r \delta_{r,q}$$

Moreover the principal component analysis reconstruction using m<n basis vectors $f_i^{rec}(\vec{s}) = \sum_{r=1}^{m} a_r^{(i)} \phi(\vec{s})$ has the minimum squared error $\sum_{\vec{s}} (f_i(\vec{s}) - f_i^{rec}(\vec{s}))^2$. The final advantage is that the principal component analysis basis is compact or sparse. Specifically, the principal component analysis basis has a much lower dimension since m<<|χ|.

In the second and preferred approach for determining the bases $\phi = \{\phi_j\}$ for landscapes illustrated by the flow diagram of FIG. 9, the analysis component 104 of United Sherpa 100 applies independent component analysis to discrete landscapes. Independent component analysis was first applied to visual image as described in, Olshausen, B A and D J Field, *Emergence of simple-cell receptive field properties by learning a sparse code for natural images*, Nature 381.607-609, 1996, the contents of which are herein incorporated by reference.

In step 902, the sparse bases method 900 randomly initializes a φ basis. Specifically, the method 900 selects a random value for each element in the matrix with elements $\Phi_{k,l} = \phi_k(x_l)$. In step 904, for the given φ basis as represented in the matrix Φ, the sparse bases method 900 minimizes the following energy function with respect to all the expansion coefficients a:

$$E(a, \phi | f) = \frac{1}{n} \sum_{i=1}^{n} \left\{ \sum_{\vec{s}} \left[ f_i(\vec{s}) - \sum_j a_j^{(i)} \phi_j(\vec{s}) \right]^2 + \lambda \sum_j S(a_j^{(i)}/\sigma) \right\}$$

to determine a, where $\lambda = 2\beta\sigma^2$.

When minimized, the function S biases the $a_j^{(i)}$ towards zero to control the sparsity of the representation. Preferably, S decomposes into a sum over the individual expansion coefficients of the ith landscape. In an alternate embodiment, S is a function of all the expansion coefficients for the ith landscape, $S(a^{(i)})$. Consequently, the term $$\sum_j s(a_j^{(i)}/\sigma)$$

forces the coefficients of the ith landscape towards zero. The scale of the $a_j^{(i)}$ is set by normalizing them with respect to their variance across the family of landscapes, F.

The sparse bases method 900 balances the sparseness of the representation with the requirement that the selected basis reconstruct the landscapes in the family of landscapes, F as accurately as possible. Specifically, the term:

$$\sum_{\vec{s}} \left[ f_i(\vec{s}) - \sum_j a_j^{(i)} \phi_j(\vec{s}) \right]^2$$

represents a squared error criterion for the reconstruction error. The balance between sparseness and accuracy of the reconstruction is controlled by a parameter λ. Larger values of λ favor more sparse representations while smaller λ favor more accurate reconstructions. In step 906, the sparse bases method 900 updates the basis vectors by updating the matrix Φ with the values of the expansion coefficients a which were determined by step 904. In step 908, the sparse bases method 900 determines whether convergence has been achieved. If convergence has been achieved as determined in step 908, the method 900 terminates in step 910. If convergence has not been achieved as determined in step 908, control returns to step 906.

The mathematical derivation of the energy function used in step 906 was motivated by the desire to balance the sparseness of the representation with the requirement that the selected basis reconstruct the landscapes in the family of landscapes, F as accurately as possible. From a probabilistic perspective, P(φ|F) was determined where φ is compact or sparse. This probability P(φ|F) is written as:

$$P(\phi | f) = \frac{P(F | \phi) P(\phi)}{P(F)}$$

Given a basis φ, the likelihood of obtaining a landscape f is $$P(f|\phi) = \int da P(f|a, \phi) P(a)$$

and so, $$P(\phi|f) \approx P(\phi) \int da P(f|a, \phi) P(a)$$

Thus, P(φ), P(a) and P(f|a, φ) have to be expressed.

Since the landscapes are identical and independently distributed, the prior P(a) on the expansion coefficients is written as, $P(a) = \prod_{i=1}^{n} P(a^{(i)})$. To impose some compression or sparsity, the prior $P(a^{(i)})$ is written as:

$$P(a^{(i)}) = \prod_j \frac{\exp[-\beta S(a_j^{(i)}/\sigma_j)]}{Z_j}.$$

Alternatively, with a little extra complexity, a different β is used for each basis function $\phi_j$.

This derivation assumes that the factors contributing to f after the correct basis has been determined are independent. The function S(.) is a function forcing the $a_j$ to be as close to zero if possible. Preferably, S(x) is |x|. Alternative choices for S(x) include ln [1+$x^2$] and exp [$-x^2$]. If the independence factorization of P(a) is given up, an additional alternative choice for S(x) is the entropy of the distribution $p_i = a_i^2 / \Sigma_i a_i^2$.

In an alternate embodiment, S(x) includes a bias in the form of a Gibbs random field.

Since the landscapes are generated by an independent and identically distributed process, the likelihood function can be written:

$$P(f | a, \phi) = \prod_{i=1}^{n} P(f_i | a^{(i)}, \phi)$$

where $f_i$ is the ith landscape in f. Because the basis φ may be overcomplete the likelihood of a landscape $f_k$ given a basis φ and a set of expansion coefficients $a^{(i)}$ is expressed as $$P(f_i | a^{(i)}, \phi) = \frac{\exp\left[ -\sum_{\vec{s}} \left( f_i(x) - \sum_j a_j^{(i)} \phi_j(\vec{s}) \right)^2 / 2\sigma^2 \right]}{Z_f}$$

Thus, the coefficients are selected to minimize the least squared error. Further, the maximum likelihood estimate for φ is:

$$\phi^* = \mathrm{argmax}_\phi P(f|\phi) = \mathrm{argmax}_{\phi,a}^{max} P(f|a,\phi) P(a).$$

The maximum log-likelihood estimate, which is simpler to work with, is:

$$\phi^* = \text{argmax}_\phi \, \underset{a}{\max} \ln(P(f \mid a, \phi)P(a))$$

$$= \text{argmax}_\phi \, \underset{a}{\max} \ln\left(\prod_{i=1}^{n} P(f_i \mid a^{(i)}, \phi)P(a^{(i)})\right)$$

$$= \text{argmax}_\phi \, \underset{a}{\max} \left(\sum_{i=1}^{n} \ln P(f_i \mid a^{(i)}, \phi) + \ln P(a^{(i)})\right)$$

Substituting the specific forms for P(a) and P(f|a, φ) reduces to minimizing an energy function which is used in step 904 of the sparse bases method 900 shown in FIG. 9 and is defined by:

$$E(a, \phi \mid f) = \frac{1}{n}\sum_{i=1}^{n}\left\{\sum_{\partial}\left[f_i(\vec{s}) - \sum_j a_j^{(i)} \phi_j(\vec{s})\right]^2 + \lambda \sum_j S(a_j^{(i)}/\sigma)\right\}$$

where $\lambda = 2\beta\sigma^2$.

Optimization

The analysis component 104 and optimization component 106 of United Sherpa 100 include techniques to identify the regime of a firm's operations management and to modify the firm's operations management to improve its fitness. The identification of a firm's regime characterizes the firm's ability to adapt to failures and changes within its economic web. In other words, the identification of a firm's regime is indicative of a firm's reliability and adaptability.

FIG. 10 shows the flow diagram of an overview of a first technique to identify a firm's regime. In step 1002, a firm conducts changes in its operations management strategy. For instance, a firm could make modifications to the set of processes which it uses to produce complex goods and services. This set of processes is called a firm's standard operating procedures. In addition, a firm could make modifications to its organizational structure. In step 1004, the firm analyzes the sizes of the avalanches of alterations to a firm's operations management which was induced by the initial change.

The definition of avalanches of alterations include a series of changes which follow from an initial change to a firm's operations management. For example, a firm makes an initial change to its operation management to adjust to failures or changes in its economic environment. This initial change may lead to further changes in the firm's operations management. Next, these further changes may lead to even further changes in the firm's operations management.

In the first regime called the ordered regime, the initial change to a firm's operations management causes either no avalanches of induced alterations or a small number of avalanches of induced alterations. Further, the avalanches of induced alterations do not increase in size with an increase in the size of the problem space.

In the second regime called the chaotic regime, the initial change to a firm's operations management causes a range of avalanches of induced alterations which scale in size from small to very large. Further, the avalanches of induced alterations increase in size in proportion to increases in the size of the problem space.

In the third regime called the edge of chaos, the initial change to a firm's operations management causes a power law size distribution of avalanches of induced alterations with many small avalanches and progressively fewer large avalanches. Further, the avalanches of induced alterations increase in size less than linearly with respect to increases in the size of the problem space. The edge of chaos is also called the phase transition regime.

The analysis component 104 and the optimization component 106 of United Sherpa 100 include algorithms to improve the fitness of a firm's operations management. These algorithms modify a firm's operations management in order to achieve the desired improvement. The fitness of a firm's operations management includes long term figures of merit such as unit cost of production, profit, customer satisfaction, etc. These modifications include shakedown cruises. Shakedown cruises are natural experiments including normal variations in a firm's standard operating procedures, the organizational structure, and the distribution of decision making authority within the organizational structure. The modifications also include purposeful experiments.

These algorithms must properly tune the scale of their modifications in order to achieve the desired improvement in the fitness of the firm's operations management. For instance, if the scale of the modifications of the natural experiments or purposeful experiments is too small, the firm will remain frozen in a region of the space of operations management solutions which is too small. Conversely, if the scale of the modifications of the natural experiments or purposeful experiments is too large, the firm will become too chaotic to adapt well to failures and changes in its economic web. However, if the scale of the modifications of the natural experiments or purposeful experiments is well tuned, the firm will search the space of operations management solutions efficiently and will settle into an optimal solution.

The algorithms to improve the fitness of a firm's operations management are applicable to both single objective optimization and multi-objective optimization. For multi-objective optimization with n component fitness functions, the algorithms attempt to attain a Global Pareto Optimal solution. In a Global Pareto Optimal solution, none of the component fitness functions can be improved without adversely effecting one or more other component fitness functions. If the attainment of a Global Pareto Optimal solution is not feasible, the algorithms attempt to find a good Local pareto Optimal solution. In a Local Pareto Optimal solution, none of the component fitness functions can be improved by an incremental modification to a neighboring operations management solution without adversely effecting one or more of the other component fitness functions. The definition of optimal includes good solutions which may not necessarily be the best solution.

An algorithm for improving the fitness of a firm's operations management is described in a co-pending provisional patent application, No. 60/103,128, titled, "A Method and System for Optimization of Operations Management using Production Recipes and Learning Curves" filed Oct. 2, 1998, the contents of which are herein incorporated by reference.

Additional algorithms for improving the fitness of a firm's operations management involving local reinforcement learning with patches, neighborhood definition and limits on the fraction of components (tau) which can change at a particular times are described in co-pending provisional application titled, "Method and system for Dynamic Load-based Control of Routing in Data Communication Networks and of Control of Other Systems" the contents of which are herein incorporated by references. These algorithms are further described in co-pending provisional application, No. 60/118,174, titled, "A Method and System for Adaptive, Self-Configuring Resource Allocation in Distributed Systems", the contents of which are herein incorporated by reference.

Fitness landscapes fall into three major categories in accordance with the characteristics of the landscape. FIG. 11 shows the flow diagram of an algorithm 1100 to move a firm's fitness landscape to a favorable category by adjusting the constraints on the firm's operations management. In other words, the algorithm of FIG. 11 makes it easier to find good solutions to a firm's operations management problems.

In the first category, none of the solutions represented on the fitness landscape representation of the operations management problem are acceptable solutions. In the second category, the fitness landscape representation contains isolated areas of acceptable solutions to the operations management problem. The second category is called the isolated peaks category. In the third category, the fitness landscape representation contains percolating connected webs of acceptable solutions. The third category is called the percolating web category.

In step 1102, the landscape adjustment algorithm 1100 identifies the characteristics of the landscape using one of a number of different techniques. For example, the landscape synthesis method 800 of FIG. 8 determines the hyper-parameters $\Theta=(\Theta_1, \Theta_2, \Theta_3)$ for the covariance function $C(x,x'\Theta)$. These hyper-parameters supply easily interpretable information about the landscape such as noise levels, the range of correlation, and the scale of fluctuation. Similarly, the sparse bases method 900 of FIG. 9 also characterizes landscape to identify their salient features.

Figure 12A:
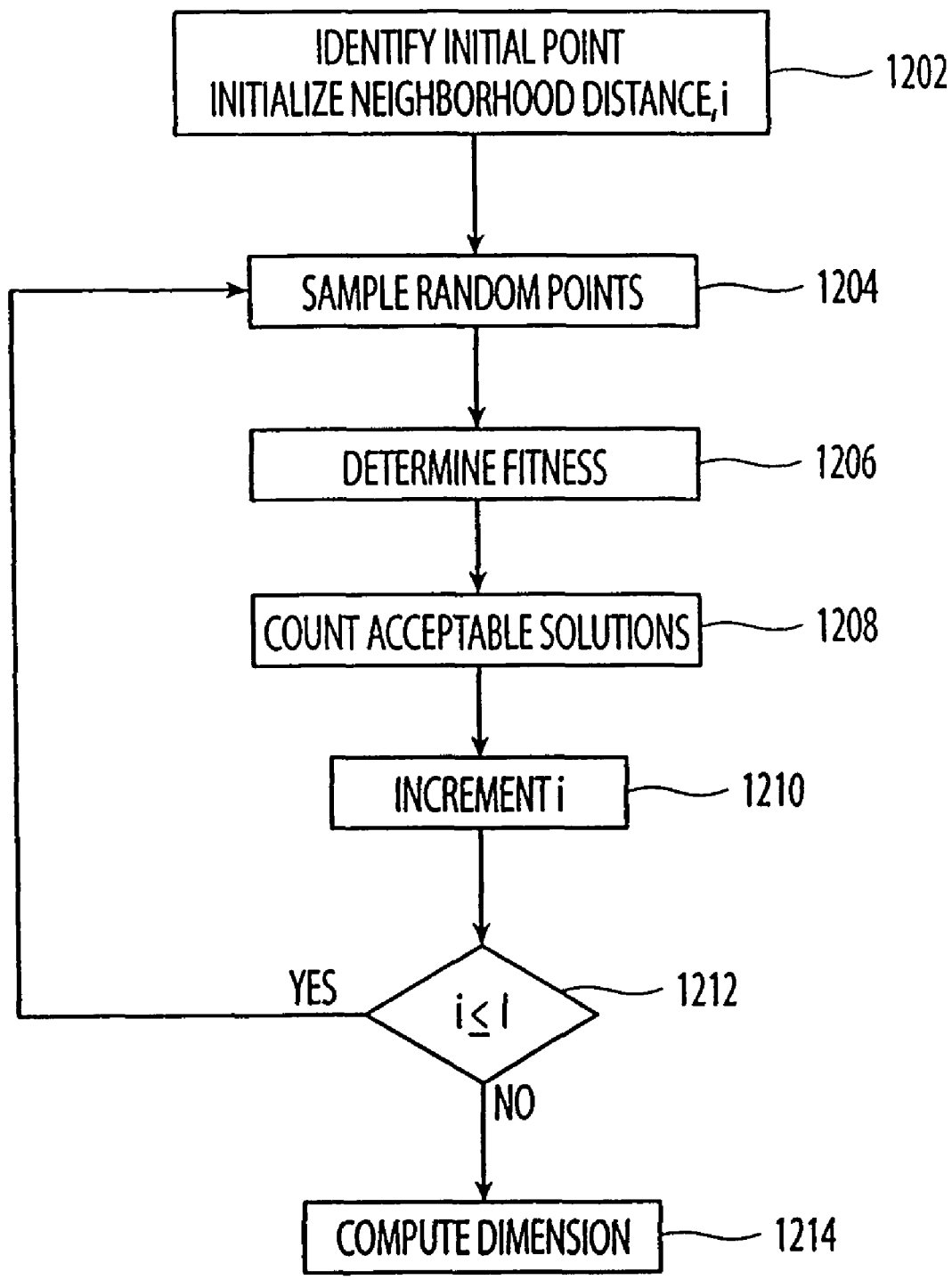
FIG. 12a displays a flow graph of an algorithm which uses the Hausdorf dimension to characterize a fitness landscape.

FIG. 12a displays a flow graph of an algorithm which uses the Hausdorf dimension to characterize a fitness landscape. In other words, the algorithm 1200 of FIG. 12a represents the preferred method for performing the operation of step 1102 of the algorithm of FIG. 11. However, the present invention is not limited to the algorithm 1200 of FIG. 12a as alternate algorithms could be used to characterize a fitness landscape. In step 1202, the landscape characterization algorithm 1200 identifies an arbitrary initial point on the landscape representation of the space of operations management configurations. The method 1200 also initializes a neighborhood distance variable, r, and an iteration variable, i, to the distance to a neighboring point on the fitness landscape and to 1 respectively. In step 1204, the landscape characterization algorithm samples a predetermined number of random points at a distance, r*i. Step 1206 determines the fitness of the random points which were sampled in step 1204. Step 1208 counts the number of random points generated in step 1202 having fitness values which exceed a predetermined threshold. In other words, step 1208 counts the number of random points generated in step 1202 which are acceptable solutions. Step 1210 increments the iteration variable, i, by one. Step 1212 determines whether the iteration variable, i, is less than or equal to a predetermined maximum number of iterations. If the iteration variable, i, is greater than the predetermined maximum number of iterations, then control proceeds to step 1214. If the iteration variable, i, is less than or equal to the predetermined maximum number of iterations, then control returns to step 1204 where the algorithm 1200 samples a predetermined number of random points at the next successively higher distance from the initial point on the landscape. Accordingly, successive iterations of the loop of the flow diagram of FIG. 12a, counts the number of acceptable solutions on concentric shells at successively higher distances from the initial point in the landscape.

In step 1214, the method 1200 computes the Hausdorf dimension of the landscape for successive shells from the initial point on the landscape. The Hausdorf dimension is defined as the ratio of the logarithm of the number of acceptable solutions at distance (i+1) to the logarithm of the number of acceptable solutions at distance i.

The method 1200 computes the Hausdorf dimension for a predetermined number of randomly determined initial points on the landscape to characterize the fitness landscape. Specifically, if the Hausdorf dimension is greater than 1.0, then the landscape is in the percolating web category. If the Hausdorf dimension is less than 1.0, then the landscape is in the isolated peaks category.

Alternative techniques could be used to characterize fitness landscapes such as techniques which measure the correlation as a function of distance across the landscape. For example, one such technique samples a random sequence of neighboring points on the fitness landscape, computes their corresponding fitness values and calculates the auto-correlation function for the series of positions which are separated by S steps as S varies from 1 to N, a positive integer. If the correlation falls off exponentially with distance, the fitness landscape is Auto-Regressive 1 (AR1). For fitness landscapes characterized as Auto-Regressive 2 (AR2), there are two correlation lengths which are sometimes oriented in different directions. These approaches for characterizing a landscape generalize to a spectra of correlation points. See Origins of Order.

Exemplary techniques to characterize landscapes further include the assessment of power in the fitness landscape at different generalized wavelengths. As is known in the art, the wavelengths could be Walsh functions.

In step 1104 of the algorithm of FIG. 11, the fitness landscape is moved to a more favorable category by adjusting the constraints on the firm's operations management using the technology graph. For example, if the firm desires to be operating in the percolating web category and step 1102 indicates that the firm is operating in either the first category of landscapes which has no acceptable solutions or the isolated peaks category, step 1104 will modify the firm's operations management to move the firm to the percolating web category. Similarly, if the firm desires to be operating in the isolated peaks category and step 1102 indicates that the firm is operating in either the first category of landscapes or the percolating web regime, step 1104 will modify the firm's operations management to move the firm to the isolated peaks category.

Without limitation, the algorithm of FIG. 11 for moving a firm to more desirable category of operation is described in the illustrative context of moving the firm to the percolating web category. However, it will be apparent to one of ordinary skill in the art that the algorithm of FIG. 11 could also be used to move the firm to the isolated peaks regime within the context of the present invention which includes the creation and landscape representation of the environment, the characterization of the landscape representation, the determination of factors effecting the landscape characterization and the adjustment of the factors to facilitate the identification of an optimal operations management solution. Step 1104 moves the firm to the percolating web category using a variety of different techniques. First, step 1104 eases the constraints on the operations management problem. Specifically, step 1104 increases the maximum allowable makespan for technology graph synthesis. Increasing the allowable makespan leads to the development of redundant construction pathways from the founder set to the terminal objects as explained by the discussion of FIG. 6.

Preferably, step 1104 further includes the synthesis of poly-functional objects. Preferably, step 1104 further includes the selective buffering of founder objects and intermediate objects supplied by other firms. The identification of redundant construction pathways, the synthesis of poly-functional objects and the selective buffering of founder objects and intermediate objects supplied by other firms act to improve the overall fitness of the fitness landscape representation of the operations management problem. In other words, these techniques act to raise the fitness landscape.

Easing constraints and improving the overall fitness for operations management produce a phase transition from the isolated peaks category to the percolating web category as explained by analogy to a physical landscape. Picture the landscape representation as the Alps with a cloud layer which begins at the valley and rises to a particular height. The area above the cloud layer in the sunshine on the Alps corresponds to the subspace of acceptable solutions on the fitness landscape. The area in the cloud layer on the Alps corresponds to the unacceptable solutions on the fitness landscape. Further, assume in the analogy that a hiker is on the Alps. Assume that the hiker remains alive in the sunshine and dies either immediately after entering the cloud layer or after lingering in the cloud layer for a particular time period.

The first category of fitness landscapes corresponds to the situation where the cloud layer rises to a height above Mount Blanc, the highest point on the Alps. In this situation, the hiker cannot leave the cloud layer and dies. Accordingly, there are no acceptable solutions in the first category of fitness landscapes.

Easing constraints and improving the overall fitness for operations management causes a phase transition to the situation where a small number of high peaks on the Alps lies above the cloud layer in the sunshine. In other words, the easing of constraints and the improvement of the overall fitness act to lower the cloud layer and raise the landscape in the analogy. In this situation, the hiker lives if he remains on one of the high peaks which lie in the sunshine. However, the hiker cannot travel from one of the high peaks to another of the high peaks because he must pass through the cloud layer to travel between high peaks. Accordingly, the second category of fitness landscapes contains isolated areas of acceptable solutions.

Continued easing of constraints and improvement of the overall fitness for operations management causes a phase transition to the third category of fitness landscapes corresponding to the situation where the cloud layer is sufficiently low and the landscape is sufficiently high to enable the development of connected or percolating pathways in the sunshine among the peaks. Accordingly, the third category of fitness landscapes contains connected pathways of acceptable solutions.

The movement to the third category of fitness landscapes represents a movement to a operations management solution which is more reliable and adaptable to failures and changes in the economic web respectively. For example, suppose that failures and changes in the economic web cause a shift in the fitness landscape underneath the hiker. If the hiker is operating in an isolated peaks category, the hiker will be plunged into a cloud and die. Conversely, if the hiker is operating in a percolating web category, the hiker can adapt to the failures and changes by walking along neighboring points in the sunshine to new peaks.

In the hiker analogy, the hiker represents a firm. The changing landscape represents changes in the economic environment of the firm. A hiker remaining in the sunshine represents a firm that can adapt to failures and changes in the economic environment while a hiker who falls into the clouds represents a firm that does not survive with changes in the economic environment.

Figure 12B:
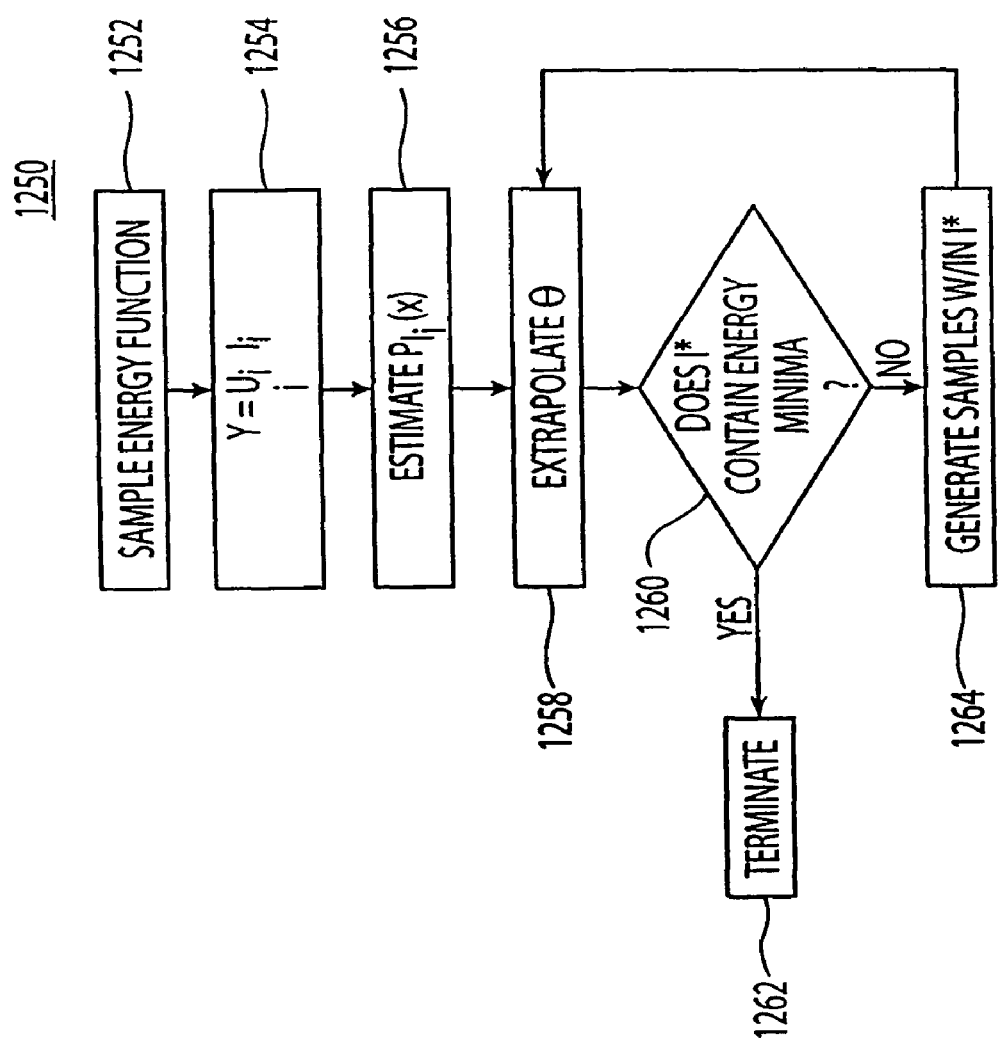
FIG. 12b displays the flow graph representation of an optimization method which converts the optimization problem to density estimation and extrapolation.

The optimization component 106 of United Sherpa 100 comprises a set of heuristics to identify solutions for operations management having minimal cost or energy values. Solutions with low cost and energy values have high fitness values. FIG. 12b displays the flow graph representation of an optimization method 1250 which converts the optimization problem to density estimation and extrapolation. In step 1252, the density estimation and extrapolation method 1250 samples m points from an energy function. The energy function is defined as, f: $x \in X \rightarrow y \in Y$ where X is the space of solutions and Y is the space of energy values. Accordingly, the space of solutions X and the energy function f define an energy landscape.

Without limitation, the density estimation and extrapolation optimization method 1250 of the optimization component 106 of the present invention is described in the illustrative context of combinatorial optimization in which X is discrete and Y is continuous. However, it is apparent to persons of ordinary skill in the art that the density estimation and extrapolation optimization method 1250 is applicable whether X and Y are discrete or continuous.

In step 1254, the method 1250 represents Y as the union of intervals:

$$Y = \bigcup_i I_i$$

The intervals may overlap. Step 1254 groups the observed data, $d=\{d^x,d^y\}$ where $d^x$ is the ordered set of sample x's and $d^y$ is the ordered set of corresponding costs into c intervals where the ith interval $i \in \lfloor 0, \ldots, c-1 \rfloor$ includes energies $\underline{e}+i\delta \leq \underline{e} < \underline{e}+(i+1)\delta$ and $\delta = (\overline{e}-\underline{e})/c$. The density estimation and extrapolation optimization method 800 is applicable to both single objective optimization and multi-objective optimization. For multi-objective optimization with n cost functions, the intervals will be n-dimensional regions.

Preferably, step 1254 defines the intervals to smooth the time series of observed data, $d=\{d^x,d^y\}$. Preferably, step 1254 slides the intervals with significant overlap to smooth the time series of observed data $d=\{d^x,d^y\}$.

In step 1256, the method 1250 estimates the probability density function $P_{I_i}(x)$ representing the probability that an $x \in X$ has cost within the ith interval: $P_{I_i}(x) = \text{Prob}\{f(x) \in I_i\}$. Preferably, step 1256 performs parametric density estimation, $P_{I_i}(x|\theta)$, by setting the parameters $\theta$ in accordance with the observed data $d=\{d^x,d^y\}$ using a learning algorithm.

Representing an input sequence space as $x=x_1x_2\ldots x_n$, the density $P_I(x)$ can be factored as:

$$P_I(x_1 \ldots x_n) = \prod_i P_I(x_i | \{x_i\})$$

where $\{x_i\}$ is the set of variables upon which $x_i$ depends. The set of variables upon which $x_i$ depends could be empty. Preferably, step 1256 uses Bayesian network algorithms to learn both the sets $\{x_i\}$ and the specific form of the conditional densities $P(x_i|\{x_i\})$. If the cardinality of each of the sets is less than or equal to 1, then step 1256 executes algorithms with a computational complexity of $O(n^2)$ to solve this problem. These algorithms minimize the Kullbakc-Liebler distance between such a singly factored distribution to the distribution estimated from the data. Preferably, for the Bayesian trees, step 1256 represents each of the n conditional distributions in terms of unknown parameters. In the case of binary data, these parameters are $p_i$ and $q_i$. If $p_i=P(x_i=1|\{x_i\}=0)$ and $q_i=P(x_i=1|\{x_i\}=1)$ then:

$$P(x_i|\{x_i\})=[p_i^{x_i}(1-p_i)^{1-x_i}]^{\{x_i\}}[q_i^{x_i}(1-q_i)^{1-x_i}]^{1-\{x_i\}}$$

Such expansions assuming the $\{x_i\}$ are typically called Chow expansions.

The approach for estimating the probability density function $P(x_i|\{x_i\})$ of step 1256 is incremental to enable easy improvement of the current estimate as new data becomes available. Further, it is easy to sample from the form of the probability density function $P(x_i|\{x_i\})$ of step 1256. This feature is useful since the discrete fitness landscape synthesis method 1250 needs to determine the x extremizing f.

In step 1258, the discrete fitness landscape synthesis method 1250 extrapolates the parameters θ from the known probability density function $P_{I_j}(x|d)$ to the unknown probability density function, $P_{I_i}(x)$. Step 1258 uses straightforward regression to extrapolate the parameters θ. The Chow expansion of step 1256 requires a dependency graph as input. If the dependency is assumed not to change across different intervals, then the regression problem becomes one of extrapolating the 2n−1 $p_i$ and $q_i$ parameters. Note that there are only 2n−1 parameters since one of the $\{x_i\}$ is empty. Preferably, step 1258 uses a standard lag method to do the extrapolation such that:

$$\{p_j,q_j\}_{I_i}=F(\{p_j,q_j\}_{I_{i-1}},\{p_j,q_j\}_{I_{i-2}},\dots)$$

The number of lags of the standard lag method of step 1258 can vary. The extrapolation method of step 1258 models the imprecision of the parameters of the probability density function due to the effect of noise. Preferably, the extrapolation method of step 1258 models the imprecision of each parameter as a Gaussian error which is proportional to the number of samples used to estimate that parameter.

In step 1260, the method 1250 determines whether the interval I* contains a solution x∈X having an energy minima which is below a predetermined threshold. If the interval I* contains a solution x∈X having an energy minima which is below the predetermined threshold as determined in step 1260, then control proceeds to step 1262 where the method terminates. If the interval I* does not contain a solution x∈X having an energy minima which is below the predetermined threshold as determined in step 1260, control proceeds to step 1264.

In step 1264, the method 1250 generates data samples from within the interval I*, using the probability density function which was extrapolated for the interval I* in step 1258. After execution of step 1264, control proceeds to step 1258 where the discrete fitness landscape synthesis method 1250 extrapolates the parameters θ to determine the next unknown probability distribution function. Accordingly, the method 1250 iterates to find successively lower energy solutions.

The discrete fitness landscape synthesis method 1250 represents an improvement over conventional genetic algorithms. Conventional genetic algorithms discard data during their operation. For instance, they discard samples having a high cost. Similarly, conventional genetic algorithms use only a portion of the available data during their operation. For instance, the crossover operation of conventional genetic algorithms only uses pairwise combinations of data. In contrast, the discrete fitness landscape synthesis method 1250 uses all the data associated with a population of samples of the energy function to extract their statistical regularities. Next, the method 1250 determines how the regularities vary with cost and extrapolates them to the kind of regularities which are expected for lower cost values. The method 1250 probabilistically generates new points having the desired regularities using the extrapolated model. The method 1250 also uses samples having higher costs to incrementally improve the density estimate for higher intervals instead of simply discarding those samples.

Automated Market

The AM 108 operates to automate the exchange of resources among entities. Further, AMs 108 provide the mechanism by which transactions linking activities in processes are coordinated and algorithmic procedures based on computer models of the state of the firm optimize these transactions.

Without limitation, the Automated Market 108 will be described in the illustrative context of automated techniques for matching buyers and sellers of financial instruments. However, it will be apparent to one of ordinary skill in the art that the aspects of the embodiments of the Automated Market 108, which include defining properties for resources, finding matches among the properties to identify candidate exchanges, evaluating the candidate exchanges and selecting one or more of the candidate exchanges having optional value, are also applicable in other contexts.

Additional exemplary contexts for Automated Markets 108 include the scheduling of painting of automobiles or trucks within an automobile manufacturer as previously explained in the discussion of FIG. 3a and building climate control. Another exemplary context for Automated Markets 108 include the Internet, where economic agents bid in real time to advertise products and services to web surfers.

The AM 108 acts to broker deals based on information and preferences supplied by the participating entities such as economic agents. In one embodiment representing a distributed, dynamic system, the AM 108 includes rules of engagement using methods from game theory which allow for effective, dynamic negotiation in different domains. In this embodiment, the very process of bidding and asking by economic agents establishes the trades. The process of bidding and asking include the double aural auction. Computational agents representing economic agents have internal representations of the conflicting contingent and possibly non-comparable utilities within the economic agent.

In the preferred embodiment, the AM 108 includes computational agents which are programmed to act as surrogates for economic agents including human beings. This preferred embodiment represents the most direct translation from actual marketplaces within an economy to the automated market 108, a market emulation model.

In the preferred embodiment, the computational agents utilize one or more of a variety of techniques to determine optimal buying or selling strategies for the corresponding economic agent. These techniques include fixed algorithms and evolving algorithms. The techniques include algorithms such as genetic algorithms, genetic programming, simulated annealing, and adaptive landscape search algorithms. These algorithms operate in either a fixed strategy space or in an open but algorithmically specifiable strategy space. The algorithms search for buy or sell strategies which optimize either single or multiple utilities within the economic agents.

In the automated market 108, the computational agents representing economic agents can be tuned to rapidly find genuine fundamental price equilibrium. Alternatively, such agents can be tuned to exhibit speculative bubbles. Tuning from fundamental to speculative behavior may be achieved by tuning the mutation rate in the underlying genetic algorithm from low to high.

In the present invention, computational agents searching trade strategy space can be tuned in a variety of means in automated markets 108 to jointly find the analogue of fundamental price or to trade speculatively.

Preferable, the Automated Market 108 includes the ability to bundle orders and resources in order to meet the demand for large transactions. When possible, the Automated Market 108 automatically aggregates small orders to create additional liquidity in the market. This capability is very important for applications involving supply chain management. This capability is also important for other transactional boundaries in economic webs. For example, the Automated Market 108 will uses the bundling ability when a larger company in a supply chain requires more of a commodity than any single supplier can supply.

Similarly, the Automated market 108 will also bundle complementary products which are needed to produce a finished product. Specifically, the AM 108 can automatically bundle many complementary resources such as screws and screw drivers from many different suppliers together. Bundling with the automated market 108 can be thought of as a portfolio trade within the process. For certain exchanges, the automated market 108 performs pooling of suppliers to satisfy one large purchaser. For example, the automated market 108 will perform pooling of suppliers to satisfy one large purchaser in the graded diamond exchange. In contrast, pooling will not be appropriate for other markets. For example, pooling will not be appropriate for most exchanges because the buyers typically want a single point of contact.

In the preferred embodiment, the AM 108 receives trading preferences computed by the economic agents and an optimization engine within the AM 108 finds the trade which maximizes the preferences of the participating economic agents. Specifically, the AM 108 allows economic agents such as organizations and firms to anonymously submit terms of a favorable exchange. Upon receipt of the trading preferences from the economic agents, the AM 108 reconciles compatible buyers and sellers. All of the terms that need to be negotiated are specified privately in a manner that incorporates the flexibility and often non-comparable utilities of the organization. Further, none of the surfaces will be available for inspection or analysis by any other market participant, or any third party. Since the AM 108 has the ability to receive preferences from economic agents which privately specify the range over which they are flexible on various terms, the present invention allows the negotiation process to be automated without publicizing the internal state of the participating economic agents.

For the exchange of goods, these terms include price and quantity. Optionally, the terms could further include exchange location, exchange time, quality/purity descriptors, the current sequence of contracts, sales offers, and purchase offers and the future sequence of contracts, sales offers and purchase offers. For example, in the exchange of crude oil, the terms might include price, volume, delivery point, sulfur content, and specific gravity. The terms could also be contingent on the delivery of other contracts.

For the exchange of services, the terms include at least price and time. Further, the terms could also include other factors which are necessary to specify the service. For example, in the exchange of transportation services, the terms would include price, volume, weight, pickup time and location, and delivery time and location.

The Automated Market 108 receives multi-dimensional preference surfaces from the economic agents in the economy desiring to exchange a good or service. Economic agents use the multi-dimensional preference surface to specify their flexibility on the terms of the exchange. For example, a purchaser will not buy a good or service above a price specified on its multi-dimensional preference surface. Similarly, a seller will not sell a good or service below a price specified on its multi-dimensional preference surface. Accordingly, the multi-dimensional surface captures all the correlations between the terms of the economic agents seeking to participate in the exchange.

In general, there will be more than 3 terms that need to be negotiated on a particular exchange. When there are more than three terms, it will not be easy to visualize the preference surface. In this case, the preference surface is entered into the automated market 108 using multiple two or three-dimensional preference surfaces. Alternatively, the preference surface is entered using an equation or series of equations. In the preferred embodiment, an economic agent's operations management system automatically specifies the economic agent's preference surface by monitoring its status. Specifically, the modeling and simulation component 102, the optimization component 106 and the analysis component 104 of United Sherpa 100 operate to produce preference surfaces for the automated market 108 as shown in FIG. 1.

The automated market 108 matches buyers and sellers at published times. The frequency of this matching process will be at a time scale appropriate for the given market. For example, a market exchange for Boeing 777s will happen less frequently than a market exchange for Ford Taurus brake pads.

Buyer and seller surfaces scheduled for reconciliation at the time of a matching are committed. In other words, each buyer and seller is committed to accept any trade below or above their preference surfaces respectively. The automated market 108 analyzes these committed surfaces for overlapping regions. In general, for an exchange set up with N terms of negotiation, there will be an N-dimensional region of overlap between the surfaces for potential buyers and sellers.

The automated market 108 also has support for assigning priorities to the constituent factors of the preference surfaces. For example, in some market exchanges, the highest volume contracts will be matched up first, while in other market exchanges, the earliest transaction date contracts will be matched up first.

After analysis of a given matching period, the automated market 108 will prepare a list of the N negotiated terms for each match found. Next, the automated market 108 will notify each participant of the deal (if any) resulting from their submitted preference surface. Several different sets of terms may result from one matching period, but each market participant receives at most one match per committed preference surface. The automated market 108 also supports a set of rules governing the participation of the economic agents. For example, one set of rules establishes punitive damages for defaults on committed and reconciled deals.

As previously explained, the automated market 108 of the present invention can match buyers and sellers of stock portfolios. The optimization task is to maximize the joint satisfaction of buyers and sellers of stock portfolios. In other words, the optimization task determines the prices of all stocks involved in the transaction which will maximizing the joint satisfaction of the buyers and sellers. The link trader is the trader initializing a trade whether buying or selling. The contra trader is his partner (the seller if he is buying, or the buyer if he is selling). The Automated Market 108 seeks to achieve an optimal mutual or joint satisfaction of both the link trader $S^L$ and the contra trader $S^C$ wherein the definition of optimal includes high satisfaction which may not necessarily be the highest satisfaction. The satisfaction of each trader will depend on many terms including the price $p_i$ and volume $v_i$ of each traded stock. If p and v denote n vectors of the traded stocks, the joint satisfaction S(p,v) is defined as:

$$S(p,v)=S^L(p,v)S^C(p,v).$$

In the most general setting we must optimize over many terms including prices p and volumes v to maximize the joint satisfaction. Without limitation, the Automated Market 108 will be described in the simplified illustrative context where it seeks to determine a vector of prices which achieves an optional joint satisfaction and the volumes are given (not to be determined). However, it will be apparent to one of ordinary skill in the art that the aspects of the embodiments of the Automated Market 108 are also applicable in contexts where the joint satisfaction is dependent on many terms. In the simplified context, the joint satisfaction is defined as:

$$S(p|v)=S^L(p|v)S^C(p|v) \qquad (9)$$

and the Automated Market 108 seeks to determine the optimal vector of prices achieving an optional joint satisfaction.

Any transaction may involve multiple stocks. If the link trader cares only about total costs, and there are n stocks, the total cost c to the link trader is $$c = \sum_{1 \le i \le N} p_i v_i = p^t v.$$

Buying stock corresponds to positive volumes, $v_i>0$, and selling stock corresponds to negative volumes, $v_i<0$. The prices, however, are always positive (i.e. $p_i>0$). Since the satisfaction of the link trader is a function of only the cost c $$S^L(p|v)=S^L(c)=S^L(p^tv) \qquad (10)$$

The satisfaction profile for the link trader can be entered by the user by specifying the satisfaction at a set of $m_L$ distinct points $\{(C_\alpha, S_\alpha^L)|\alpha=1 \ldots m\}$ where Greek indices will be used to label input by the user to define profiles and Latin indices will be used for all other purposes. The points are indexed in order of increasing cost so that $C_\alpha > C_{\alpha'}$ if $\alpha > \alpha'$. Piecewise linear interpolation is used to fill in the satisfaction elsewhere $$S^L(c) = S_\alpha^L + \frac{S_{\alpha+1}^L - S_\alpha^L}{c_{\alpha+1} - c_\alpha}(c - c_\alpha)$$

where $1 \le \alpha \le m_L$ labels the largest cost value less than c. The satisfaction function typically will look like a Fermi function and be bounded between 0 and 1. It will be 1 for low costs, i.e. $c<\underline{c}$ and 0 for high costs, i.e. $c>\overline{c}$, For $c \in [\underline{c},\overline{c}]$, $S^L(c)$ decreases monotonically with increasing c, i.e.

$$\partial_c S^L(c)<0. \qquad (11)$$

The satisfaction of the contra traders is defined next. The Automated Market 108 allows for the possibility that the contra trader is different for each stock involved in the trade. Thus we define n contra satisfaction profiles $\{S_i^C|i=1 \ldots n\}$. The satisfaction of the contra trader also depends on the volume of the stock transferred. For example, a seller may be willing to accept a lower price if the volume of stock sold is higher. Consequently, we write $S_i^C(p_i|v_i)$ to represent the satisfaction of the ith contra trader. The satisfaction profile for this contra trader is also a piecewise linear interpolant of prespecified points $\{(P_\alpha, S_{i,\alpha}^C(v))|\alpha=1 \ldots m_C\}$ and thus, can be written as:

$$S_i^c(p|v) = S_{i,\alpha}^c(v) + \frac{S_{i,\alpha+1}^c(v) - S_{i,\alpha}^c(v)}{p_{\alpha+1} - p_\alpha}(p - p_\alpha)$$

where $1 \le \alpha \le m_C$ labels the largest price less than p. As before, $\alpha$ indexes the user-input points in order of increasing price. If $v_i>0$ the contra trader is selling stock so that $S_i^C(p_i|v_i>0)$ always has positive slope, i.e. $\partial_{p_i}S_i^C(p_i|v_i>0)>0$. Similarly, if $v_i<0$ then the contra trader is buying stock so that a $\partial_{p_i}S_i^C(p_i|v_i<0)<0$. In either case $S_i^C(p_i|v_i)$ is a monotonic function of $p_i$ and:

$$v_i \partial_{p_i} S_i^C(p_i|v_i) > 0 \qquad (12)$$

The joint satisfaction of all traders $S^C(p|v)$ is defined as:

$$S^c(p|v) = \prod_{1 \le i \le n} S_i^c(p_i|v_i). \qquad (13)$$

Using Eqs. (10) and (13) in Eq. (9), the optimization task is to determine:

$$p^* = \text{argmax}_p \, S^L(p^t v) \prod_{1 \le i \le n} S_i^c(p_i|v_i). \qquad (14)$$

If $$S^L(p^tv) = \exp[-s^L(p^tv)] \text{ and } S_i^c(p_i|v_i) = \exp[-s^c(p_i|v_i)]$$

where $$s^L(p^tv) = -\ln[S^L(p^tv)] \text{ and } s^c(p_i|v_i) = -\ln[-S^c(p_i|v_i)] \text{ then}$$

$$p^* = \text{argmin}_p \left[ s^L(p^tv) \sum_{1 \le i \le n} s_i^c(p_i|v_i) \right] \equiv \text{argmin}_p \, s(p|v).$$

In this form it is evident that the only coupling between the $p_i$ comes through the first term involving $p^tv$. At a minimum, $$\nabla_p s(p|v) \equiv \nabla s(p) = 0 \text{ so that}$$

$$v_i \partial_{p_i} s^L(p^tv) + \partial_{p_i} s_i^C(p_i|v_i) = 0$$

From Eqs. (11) and (12):

$$\partial_c s^C(c) > 0 \text{ and } v_i \partial_{p_i} s_i^L(p_i|v_i) < 0$$

so that a solution $\nabla_p S(p|v)$ always exists. Note that the gradient, Eq. (14), is extremely simple to evaluate. Moreover, the gradient can be found very quickly since all the terms $\partial_{p_i}S_i^C$, can be evaluated in parallel.

Next, a possible minimization algorithm based on a decomposition method is described. The joint satisfaction $s(p|v)=s^L(p^tv)+\Sigma_{1 \le i \le N}S_i^C(p_i|v_i)$ can be written as:

$$s(p|v) = \sum_{1 \le j \le N+1} f_j(x_j)$$

where the new coordinates are $x_j = p_j$ for $j \in [1,N]$ and $x_{N+1} = \Sigma 1 \leq j \leq N x_j v_j$ and the new functions are $f_j(x_j) = s_j^C(x_j|v_j)$ for $j \in [1, N]$ and $f_{N+1}(x_{N+1}) = s^L(x_{N-1})$ Thus, we have a constrained optimization problem:

$$\text{minimize} \sum_{1 \leq j \leq N+1} f_j(x_j)$$

$$\text{subject to } -x_{N+1} + \sum_{1 \leq j \leq N} x_j v_j = 0.$$

The only coupling between variables comes through the constraint. Introducing a single Lagrange multiplier for the constraint the Lagrangian for this problem is $$L(x_j \lambda) = \sum_{1 \leq j \leq N+1} f_j(x_j) + \lambda a^t x \equiv \sum_{1 \leq j \leq N+1} L_i(x_i, \lambda)$$

where $L_i(x_i, \lambda) = f_i(x_i) + \lambda a_i x_i$ and $a_i = v_i$ and $i \in [1,n]$ and $a_{i+1} = -1$. In this form, the problem is ideal for minimization using Lagrangian relaxation.

For a given $\lambda$, say $\lambda_t$, the minimization of $L(x\lambda_t)$ is very easy since it decomposes into N 1-dimensional minimizations:

$$\min_x L(x, \lambda_t) = \sum_{1 \leq i \leq N} \min_{x_i} L_i(x_i, \lambda_t).$$

Moreover, each minimization can be done in parallel. In this way we obtain a solution $x_t = x(\lambda_t)$. The dual problem which determines the multiplier $\lambda$ is:

$$\max_\lambda L(x(\lambda), \lambda) \equiv \max_\lambda q(\lambda).$$

Maximizing this function using steepest ascent requires the gradient of the dual function $q(\lambda)$:

$$\partial_\lambda q(\lambda) = a^t x + \sum_{1 \leq j \leq N+1} (\partial_{x_i} f_j(x_i(\lambda)) + \lambda a_j) \partial_\lambda x_j = a^t x.$$

As noted in the last step since $x_i(\lambda)$ minimizes $L_i(x_i, \lambda)$ this gradient is zero. Thus using steepest ascent the Lagrange multiplier can be updated as $$\lambda_{t+1} = \lambda_t + \alpha a^t x(\lambda).$$

where $\alpha$ is the step size. This algorithm will converge to a local $\lambda$ peak.

It may be the case that $q(\lambda)$ is not a convex function, but we know that for the global optimum of the constrained problem the multiplier $\lambda^*$ satisfies $$\lambda^* = \arg\max_\lambda q(\lambda)$$

so that a global optimization technique like simulated appealing could be used to determine $\lambda^*$ and thereby the globally optimal x. Note that the dual function $q(\lambda)$ is not a direct function of $\lambda$ but indirect through the determination of $x(\lambda)$. Fortunately, $x(\lambda)$ can be evaluated extremely rapidly in parallel. Also, it may be the case that $q(\lambda)$ is convex.

The efficiency of the above method requires quick optimization of $L_i(x_i, \lambda) = f_i(x_i) + \lambda a_i x_i$. Next, a good analytic estimate for the minimum of $L_i$ as a function of $\lambda^*$ and the satisfaction function is developed. For the case where the satisfaction function represents the preferences of a buyer so that the satisfaction function is a monotonically decreasing function of x.

The satisfaction function of the ith trade is represented analytically as a Fermi function, $s_i(x_i) = (\exp(\beta_i(x - \mu_i)) + 1)^{-1}$. The parameters $\beta_i$ and $\mu_i$ can be related to $\underline{c}_i$ and $\overline{c}_i$ by $\mu = (\underline{c}_i + \overline{c}_i)/2$ and $\beta \alpha \overline{c}_i - \underline{c}_i$. With these assumptions, $$L_i(x_i, \lambda) = -\ln\left[\frac{1}{\exp(\beta_i(x_i - \mu_i)) + 1}\right] + \lambda a_i.$$

This function is minimized by $$x_i = \mu_i + \frac{1}{\beta_i} \ln\left[\frac{\lambda a_i}{\beta_i - \lambda a_i}\right].$$

Once $\beta$ and $\mu$ have been estimated the above formula will serve as a good starting point for a Newton's method.

The next natural extension is the case in which volumes are not fixed but are also optimized along with the rice. The problem remains the same except that now the constraint is a quadratic function of the variables. As is known in the art, there are a number of obvious ways to extend Lagrangian relation. In the preferred embodiment, we need to minimize S(p,v) where we have an effective tool to minimize S(p,v) for any fixed volume. Thus, a general technique to solve the general problem might be to initialize some guess for v and then solve for the best prices. At that new point (p,v), calculate the gradient $\nabla_v S(p,v)$ and update the volumes accordingly, e.g. by steepest descent $v_{t+1} = v_t - \nabla_v(p_t, v_t)$. Note that $\nabla_v S(p,v)$ is very easy to calculate since it only enters into the link trader's satisfaction.

An application of the automated market 108 is to match producers who have an opportunity to move product with distribution service providers. For example, the automated market 108 could be used for a distribution service provider to sell excess trucking capacity (e.g., that available on a return route) at a discount for a petrochemical supply chain.

Allowing for two-way bidding, the automated market 108 receives both service requests from producers and service offers from distribution service providers and clears the market for services at regular, published intervals. A request or an offer is associated with a specific clearing time. The automated market 108 evaluates and ranks various requests and offers. A match-up between requests and offers is automatically conducted in connection with the rankings of the requests and offers.

While the application of the automated market 108 to the exchange of servers will be explained within the context of trucking industry, it is apparent to one of ordinary skill in the art that the automated market 108 can be applied to any request-offer match-ups that would benefit from the consideration of such factors. For example, the automated market 108 is also applicable to other transportation businesses including trains and ships.

Figure 13A:
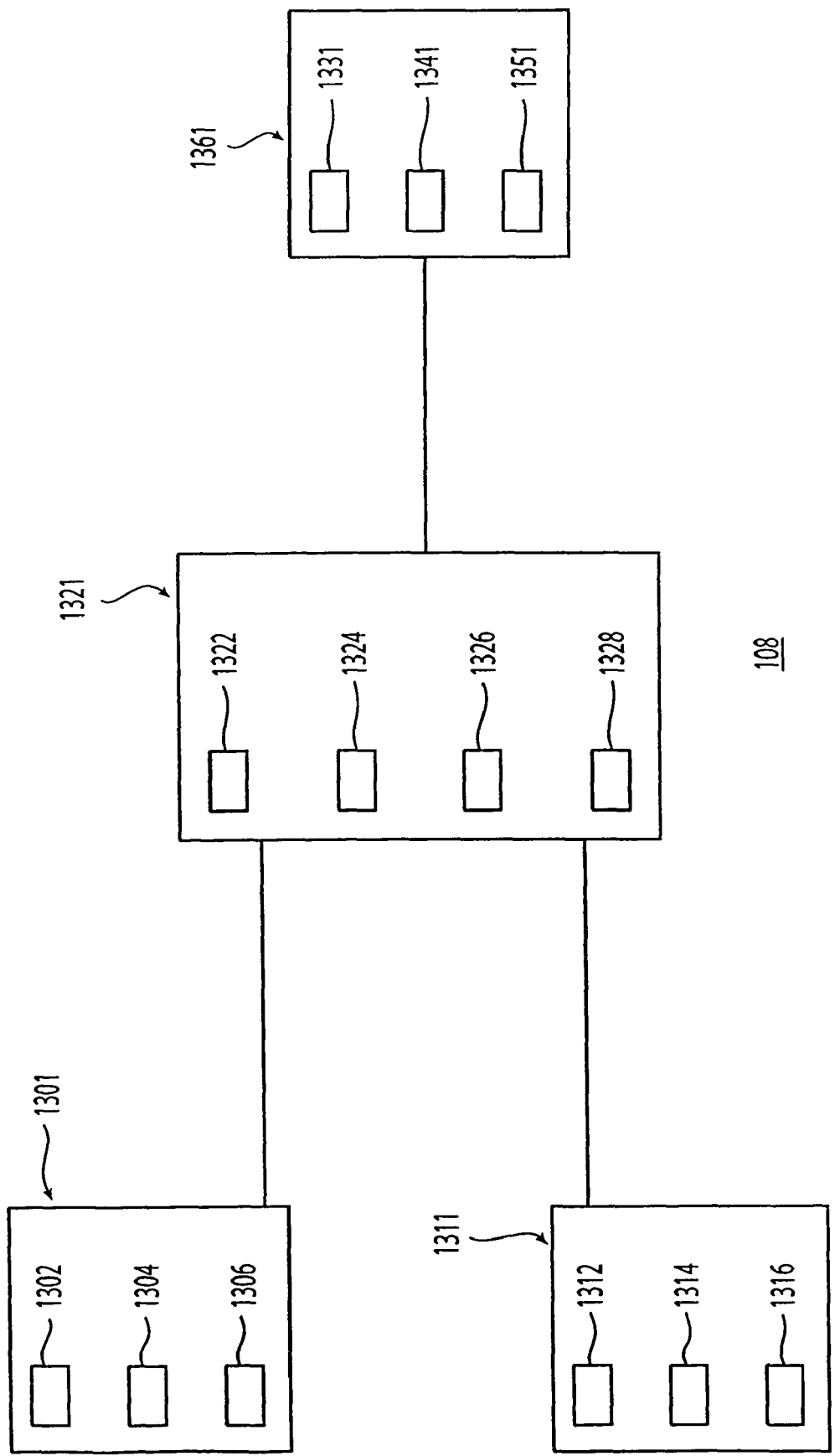
FIG. 13a provides a diagram showing the major components of the system for matching service requests with service offers.

FIG. 13a provides a diagram showing the major components of the proposed automated market 108 for matching service requests with service offers. The automated market 108 includes a producer communication system 1301, through which prospective producers communicate their requests, a service provider communication system 111, through which prospective service providers communicate their offers, a central hub 1321, which communicates with the producer communication system 1301 and the service provider communication system 111 to automatically gather information on the preferences associated with the requests and offers, and a storage system 1361.

The storage system 1361 includes a request weighting system 1331, an offer weighting system 1341, and a pricing system 1351. The request weighting system 1331 stores the weighting factors to analyze the preferences associated with a request. Similarly, the offer weighting system 1341 stores the weighting factors to analyze the preferences associated with an offer. All the weighting factors can be updated in response to the changes in the industry. The pricing system 1351 keeps the formula that is used in calculating the price of a service. The formula can also be updated in response to the changes in the industry.

The producer communication system 1301 elicits information from producers by transmitting "request fill-out forms" to a plurality of computer terminals 102. The terminals 1302 display these forms to producers, thereby instructing producers to supply information about their requests. Preferably, the format of the request fill-out forms is specified with the HyperText Markup Language (HTML).

The request fill-out forms displayed at terminals 1302 ask a producer to supply information regarding the preferences associated with a request. For example, a producer might have some volume of product at point A (whose shipment has not yet been contracted), and be able to make money by moving it to points B, E, or F. The preferences would contain, but would not be limited to, the following data:
1. Material type (with check boxes for special handling requirements);
2. Maximum total volume available at point A;
3. Minimum volume to ship from point A;
4. Earliest pickup time from point A (Later, this could be specified as a list of times and volumes available at those times.)
5. For each destination (B, E, F):
   a) Minimum worthwhile volume to that destination;
   b) Maximize volume to that destination;
   c) Latest delivery time for that destination (Again, this could be specified as a list of acceptable delivery times and acceptable volume ranges.)

In addition, the producer would specify the maximum price acceptable for any of the combinations of transportation services that meet the requirements above. Producer prices can be entered as mathematical formulas which depend on several factors, for example:
1. Volume to ship to each destination;
2. Weight to ship to each destination;
3. Pickup time;
4. Delivery time.

The producer communication system 1301 includes a quality controller 1304, which processes the data to ensure date continuity, destination validity, and miscellaneous data accuracy. For example, when a producer inputs departure and arrival dates for a requested shipment, the controller compares the departure date with the arrival date to assure that the producer did not mistakenly specify an arrival date which is prior to the departure date.

The producer communication system 1301 also includes a request locker 1306. After gathering information from a producer, the request locker 1306 sends a request summary review to terminals 1302 for display to the producer. The request summary review provides a summary of all request preferences, including dates, times, destinations, and the maximum price. The producer can modify the request. Once the producer confirms the request, the request locker 1306 activates the request and sends it to the central hub 1321 to prepare for finding a match.

The service provider communication system 111 is similar in structure to the producer communication system 1301. The service provider communication system 111 elicits information from providers by transmitting "offer fill-out forms" to a plurality of computer terminals 1312. The terminals 1312 display these forms to providers, thereby instructing providers to supply information about their offers. Similarly, the format of the offer fill-out forms is preferably specified with HTML.

The offer fill-out forms displayed at terminals 1312 ask a provider to supply information regarding the preferences associated with an offer. For example, a provider would likely specify vehicle capabilities, including volume, weight, special handling capabilities, and state of cleanliness. Also, the provider would specify the time and location to start. When a particular vehicle has prescheduled obligation, the provider would need to specify the time and location the vehicle needs to be. The producer would specify the minimum price acceptable for a particular service. Provider prices can be entered as mathematical formulas which depend on several factors, for example:
1. Volume to ship;
2. Weight to ship;
3. Time to ship;
4. Distance to ship.

Also, when a vehicle is used on a return-route, under consideration are the incremental distance to perform the service (the distance between the place where the vehicle becomes available after satisfying a previous obligation and the place where the current service starts at) and the incremental time to perform the service.

In addition, other factors, such as the number of nights and the number and type of border crossing, could be included for the total journal, the actual shipment, or on an incremental basis.

The service provider communication system 111 includes a quality controller 1314, which processes the data to ensure date continuity, destination validity, and miscellaneous data accuracy. For example, when a provider inputs departure and arrival dates for an offered shipment, the controller compares the departure date with the arrival date to assure that the provider did not mistakenly specify an arrival date which is prior to the departure date.

The service provider communication system 111 also includes an offer locker 1316. After gathering information from a provider, the offer locker 1316 sends an offer summary review to terminals 1312 for display to the provider. The offer summary review provides a summary of all offer preferences, including dates, times, destinations, and the minimum price. The provider can modify the offer. Once the provider confirms the offer, the offer locker 1316 activates the offer and sends it to the central hub 1321 to find a match with a request.

The central hub 1321 includes a request ranking system 1322, an offer selecting system 1324, a matching system 1326, and a contracting system 128. The request ranking system 1322 collects and prioritizes requests by examining the preferences associated with each of the requests against the criteria stored in the request weighting system 1331. The most important criterion may be the maximum price specified in the request. For example, in requesting an identical service, the request with the highest maximum price may receive the highest priority. The maximum price can be defined in terms of price per truck-mile. In this case, the primary ranking criteria, listed in decreasing importance, may be:
1. Price per truck-mile (the higher the price, the higher the priority;)
2. Route length (the longer the length, the higher the priority;) and
3. Time of request submission (the earlier the time, the higher the priority.)

After the examination, the request ranking system 1322 constructs a prioritized list of requests, with the request with the highest priority listed first and the request with the lowest priority listed last. Each request is attempted a match in the order of the priority, starting from the request with the highest priority.

The offer selecting system 1324 collects offers. For a particular request, the offer selecting system 1324 identifies all available offers which satisfy the preferences associated with the request. The availability of an offer includes a list of factors. For example, once being matched with a request, an offer becomes unavailable to other requests. Also, if the minimum price specified in an offer is higher than the maximum price specified in the request, the offer does not satisfy the preferences of the request and is therefore not available for the request.

The matching system 1326 prioritizes the available offers that have been identified to satisfy the preferences of the particular request by examining the preferences associated with each of these offers against several criteria stored in the offer weighting system 1341. The most important criterion may be the minimum price specified in the offer. For example, in offering an identical service, the offer with the lowest minimum price in the preferences may receive the highest priority. The minimum price can be defined in terms of price per truck-mile. In this case, the primary ranking criteria, listed in decreasing importance, may be:
1. Price per truck-mile (the lower the price, the higher the priority;)
2. Route length (the longer the length, the higher the priority;) and
3. Time of request submission (the earlier the time, the higher the priority.)

After examining these offers, the matching system 1326 finds the offer with the highest priority and matches the offer with the particular request. For each matched pair of offer and request, the corresponding provider and producer are contractually bound. The providers and producers who fail to find a match for their offers and requests for the particular clearing time are released of any contractual obligations. They can delete their requests and offers from the system, or they can save and store in the system their requests and offers, which can be used, after necessary modification, for a later clearing time. After being matched with a request, an offer is no longer available for other requests.

The contracting system 1328 determines the contracting price for the matched request and offer concerning the service to render. The contracting price will be set, using an algorithm specified in the pricing system 1351, at a dollar amount that is equal to, or lower than, the maximum price specified by the producer. At the same time, the dollar amount will be equal to, or higher than, the minimum price specified by the provider. The contracting price will be adjusted slightly to allow for a nominal commission for arranging the deal.

Figure 13B:
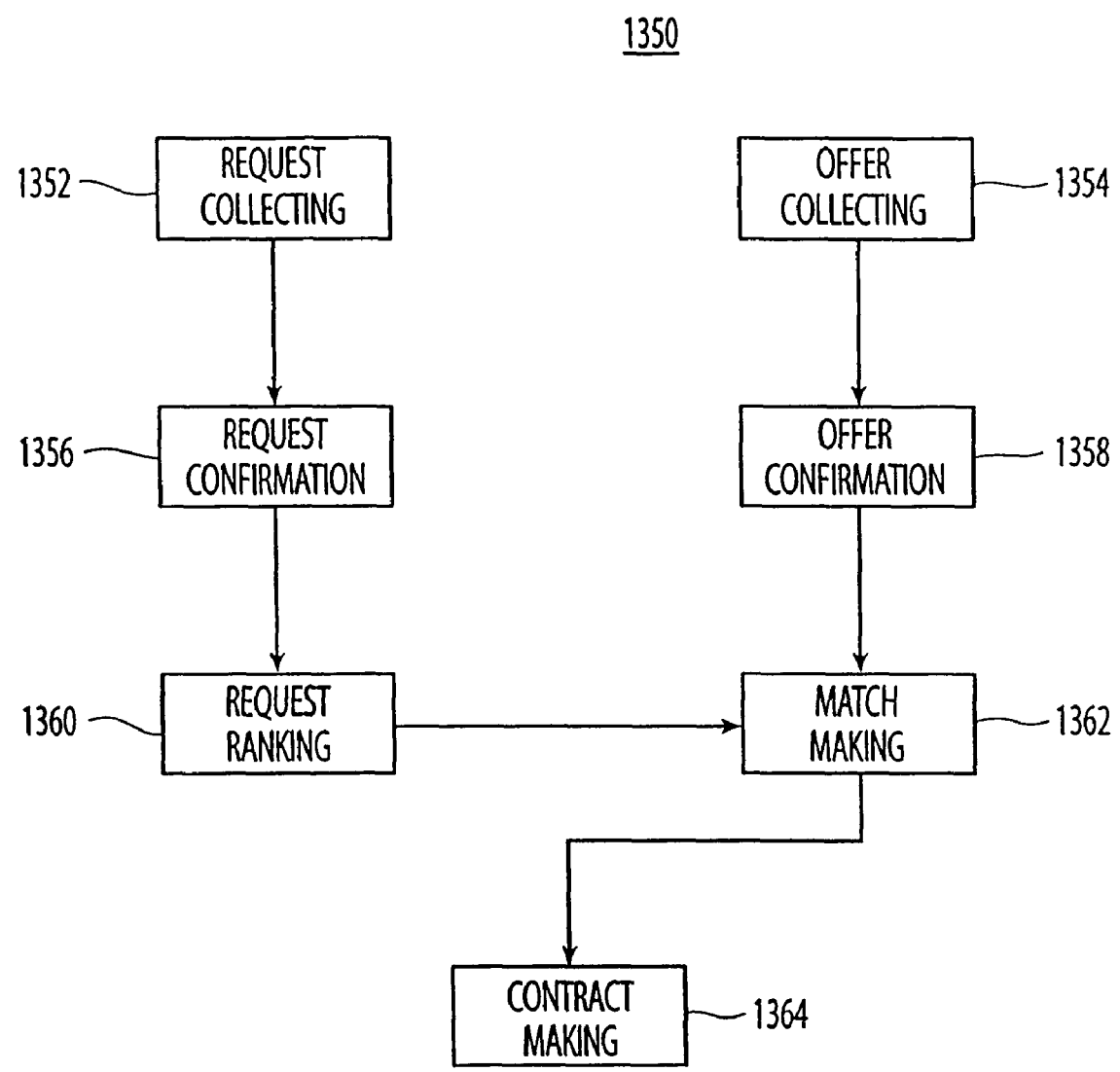
FIG. 13b provides a dataflow diagram representing the method for matching service requests with service offers.

FIG. 13b provides a dataflow diagram representing the operation of the automated market 108. When using the automated market 108, a user (a producer or a provider) must login to the system. The automated market 108 performs a user name and password verification as a condition to accessing the system.

After login by a user, the automated market 108 displays a main navigation menu. The main navigation menu includes options to submit a request and to submit an offer. The main navigation menu also includes options to view pending and past requests or offers, to modify a request or an offer, and to repeat a request or an offer. The user initiates a request or an offer submission using an appropriate link on the main navigation menu.

In step 1352, the central hub 1321 sends request fill-out forms to a terminal at the producer communication system 1301. The terminal displays these forms as preferences data collection screens. The terminal then reads the preferences data specified on the screens by the producer. The preferences data include, for example, the maximum price the producer is willing to pay, the type of the material and the amount to ship, and the time, the date and the departure and arrival locations of the service.

Similarly, in step 1354, the central hub 1321 sends offer fill-out forms to a terminal at the provider communication system 111. The terminal displays these forms as preferences data collection screens. The terminal then reads the preferences data specified on the screens by the provider. The preferences data include, for example, the minimum price the provider is willing to accept, the capabilities of the provider's vehicles, and the times, the dates and the locations the vehicles will be available.

In step 1356, the automated market 108 merges the terminals 102, the quality controller 1304, and the request locker 1306. After step 1356, the automated market 108 displays a request summary review at the producer's computer at the producer communication system 1301 for the producer to confirm. At the same time, the automated market 108 displays the errors, if any, in the request. For example, the automated market 108 would warn the producer if the arrive time specified in the request is prior to the departure time. At this point, the producer can confirm or modify the preferences associated with the request.

Similarly, in step 1358, the automated market 108 merges the terminals 1312, the quality controller 1314, and the offer locker 1316. After step 1358, the automated market 108 displays an offer summary review at the provider's computer at the provider communication system 1311 for the provider to confirm. At the same time, the automated market 108 displays the errors, if any, in the offer. For example, the automated market 108 would warn the provider if the arrive time specified in the offer is prior to the departure time. At this point, the provider can confirm or modify the preferences associated with the offer.

In step 1360, the automated market 108 merges the request ranking system 1322 and the request weighting system 1331. The automated market 108 loops through all the requests and sorts the requests into a prioritized list, with the request with the highest priority listed first and the request with the lowest priority listed last. The rating of the priority is based on the preferences associated with the request and the information stored in the producer weighting system 1331 which assign different weighting factors to different specifics in the preferences associated with the request. For example, in requesting an identical service, the request with the highest maximum price may receive the highest priority, because the maximum price is an important preference and is likely to be assigned a significant weighting factor.

In step 1362, the automated market 108 merges the offer selecting system 1324 and the offer weighting system 1341. The automated market 108 loops through the prioritized list of the requests and finds a match for each request, one at a time and in the order of the priority starting from the request with the highest priority. For each particular request, the automated market 108 identifies all available offers that satisfy the preferences associated with the particular request. The availability of an offer includes a list of factors. For example, once being matched with a request, an offer becomes unavailable to other requests. Also, if the minimum price specified in an offer is higher than the maximum price specified in the request, the offer does not satisfy the preferences of the request and is therefore not available for the request. Next, the automated market 108 calculates a priority rating score, in a loop, for each of the available offers identified to satisfy the preferences associated with the particular request. The rating of the priority is based on the preferences associated with each of the offers and the information stored in the offer weighting system 1341 which assigns different weighting factors to different specifics in the preferences associated with an offer. For example, in offering an identical service, the offer with the lowest minimum price may receive the highest priority, because the minimum price is an important preference and is likely to be assigned a significant weighting factor. The offer with the highest priority rating makes the match with the particular request.

After step 1362, the offer that has been matched with a request is no longer "available" to other match attempts. All other offers remain available for the next match attempt.

In step 1364, the automated market 108 merges the contracting system 1328 and the pricing system 1351. For the contract between the producer and provider of the matched request and offer, the automated market 108 calculates the price of the service from factors such as volume to ship, weight to ship, time to ship, and distance to ship, according to the formula stored in the pricing system 1351. The price is to be equal to, or lower than, the maximum price specified by the producer and equal to, or higher than, the minimum price specified by the provider.

Resource Allocation

The present invention further comprises a method and system to allocate resources using technologies graphs, passive and active searching, reinforcement learning, market driven decision making, reinforcement learning as well as p, tau, and patches techniques.

Without limitation, the following embodiments of the present invention are described in the illustrative context of the allocation of resources in a distributed, computing system. However, it will be apparent to persons of ordinary skill in the art that other contexts can be used to embody the aspects of the present invention. These aspects, which are applicable in a wide range of contexts include receiving a plurality of resource requests and a plurality of resource offers, determining at least one relation between the resource requests and the resource offers to identify matching resource requests and offers and allocating the resource offers to its matching resource request.

System Architecture

Figure 14:
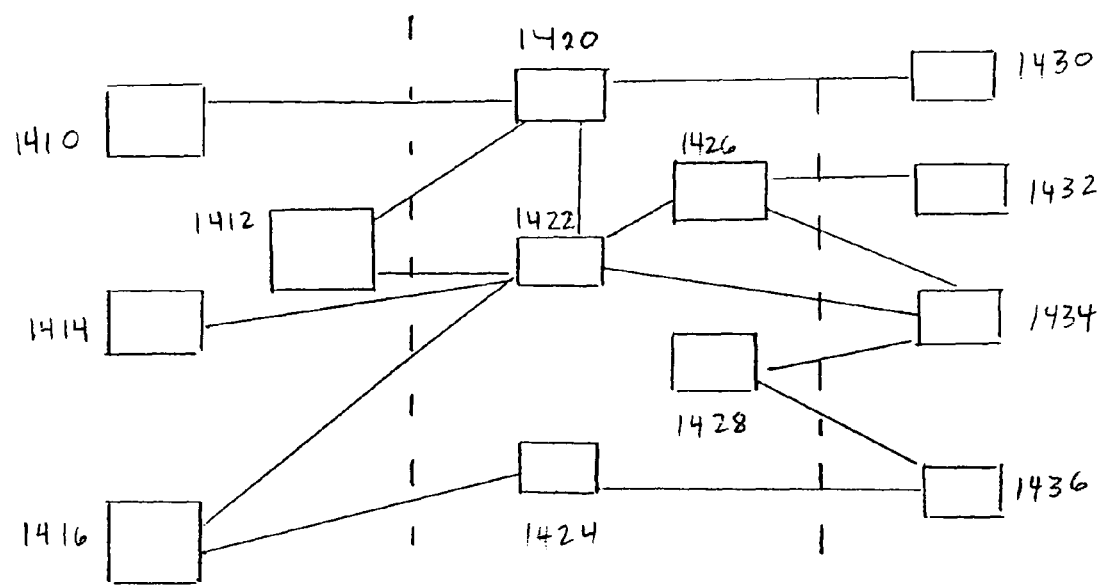
FIG. 14 shows an illustration of the architecture of the system of the present invention.

FIG. 14 shows an illustration of the architecture of the system of the present invention. The system includes resource requests 1410, 1412, 1414, 1416, which could be generated by a client application. The resource requests 1410, 1412, 1414, 1416 have one or more properties. Exemplary properties for the resource requests 1410, 1412, 1414, 1416 include identities and requirements. Exemplary properties for the resource requests 1410, 1412, 1414, 1416 further include attributes such as is-a, needs-a, has-a, uses-a, etc. Exemplary attributes for resource requests further include requirements for data, software, computational or communication resources at a specified level of quality of service.

The system of the present invention further includes resource offers 1430, 1432, 1434, 1436, which could be generated by resource providers. The resource offers 1430, 1432, 1434, 1436 have one or more properties. Exemplary properties for the resource offers 1430, 1432, 1434, 1436 include identities and abilities. Exemplary properties for the resource offers 1430, 1432, 1434, 1436 further include attributes such as is-a, has-a, needs-a, does-a, etc. Exemplary attributes for resource offers 1430, 1432, 1434 further include data, software, computational or communication resource abilities at a specified level of quality of service.

The system of the present invention further includes resource providing nodes (RPNs) 1420, 1422, 1424, 1426, 1428. The resource providing nodes 1420, 1422, 1424, 1426, 1428 communicate with resource providers 1430, 1432, 1434, 1436 and among themselves to maintain local databases of resource availability including quality of service specifications, and cost. In the preferred embodiment, the resource availability data at the resource providing nodes 1420, 1422, 1424, 1426, 1428 include different levels of quality of service for different costs. Preferably, RPNs 1420, 1422, 1424, 1426, 1428 also make decisions about resource allocation on servers. These decisions may involve, but are not limited to, duplication of data or application resources, or moving data, application or license resource from one server to another.

Resource Allocation Method

Figure 15:
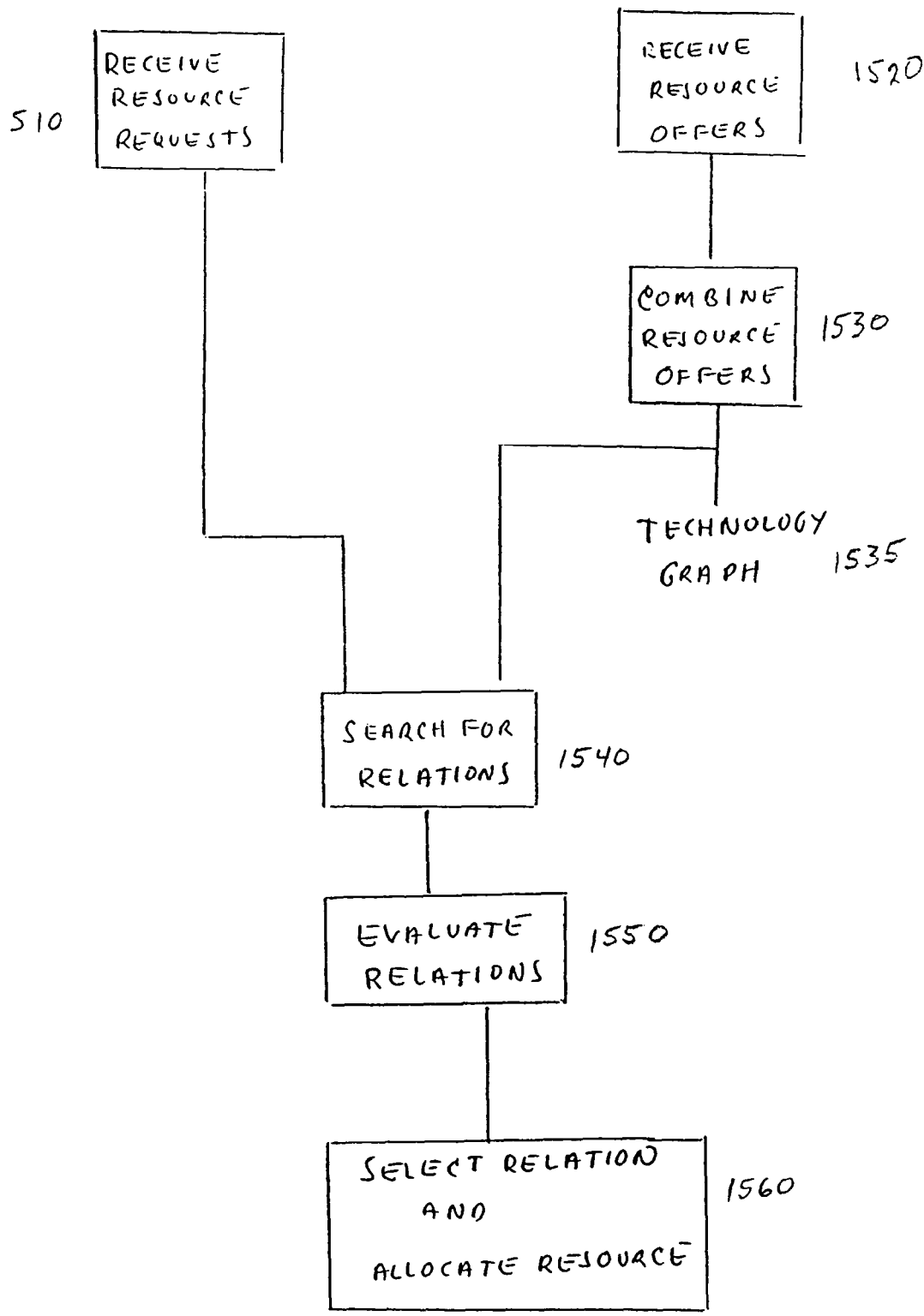
FIG. 15 provides a flow diagram describing a method executed by the resource providing nodes.

FIG. 15 provides a flow diagram describing a method 1500 executed by the resource providing nodes 1420, 1422, 1424, 1426, 1428. As is known to persons of ordinary skill in the art, a dataflow diagram is a graph whose nodes are processes and whose arcs are dataflows. See *Object Oriented Modeling and Design*, Rumbaugh, J., Prentice Hall, Inc. (1991), Chapter 1. In step 1510, the method 1500 receives resource requests 1410, 1412, 1414, 1416. In step 1520, the method 1500 receives resource offers 1430, 1432, 1434, 1436 from resource providers. In step 1530, the method 1500 combines the resources offers 1430, 1432, 1434, 1436 to form new resource offer combinations. In step 1540, the method 1500 searches for relations between the resource requests 1410, 1412, 1414, 1416 and the resource offers 1410, 1412, 1414, 1416 as well as the new resource offer combinations.

In step 1550, the method 1500 evaluates the relations between the resource requests 1410, 1412, 1414, 1416 and the resource offers 1410, 1412, 1414, 1416 as well as the new resource offer combinations. In step 1560, the method selects the relations that are optimal with respect to the evaluation and allocates the selected relation's resource offer to its corresponding resource request.

Execution of step 1530 yields a technology graph 1535, which is a multigraph representation of the processes executed by the resource providing nodes 1420, 1422, 1424, 1426 and 1428 to form combinations of resources to satisfy the resource requests 1410, 1412, 1414, 1416.

Searching for Relations

In one embodiment, the method of the present invention for allocating resources searches for relations between the resource requests 1410, 1412, 1414, 1416 and the resource offers 1430, 1432, 1434, 1436 using an active search. An exemplary active search includes an ants based reinforcement learning algorithm as described in co-pending patent application Ser. No. 09/368,215, filed Aug. 4, 1999, and titled, A Method and System for Controlling Network Traffic, the contents of which are herein incorporated by reference.

In another embodiment, the method of the present invention for allocating resources searches for relations between the resource requests 1410, 1412, 1414, 1416 and the resource providers 1430, 1432, 1434, 1436 uses a passive search. An exemplary passive search includes advertisements of the resource requests 1410, 1412, 1414, 1416 by clients and advertisements of the resource offers 1430, 1432, 1434, 1436 by resource providers.

Market-Based Resource Allocation

Figure 16:
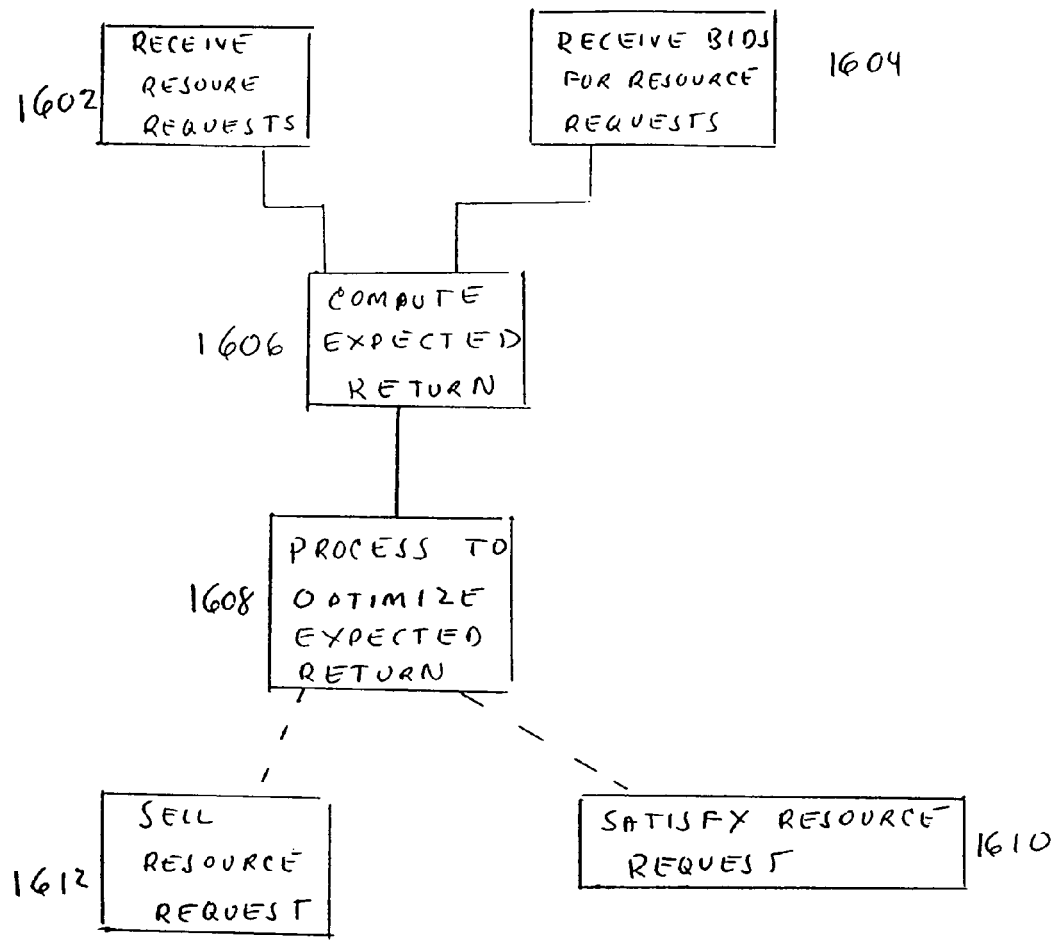
FIG. 16 displays a flow diagram of a method for allocating resources using a market-based scheme which could also execute on a resource providing node.

FIG. 16 displays a flow diagram of a method 600 for allocating resources using a market-based scheme which executes on a resource providing node 1430, 1432, 1434, 1436. In step 1602, the market-based allocation method 1600 receives resource requests 1410, 1412, 1414, 1416. In step 1604, the method 1600 receives bids for resource requests 1410, 1412, 1414, 1416 from other resource provider nodes 1420, 1422, 1424, 1426, 1428.

In the context of the market-based allocation method 1600, the resource requests 1410, 1412, 1414, 1416 include a contract to pay a specified reward for a satisfaction of the request. The resource requests 1410, 1412, 1414, 1416 further include a specified quality of service. In the preferred embodiment, the resource requests 1410, 1412, 1414, 1416 also includes a specified reward that varies with a delivered quality of service in comparison with the specified quality of service. Preferably, the specified quality of service includes a time for the satisfaction of the resource request.

The contracted amount is paid in full only if the resource request 1410, 1412, 1414, 1416, is satisfied in accordance with its specified quality of service. Preferably, a portion of the contracted amount is paid to the resource providing node 1420, 1422, 1424, 1426, 1428 that satisfied the resource request 1410, 1412, 1414, 1416 if the satisfaction was outside the specified quality of service. This portion is determined as a function of the received quality of service. Preferably, less cash is released for resource requests 1410, 1412, 1414, 1416 that are satisfied long after the specified time quality of service. Market-arbiter software calculates the cash reward earned by the satisfying resource providing node 1420, 1422, 1424, 1426, 1428 and the amount owed by the client that transmitted the resource request 1410, 1412, 1414, 1416. These rewards and bills are accumulated over time and sent out at a low frequency so as to impose only a negligible communication load on the system 1400.

The bids for resource requests 1410, 1412, 1414, 1416 from other resource providing nodes 1420, 1422, 1424, 1426 include a price that will be paid for the resource request. Optionally, the bids for resource requests 1410, 1412, 1414, 1416 could also include an expiration time or a margin. In the preferred embodiment, the bids for resource requests 1410, 1412, 1414, 1416 includes a satisfaction profile defining a satisfaction of trading the resource request as a probability density function of one or more parameters. Exemplary parameters include a quality of service.

In step 1606, the method 1600 computes an expected return for processing the resource request 1410, 1412, 1414, 1416. In step 1608, the method 1600 processes the resource request 1410, 1412, 1414, 1416 to optimize the expected return. Exemplary processing options include satisfying the resource request 1410, 1412, 1414, 1416, in step 1610 or selling the resource request 1410, 1412, 1414, 1416 to another resource processing node 1430, 1432, 1434, 1436 in step 1612.

In step 1614, the method 1600 transmits bids for the resource requests 1410, 1412, 1414, 1416 to other resource provider nodes 1430, 1432, 1434, 1436.

Each resource providing node 1430, 1432, 1434, 1436 acts autonomously to optimize the value of some function combining its own expected return and that of some (zero or more) selected neighbors (not necessarily immediate topological neighbors) as explained more fully below. The expected return is based on its earnings from satisfying or selling resources requests 1410, 1412, 1414, 1416. Optionally, resource providing nodes 1430, 1432, 1434, 1436 learn to optimize their expected return using reinforcement learning. An exemplary reinforcement learning technique is Q-learning.

Resource providing nodes 1420, 1422, 1424, 1426, 1428 receive feedback about their performance. This feedback is called a reward. However, in the reinforcement learning framework of the present invention, a resource providing nodes 1420, 1422, 1424, 1426, 1428 does not merely act to optimize its immediate reward. Instead, it acts to optimize its return. In the preferred embodiment, the return includes an expected future reward that is discounted to present value. As mentioned earlier, reward is based on "earnings" in a resource market called the market-based reward framework.

When reinforcement learning is used to adjust the behavior of resource providing nodes 1420, 1422, 1424, 1426, 1428, instantaneous rewards are based on the actual cash profit of the resource providing nodes 1420, 1422, 1424, 1426, 1428 and optionally, the cash profit of neighboring resource providing nodes 1420, 1422, 1424, 1426, 1428 (not necessarily topological neighbors) over some short past time period. Optionally, in order to prevent resource providing nodes 1420, 1422, 1424, 1426, 1428 from charging arbitrary prices in monopoly situations, excess profit can be removed (taxed) from those resource providing nodes 1420, 1422, 1424, 1426, 1428 whose long-term discounted expected reward exceeds a predefined target.

Each resource providing node 1420, 1422, 1424, 1426, 1428 communicates "bids" that specify how much it will pay for resource requests 1410, 1412, 1414, 1416 having a particular specified quality of service, and a specified reward to other resource providing nodes 1420, 1422, 1424, 1426, 1428. Preferably, each resource providing nodes 1420, 1422, 1424, 1426, 1428 communicates the "bids" to its topologically neighboring agents. Bids may also have an expiration time. Bids stand until they expire or until the resource providing nodes 1420, 1422, 1424, 1426, 1428 where a bid is held receives a message canceling and/or replacing the bid. Optionally, other quality of service parameters corresponding to the quality of service requirements of resource requests 1410, 1412, 1414, 1416 are included in the bids.

Resource requests 1410, 1412, 1414, 1416 that are received by a resource providing node 1420, 1422, 1424, 1426, 1428 (either from an application program at the resource providing nodes 1420, 1422, 1424, 1426, 1428, or from another resource providing nodes 1420, 1422, 1424, 1426, 1428) that do not conform to the parameters of an existing bid (e.g., insufficient contract value or too many in a given time period) do not require payment. Instead, these resource requests 1410, 1412, 1414, 1416 are owned by the resource providing nodes 1420, 1422, 1424, 1426, 1428, and may be sold.

A market-based allocation method for data routing is explained in co-pending international patent application number PCT/US00/02011, filed Jan. 28, 2000, and titled, "A Method and System for Routing Control in Communication Networks and for System Control", the contents of which are herein incorporated by reference.

Locally-Cooperative Local Reinforcement Learning

Having all resource providing nodes 1420, 1422, 1424, 126, 128 attempt to optimize their local expected return will not always result in the discovery of the globally optimum configuration as explained in "At Home in the Universe" by Stuart Kauffman, Oxford University Press, Chapter 11 in the context of an NK fitness landscape, the contents of which are herein incorporated by reference. This result occurs because actions taken by one resource providing node 1420, 1422, 1424, 1426, 1428 affects its state and possibly changes the context of the reward for its neighboring resource providing nodes 1420, 1422, 1424, 1426, 1428.

Accordingly, in the preferred embodiment the present invention utilizes combinations of the following three semi-local strategies:

patches In this technique, resource providing nodes 1420, 1422, 1424, 1426, 1428 are partitioned into disjoint subsets called patches. The patches may or may not be topologically contiguous. Within a patch, the actions of resource providing nodes 1420, 1422, 1424, 1426, 1428 are coordinated to maximize the aggregate figure of merit for the entire patch. The size and location of patches are parameters for this strategy.

p A neighborhood is defined for a resource providing nodes 1420, 1422, 1424, 1426, 1428 such that when a decision is made there, figures of merit at the current node and at a proportion p of neighboring nodes are taken into account. A neighborhood need not consist of the immediate topological neighbors of the resource providing nodes 1420, 1422, 1424, 1426, 1428.

tau Only a fraction (called tau) of the resource providing nodes 1420, 1422, 1424, 1426, 1428 make decisions that change the portions of their state that affect the reward of other resource providing nodes 1420, 1422, 1424, 1426, 1428 at the same time.

Figure 17:
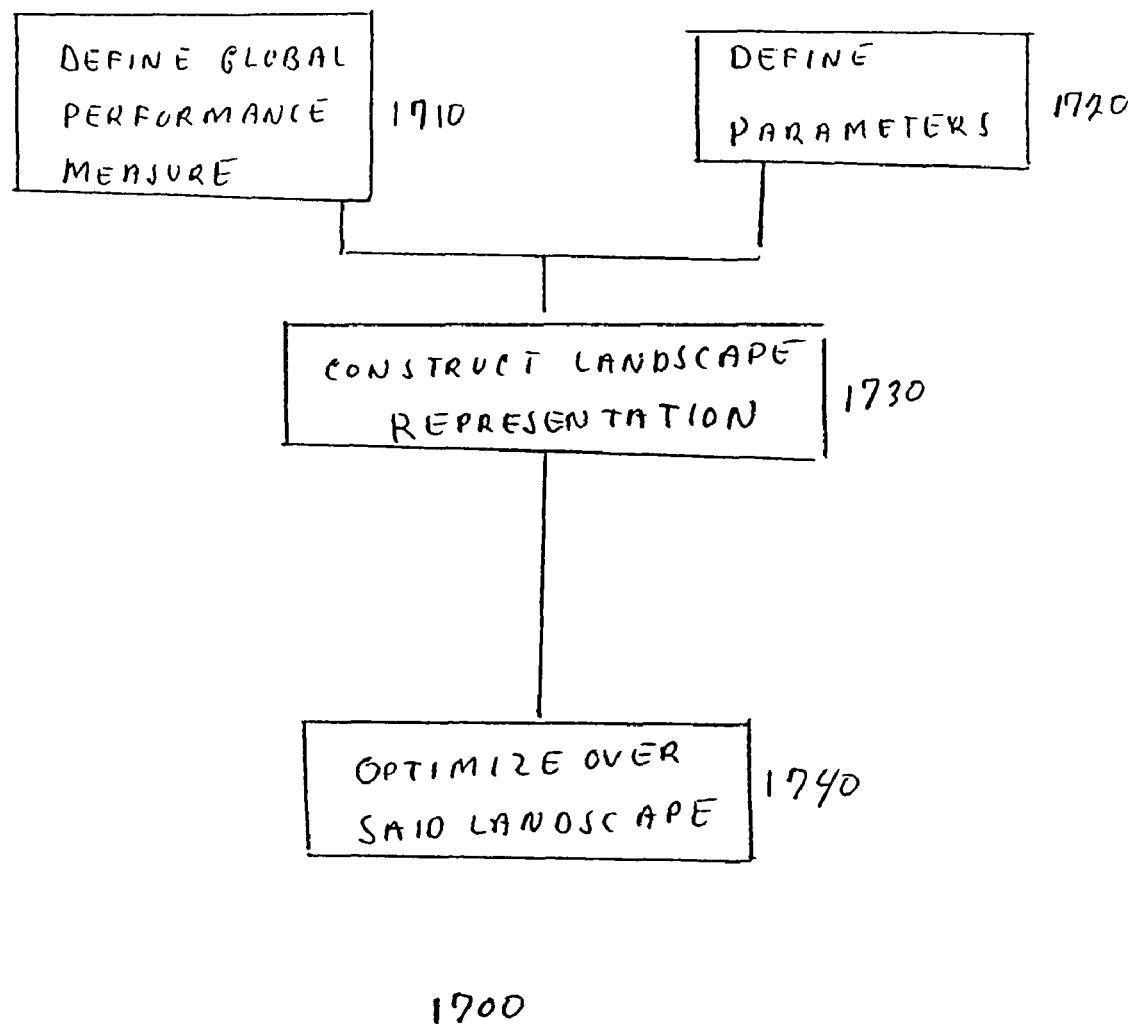
FIG. 17 provides a flow diagram for determining optimal values of parameters of methods performing resource allocation and load balancing.

FIG. 17 provides a flow diagram 1700 for determining optimal values of parameters of methods performing resource allocation and load balancing. In step 1710, the present invention defines a global performance measure for the network. In step 1720, the present invention defines an optimization algorithm having at least one parameter. Exemplary parameters include the size and location of patches, the neighborhood, p where the expected reward are considered in making a decision and the fraction, tau, of the agents that change portions of their state that affect the reward of other agents. In step 1730, the method 1700 constructs a landscape representation for values of the parameters and their associated global performance measure. In step 1740, the method optimizes over the landscape to produce optimal values for the parameters.

In the preferred embodiment, the present invention uses either patches or p or both to define a modified reward and hence, a return, for a resource providing nodes 1420, 1422, 1424, 1426, 1428 in the resource allocation problem. As explained earlier, the figure of merit for a resource providing nodes 1420, 1422, 1424, 1426, 1428 is its earnings in the market-based framework. Optionally, the present invention uses the tau strategy either alone, or in conjunction with p and "patches" to limit the opportunities resource providing nodes 1420, 1422, 1424, 1426, 1428 have for making decisions that affect the return of other resource providing nodes 1420, 1422, 1424, 1426, 1428. For example, the reward for a resource providing node 1420, 1422, 1424, 1426, 1428 is the aggregate earnings for a region of resource providing nodes 1420, 1422, 1424, 1426, 1428 (a patch) and the bids and for only a fraction tau of resource providing nodes 1420, 1422, 1424, 1426, 1428 change at the same time.

Preferably, the parameters for these strategies (the fraction p, the fraction tau and the number and membership of patches) are global in nature. In other words, the values of these parameters are the same for all resource providing nodes 1420, 1422, 1424, 1426, 1428. Alternatively, the values of the parameters may vary among the resource providing nodes 1420, 1422, 1424, 1426, 1428.

Preferably, the present invention sets these parameters as follows:

First, a global performance measure is defined. Preferably, the global performance measure is the specified quality of service in relation to the quality of service of the satisfied resource request 1410, 1412, 1414, 1416. Second, the algorithm has an outer loop that varies these parameters in order to maximize the global performance measure in accordance with techniques for searching landscapes.

Preferably, each value of the global parameters governing p, patches, tau, and reinforcement learning features, defines a point in the global parameter space. With respect to this point, the method for allocating resources of the present invention achieves a given global fitness. The distribution of global fitness values over the global parameter space constitutes a "fitness landscape" for the entire bandwidth-agent system. Such landscapes typically have many peaks of high fitness, and statistical features such as correlation lengths and other features as described in co-pending international patent application number PCT/US99/19916, titled, "A Method for Optimal Search on a Technology Landscape", the contents of which are herein incorporated by reference. In the preferred embodiment, these features are used to optimize an evolutionary search in the global parameter space to achieve values of p, patches, tau, and the internal parameters of the reinforcement learning algorithm that optimize the learning performance of the resource allocation system in a stationary environment with respect to load and other use factor distribution. Preferably, the same search procedures are also used to persistently tune the global parameters of the resource allocation system in a non-stationary environment with respect to load and other use factor distributions.

By tuning of the global parameters to optimize learning, the present invention is "self calibrating". In other words, the invention includes an outer loop in its learning procedure to optimize learning itself, where co-evolutionary learning is in turn controlled by combinations of p, patches, and tau, plus features of the reinforcement learning algorithm. The inclusion of features of fitness landscapes aids optimal search in this outer loop for global parameter values that themselves optimize learning by the resource allocation system in stationary and non-stationary environments.

Use of p, tau, or patches aids adaptive search on rugged landscapes because, each by itself, causes the evolving system to ignore some of the constraints some of the time. Judicious balancing of ignoring some of the constraints some of the time with search over the landscape optimizes the balance between "exploitation" and "exploration". In particular, without the capacity to ignore some of the constraints some of the time, adaptive systems tend to become trapped on local, very sub-optimal peaks. The capacity to ignore some of the constraints some of the time allows the total adapting system to escape badly sub-optimal peaks on the fitness landscape and thereby, enables further searching. In the preferred embodiment, the present invention tunes p, tau, or patches either alone or in conjunction with one another to find the proper balance between stubborn exploitation hill climbing and wider exploration search.

The optimal character of either tau alone or patches alone, is such that the total adaptive system is poised slightly in the ordered regime, near a phase transition between order and chaos. See e.g. "At Home in the Universe" by Kauffman, Chapters 1, 4, 5 and 11, the contents of which are herein incorporated by reference and "The Origins of Order, Stuart Kauffman, Oxford University Press, 1993, Chapters 5 and 6, the contents of which are herein incorporated by reference. For the p parameter alone, the optimal value of p is not associated with a phase transition.

Without limitation, the embodiments of the present invention are described in the illustrative context of a solution using tau, p, and patches. However, it will be apparent to persons of ordinary skill in the art that other techniques that ignore some of the constraints some of the time could be used to embody the aspect of the present invention which includes defining an algorithm having one or more parameters, defining a global performance measure, constructing a landscape representation for values of the parameters and their associated global performance value, and optimizing over the landscape to determine optimal values for the parameters. Other exemplary techniques that ignore some of the constraints some of the time include simulated annealing, or optimization at a fixed temperature. In general, the present invention employs the union of any of these means to ignore some of the constraints some of the time together with reinforcement learning to achieve good problem optimization.

Further, there are local characteristics in the adapting system itself that can be used to test locally that the system is optimizing well. In particular, with patches alone and tau alone, the optimal values of these parameters for adaptation are associated with a power law distribution of small and large avalanches of changes in the system as changes introduced at one point to improve the system unleash a cascade of changes at nearby points in the system. The present invention includes the use of local diagnostics such as a power law distribution of avalanches of change, which are measured either in terms of the size of the avalanches, or in terms of the duration of persistent changes at any single site in the network.

The present invention's use of any combination of the above strategies, together with reinforcement learning in any of its versions, give it an advantage over prior art resource allocation methods because these strategies address many problems that could arise including the following:

slow convergence to optimal allocation patterns,
oscillation of network load, and
locally beneficial but globally harmful routing patterns.

Without limitation, the embodiments of the present invention have been described in the illustrative context of a method for allocating resources. However, it is apparent to persons of ordinary skill in the art that other contexts could be used to embody the aspect of the present invention which includes defining an algorithm having one or more parameters, defining a global performance measure, constructing a landscape representation for values of the parameters and their associated global performance value, and optimizing over the landscape to determine optimal values for the parameters.

For example, the present invention could be used for operations management. The present invention, using agents to represent resources and operations in the enterprise model, coupled to reinforcement learning, p, patches and tau, is used advantageously to create a model of a learning organization that learns how to adapt well in its local environment. By use of the outer loop described above, good global parameter values for p, patches, tau, and the reinforcement learning algorithm are discovered. In turn, these values are used to help create homologous action patterns in the real organization. For example, the homologous action patters can be created by tuning the partitioning of the organization into patches, by tuning how decisions at one point in the real organization are taken with respect to a prospective benefit of a fraction p of the other points in the organization affected by the first point, and by tuning what fraction, tau, of points in the organization should try operational and other experiments to improve performance.

In addition, the distribution of contract values and rewards in the reinforcement algorithm can be used to help find good incentive structures to mediate behavior by human agents in the real organization to achieve the overall adaptive and agile performance of the real organization.

In addition to the use of the invention to find good global parameters to instantiate in the real organization, the same invention can be used to find good global parameter values to utilize in the model of the organization itself to use that model as a decision support tool, teaching tool, etc.

Further, the present invention is also applicable to portfolio management, risk management, scheduling and routing problems, logistic problems, supply chain problems and other practical problems characterized by many interacting factors.

Minimizing Values at Risk

The present invention includes techniques to minimize the value at risk of a portfolio. Value at risk is a single, summary, statistical measure of possible portfolio losses. Specifically, value at risk is a measure of losses due to "normal" market movements. Losses greater than the value at risk are suffered only with a specified small probability.

Using a probability of x percent and a holding period of t days, a portfolio's value at risk is the loss that us expected to be exceeded with a probability of only x percent during the next t-day holding period.

The technique to minimize the value at risk uses historical simulation. Historical simulation is a simple, atheoretical approach that requires relatively few assumptions about the statistical distributions of the underlying market factors. In essence, the approach involves using historical changes in market rates and prices to construct a distribution of potential future portfolio profits and losses, and then reading off the value at risk as the loss that is exceeded only x percent of the time.

The distribution of profits and losses is constructed by taking the current portfolio, and subjecting it to the actual changes in the market factors experienced during each of the last N periods. That is, N sets of hypothetical market factors are constructed using their current values and the changes experienced during the last N periods. Using these hypothetical values of market factors, N hypothetical mark-to-market portfolio values are computed. From this, it is possible to compute N hypothetical mark-to-market profits and losses on the portfolio.

The following discussion describes the technique for isolating low value at risk portfolios. Let us consider a single instrument portfolio, in this case stocks traded on the New York Stock Exchange and Nasdaq markets. For this instrument, there exists tremendous amounts of data. If we assume a one day time horizon (t=1), then the data we are interested in are the daily closing prices of every publicly traded stock on the two markets. Such data exists for thousands of stocks for tens of thousands of days. From these data, it is possible to construct an m×n matrix (where m is the number of stocks, and n is the number of days) of prices.

Let us assume that within this collection of stocks, there are pairs, triplets, quadruplets, etc., of stocks whose values at risk are lower as a group than any of the stocks individually. This occurs because sets of stocks whose price changes are anti-correlated will have low values at risk. When the price of one stock goes down, the price of the other tends to go up. The chance that both stocks go down together is lower than the chance that two stocks chosen at r~random would go down together because the stocks are anti-correlated. This reduces value at risk.

The optimal portfolio would group anti-correlated stocks in the optimal proportions to minimize value at risk. Because there are so many stocks, however, the space of all possible portfolios is too large to search exhaustively. Genetic algorithms are well suited to finding good solutions to just this type of problem in reasonable amounts of time.

The algorithm works as follows:

Step 1:

Start with m portfolios. Each portfolio can be represented as a vector of length m. Each bit ($m_i$) in the vector is either a 1 or a 0 signifying that the $i^{th}$ stock is either included or excluded from the portfolio. This can later be extended to letting each bit specify the number of shares held rather than simply inclusion or exclusion. To each portfolio, assign a random number of stocks to hold such that every possible portfolio size is covered (at least one portfolio excludes all but one stock, at least one portfolio excludes all but two stocks, . . . at least one portfolio includes all the stocks). Once the number of stocks to hold has been assigned, let each portfolio randomly pick stocks until it has reached its quota.

Step 2:

Go back in time n/2 days (halfway through the data). For each of the m portfolios, compute the value at risk for the n12 days that precede the halfway point.

Step 3:

Randomly pair portfolios. For each pair of portfolios, let the portfolio with the higher value at risk copy half of the bits of the lower value at risk portfolio (i.e. randomly select half of the bits in the more successful portfolio. If a bit is different, the less successful portfolio changes its bit to match the more successful portfolio). The portfolio with the lower value at risk remains unchanged.

Step 4:

Repeat steps 2 and 3 until some threshold for value at risk is achieved.

In this way, clusters of anti-correlated stocks will tend to spread through the population of portfolios. The hope is that this method will ultimately select for most or all of the good clusters. Notice that this method may also alight upon the optimal number of stocks to hold in a portfolio. For example, if the minimum value at risk portfolio contains only three stocks, three-stock portfolios will tend to propagate through the population.

Additional Techniques for the Analysis of Risk

The present invention includes additional techniques for the analysis of risk. The general understanding of portfolio risk requires an understanding of three contributing problems. The current understanding of these three problems is insufficient to accommodate the challenges posed by modem portfolios. The first problem is volatility. It has long been known that Gaussian approximations to volatility do not correctly describe the behavior of markets, and that price fluctuations show long tails. This means that large deviations are much more likely than conventional theory suggests. The second issue is that of interdependence. In many areas of interest, elements of a portfolio do not move independently of each other, but rather influence each other in ways both subtle and complex. Current methods only uncover a minimal rendering of this complex structure. The third issue is that of time dependence. Many portfolios contain elements that do not mature on the same time scale, but are nonetheless dependent. Again, conventional portfolio analysis and optimization techniques do not address the subtleties of interacting time scales.

It was originally pointed out by Mandelbrot in 1961 that price fluctuations in speculative markets follow a particular class of fat-tailed (relative to Gaussian) distribution known as a Lévy distributions. Levy distributions can be created by correlated random walks, and have been studied in statistical physics under the rubric of anomalous diffusion. In the last two years, these distributions have been revisited in the area of option pricing, but not yet in the area of portfolio management. Since Lévy price fluctuations do not add together in the same way as Gaussian fluctuations, results for expected portfolio risk and associated volatility will in general be different. The present invention incorporates an underlying Levy model of volatility for portfolio risk analysis which accounts for the different additivity characteristic.

In the construction of portfolios, it is experimentally known that the prices of certain stocks are correlated, and this correlation is typically measured using a covariance matrix. The covariance matrix has two implicit assumptions which we believe are wrong: Fluctuations in prices are Gaussian (see above) and correlations between stocks are describable with pair-wise interactions.

The present invention modifies this approach in two ways:
1. The covariance matrix requires a large amount of data for accurate results. Extending the covariance matrix method to higher order interactions (three- or four-point interactions) requires an exponentially increasing amount of data. We separate the analysis of interdependence into effect and magnitude. The effect aspect is obtained by encoding price fluctuations as (+,−) instead of numerical values. Now we have prices encoded as binary strings instead of numerical sequences. Since the fundamental activities of a market are buying and selling, and their attendant effects are the raising and lowering of prices, we believe that the binary encoding is a more fundamental signature of market microstructure than the actual prices. The magnitude of gains and losses are obtained by the statistics of large numbers of players making "atomic" buy and sell decisions.

Once we have encoded the market dynamics of individual instruments as bit strings, we have essentially a telegraph representation of information. This is amenable to the tools of information theory, a field developed to analyze the dynamics of information transfer in telephony. Information theory allows us to measure correlations at arbitrary levels of interconnectedness, and although the data requirements scale exponentially as interconnectedness increases, the constant in front of the exponent is much smaller than the covariance case because of the binary nature of the data. Interconnectedness is measured by a quantity called mutual information, and the assumptions associated with it are less stringent than the assumptions required to measure covariance, and in particular are not dependent on the assumption of a normal distribution.

2. The present invention uses the measure of mutual information to construct a phylogeny of interdependence, using the technique of minimal spanning trees coupled with higher order information correlations to remove degeneracies. (multiple solutions satisfying the same constraints) Once we have constructed a phylogeny (a tinkertoy like structure showing connections of influence), we can use time-structured data to obtain directions of influence. This directed map allows us to model the propagation of financial disturbance through a web of connections. This is an important tool for constructing a portfolio of minimum risk, because it decomposes portfolio risk into an ensemble of interconnected contributing factors which can then be optimized to obtain the desired results.

Note: The connections discussed above can be endogenously or exogenously generated. If the portfolio in question consists of internal assets, (R&D portfolio, for instance) there is some control as to the degree and nature of the interconnection. Hence the optimization procedure is somewhat different, as the interconnections are no longer viewed as given but are now variables over which we have some control.

In many areas of interest, different time scales are an important consideration. Examples include bonds with different dates of maturity, and internal portfolios with different payback profiles. Optimizing over such portfolios requires understanding the spectrum of possible paths that a portfolio can take over time, and again interdependencies and large fluctuations make standard approximations of Gaussian uncertainties inaccurate. The present invention uses techniques borrowed from non-standard statistics (large deviation theory, sampling theory) and quantum field theory (path integrals) to generate a forward curve of the behavior of a complex portfolio over time. Not only is the end result important, but the shape of the curve over time is important, as there are many quantities of interest which are dependent on the local shape of the curve.

Evaluating and Minimizing Risk

The present invention includes additional techniques for portfolio optimization using sampling and selection to evaluate and minimize risk for a portfolio of assets with uncertain returns. Consider the general setting in which a holder owns portfolio of assets. The assets may be financial instruments (such as stocks, bonds, options, or other derivatives) or investments in research and development with unknown future payoffs (e.g. the drug leads pursued by a pharmaceutical company). In this setting, where the future rewards are uncertain, there are two important concerns of the holder of the portfolio. Firstly, it is important to quantify the risk (the amount of money that could be lost) over some time horizon. Secondly, the holder wishes to structure the portfolio so as to minimize the risk. In this document we will focus on answering these questions for portfolios of financial instruments but the ideas are more generally applicable.

Let $x_i(t)$ represent the value at time t of the ith asset in the portfolio. If there are N assets in the portfolio let x(t) be the N-vector representing the values at time of all components of the entire portfolio. The value of the entire port folio to the holder is specified as some function f(x) of the values of the assets. Typically, this function might lie a linear combination of the asset volumes times the asset prices.

i.e. $f(x) = \sum_{i=1}^{N} v_i x_i$.

Furthermore let P(x', t'|x, t) represent the probability that the asset prices are x' at time t'>t given that the asset prices were x at time t. If t indicates the present time and x represents the present value of the assets then the expected value of the portfolio at some time t' in the future is $V(t'|x,t) = \int dx' f(x') P(x',t'|x,t)$.

This value indicates the expected worth of the portfolio but does nothing to tell us what the risk is, i.e. what we might conceivably lose. To get at this quantity we realize that from P(x', t'|x, t) we can also determine the probability P(v|t) that the value at rime t is v:

$P(v|t) = \int dx' \sigma(v' - f(x')) P(x'|x,t)$.

This probability is the fundamental quantity which allows us to assess risk since it gives the probabilities for all potential outcomes. Thus for example we can say things like "with 95% confidence the most money that will be lost, is v*." In this case v* is determined from the requirement that only 5% of the time will more money be lost, i.e.

$\int_{-\infty}^{v^*} dv P(v|t) = 0.05$.

Other measures of risk are similarly based on P(v|t)

The risk will depend sensitively on the precise form of P(x', t'|x, t). To see this, imagine that a pair of assets i and j are anti-correlated with each other (i.e. when the price $x_i$ increases the price $x_j$ usually decreases). If we invest equally in both stocks then the risk will be small since if the value of one stock goes down the other compensates by going up. On the other hand if the price movements of assets are strongly correlated then risks are amplified. To evaluate and manage risk it then becomes paramount to identify set of assets that are correlated/anti-correlated with each other. This observation forms the basis of traditional value at risk analyses (VaR) in which the risk is assessed in terms of the covariance matrix in asset prices. The covariance matrix includes all the possible pairwise correlations between assets.

While traditional VaR captures pairwise variations in asset prices it completely ignores higher order relationships between variables, e.g. when assets i and j go up asset k goes down. Moreover the Gaussian assumption inherent in VaR is known to be false. What is needed is a more general approach. The present invention describes new risk management techniques which move beyond pairwise VaR. We propose two methods by which this can be accomplished.

The core of the new ideas is to recognize that information about higher order relationships can be uncovered by looking at the VaR of subsets of assets from the portfolio.

Imagine for a moment that a specific set of assets covaries with each other in some predictable way. Knowledge of this co-variation can be used to devise a risk averse combination of these particular stocks. Since the variation involves all four stocks it can never be determined by only looking at pairs of assets. How might important, clusters of stocks like these be discovered?

The first point to note is that the historical record of asset prices and portfolio values provides a training set from which we can discover these clusters of stocks. The historical record provides a data set which includes the true VaR because the future value of the portfolio is known from the historical data. Let v represent the true VaR for a particular portfolio x at a point T into the future. From the historical record we can form the data set $D = \{x_i, v_i\}$ and thus estimate the VaR for the assets in the chosen portfolio, i.e. P(v|x). If we assume that the stochastic process that generated D is stationary then the same relationship discovered in D will also hold in the future. Once the mapping from a set of stocks to a VaR has been determined we can search over subsets of stocks to find a combination that gives particularly low VaR.

We begin by making the simple assumption that $P(v|x) = \delta(v - \mu(x))$, i.e., it is characterized entirely by its mean value $\mu(x)$. This mean value will differ for different subsets of stocks. Without much additional complication we could also include the variance around this mean and assume that fluctuations around the mean are Gaussian: $P(v|x)=N(\mu(x),\sigma^2(x))$. Obviously from the data D we could try to infer much more complicated relationships but for the moment we stick with simple case.

Given that we can determine the true average VaR for any set of stocks we can identify those assets within a portfolio of N assets that form good combinations. Computationally the following scheme can be used to identify good subsets of assets. We assume that the optimal subset of assets is of size $n \ll N$. Starting from the original portfolio randomly form portfolios of half the size by sampling stocks (without replacement) from the entire portfolio. The probability that any one of these randomly generated profiles contains all n assets is approximately $1/2^n$. Thus as we examine significantly more random portfolios than this it is likely we will obtain at least one subset containing all n assets. For each of the randomly generated portfolios of N/2 assets we determine its VaR by calculating it from D and keep those portfolios with high VaR. In this way we filter out only the most promising portfolios, i.e. those that contain the subset that we are seeking. This process can then be iterated further. From these remaining portfolios of size N/2 we randomly generate make portfolios of half the size (no N/4). Assuming that, at least one of the size N/2 portfolios contained the desired cluster the probability that one of the size N/4 portfolios contains the full subset, is again $1/2^N$. We can keep iterating this process of generating and filtering portfolios and each time come closer to good subsets of stocks.

After m iterations of this procedure the portfolio size is $N/2^m$. Let $\overline{m}$ be the largest value of m such that $N/2^m \geq n$ (i.e., the largest portfolio that contain all n assets) and let $\underline{m}=\overline{m}+1$. If our hypothesis is correct then we should see an abrupt increase in the VaR from $\overline{m}$ to $\underline{m}$ since we can no longer form a risk averse combination of all the n assets at $\underline{m}$. This fact alerts us to the important fact that n must lie between $N/2^{\underline{m}}$ and $N/2^{\overline{m}}$. At this point we can then sample from the portfolio of size $N/2^{\overline{m}}$ to form new portfolios of size $(N/2^{\underline{m}}+N/2^{\overline{m}})/2$. The external VaR values of these new portfolios will either be comparably to the $N/2^{\overline{m}}$ in which case $(N/2^{\underline{m}}+N/2^{\overline{m}})/2 \leq n \leq N/2^{\overline{m}}$ or comparable to $N/2^{\underline{m}}$ in which case $N/2^{\underline{m}} \leq n \leq (N/2^{\underline{m}}+N/2^{\overline{m}})/2$. Iterating this procedure we can determine the optimal subset size n. Knowing the optimal n we can look at many different subsets of this size to eventually pick out the precise combination of the n assets.

Figure 18:
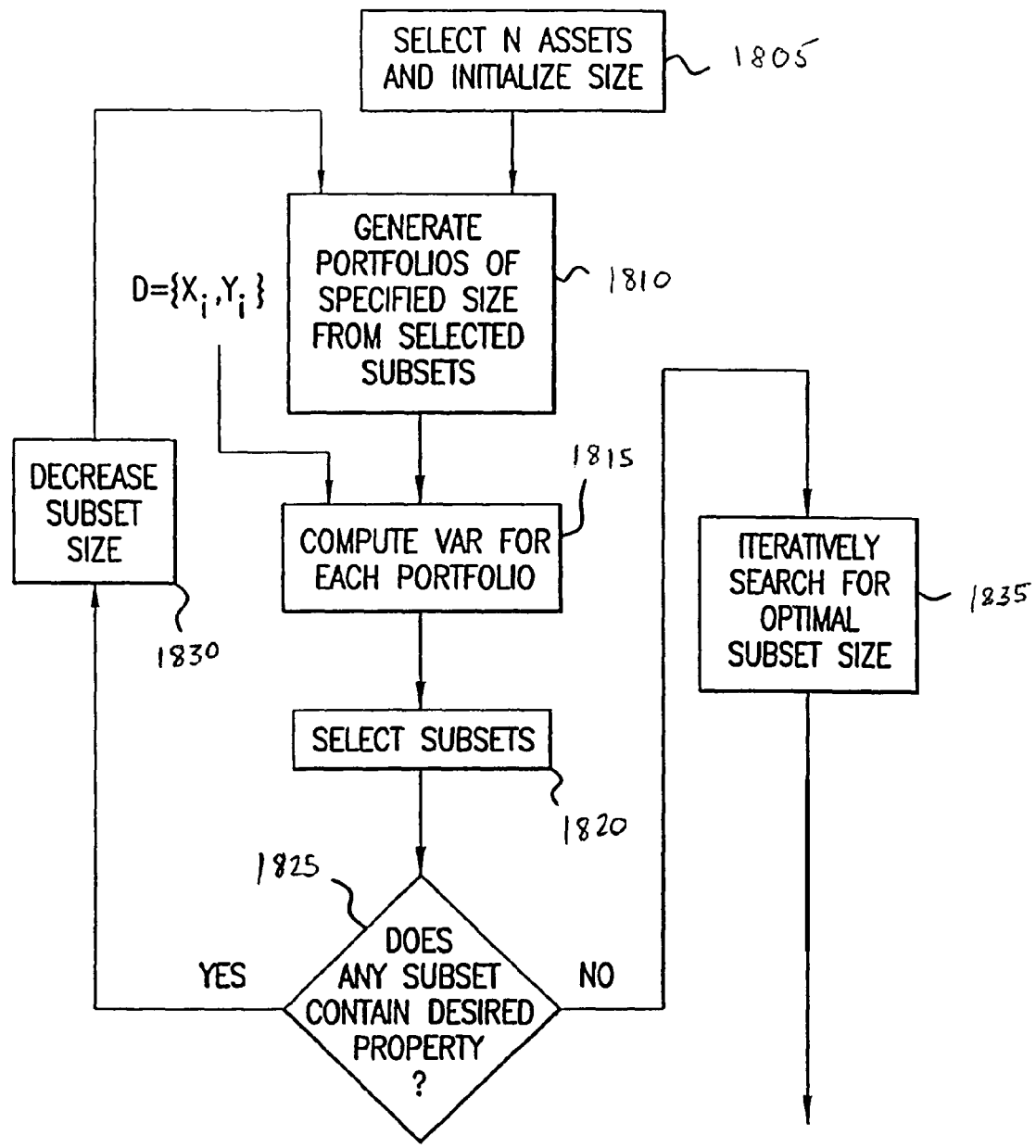
FIG. 18 provides a flow diagram of a method for evaluating and minimizing risk.

FIG. 18 provides a flow diagram of a method for evaluating and minimizing risk. In step 1805, the method selects N assets and initializes the portfolio size. In step 1810, the method generates portfolios of the specified size from the selected subsets. On the first iteration of the loop, the selected subset will be the set of N assets. In step 1815, the method computes the value at risk for each portfolio generated in step 1810. In step 1820, the method selects the optimal portfolios (subsets) from those generated by step 1810.

In step 1825, the method determine whether any portfolio contains the desired properties. If at least one portfolio contains the desired properties, control proceeds to step 1830. In step 1830, the method decreases the subset size before generating new portfolios in step 1810 in the next iteration of the loop. If the method determines in step 1825 that no portfolio contains the desired properties, control proceeds to step 1835. In step 1835, the method iteratively searches for an optimal subset size.

There are many variations to this basic method that might improve its efficiency. It may not be optimal to halve the portfolio size at each step since we might want to have a higher probability of retaining the subset intact. The best number of random portfolios to generate and test can also be fine-tuned to make the search more efficient. Simple analytical model can be built to optimize these algorithm parameters.

Another important extension is to realize that the sample and select method outlined above can be used to determine subsets with any desired properties. Nothing in the above procedure restricts its use to minimize VaR. The method can be used to extremize any figure of merit. Along these lines what happens in practice is that there are actually more than one objective in designing a portfolio: we want to minimize risk but also maximize a profit. Is there a way of modifying the above procedure to account for more than a single objective? At the very least we must be able to balance risk/reward the way it is conventionally done.

There is however a very simple extension of the above method to handle the case of multiple objectives. Sub-sampled portfolios are generated as usually but the selection criteria amongst portfolios is modified. Now Instead of picking sub-sampled portfolios which have the best VaRs we measure a number of objectives for each of the particular sub-sampled portfolio and keep those sub-sampled portfolios which Pareto dominate all other portfolios (generated at the present iteration or all previously generated portfolios). With this simple change in the selection criteria everything else proceeds the same way. At the end of the process we obtain a subset which is hopefully good on all objectives.

There are also a host of issues involving sampling to form the new portfolios. In the above I have assumed that the sampling is uniform. Of course this need not be the case. The distribution can be altered over time (much as in boosting) based on the VaR (or distributions over VaR) over previous samples. This also ties into pooling in that the samples may be constructed in a much more deterministic fashion.

There are also a number of possible extensions based upon the fact that the mapping from the asset subset can be determined. At this point it remains unclear how to exploit this fact. The basic procedure might also have to be modified slightly to fit the context.

One of the main difficulties of the procedure may occur in the initial phases of the algorithm. Initially we must filter out subsets that contain the desired small subset. There arises the signal/noise ratio issue on whether the small optimal subset can be detected in the larger portfolio. An estimate of this would be useful to know how many subset samples to generate. This has been tested and the results will be discussed below.

In order to test the algorithm, a random number generator was used to create a "toy" set of stock data in which all of the clusters were known a priori.

Figure 19:
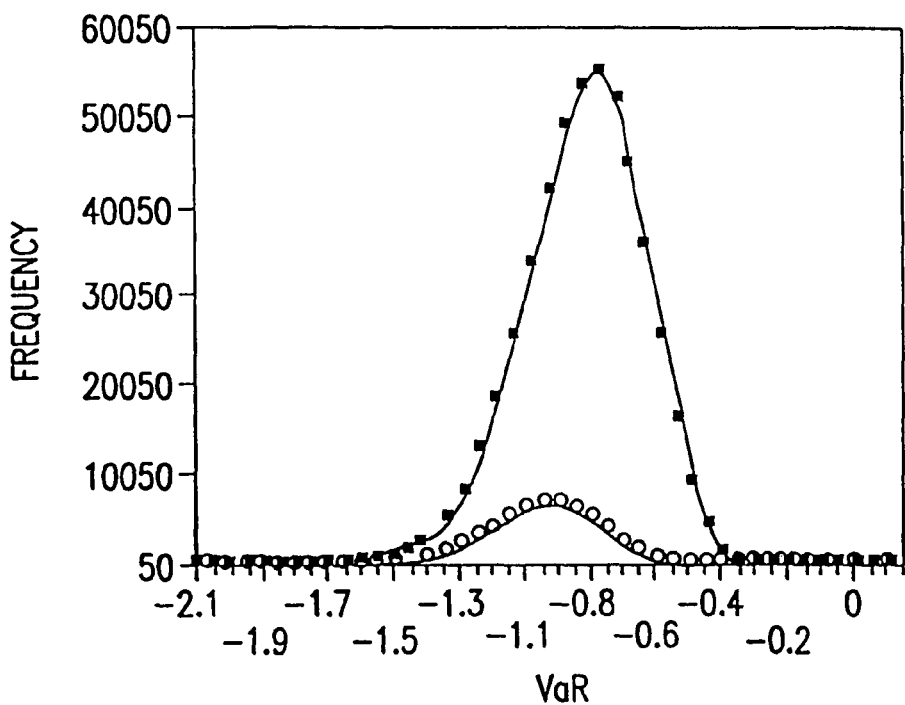
FIG. 19 provides the results of the method for evaluating and minimizing risk from executing on 500,000 random draws from this "toy" world.

FIG. 19 provides the results of the method for evaluating and minimizing risk from executing on 500,000 random draws from this "toy" world. The world consists of 32 stocks in which an investor may invest. The solid square plot is a histogram of VaRs for portfolios which include exactly 16 stocks. The mean VaR for these portfolios is −0.96 (where negative means the investor loses money). The smaller histogram of hollow circles shows the VaRs only for those portfolios which, through random sampling, failed to include any of the good clusters. The mean for the no-stocks-in-clusters (SIC=0) portfolios is −1.08, clearly worse than for the population as a whole. This is exactly the signal we need to separate the good portfolios from the SIC=0 portfolios.

At the next iteration, the best 16-stock portfolios are selected and 8-stock children are made from them. All 16-stock portfolios which lie outside the 99% confidence interval of the SIC=0 portfolio distribution are selected. The number of children to draw from each is determined by the histograms shown in FIG. 20.

Figure 20:
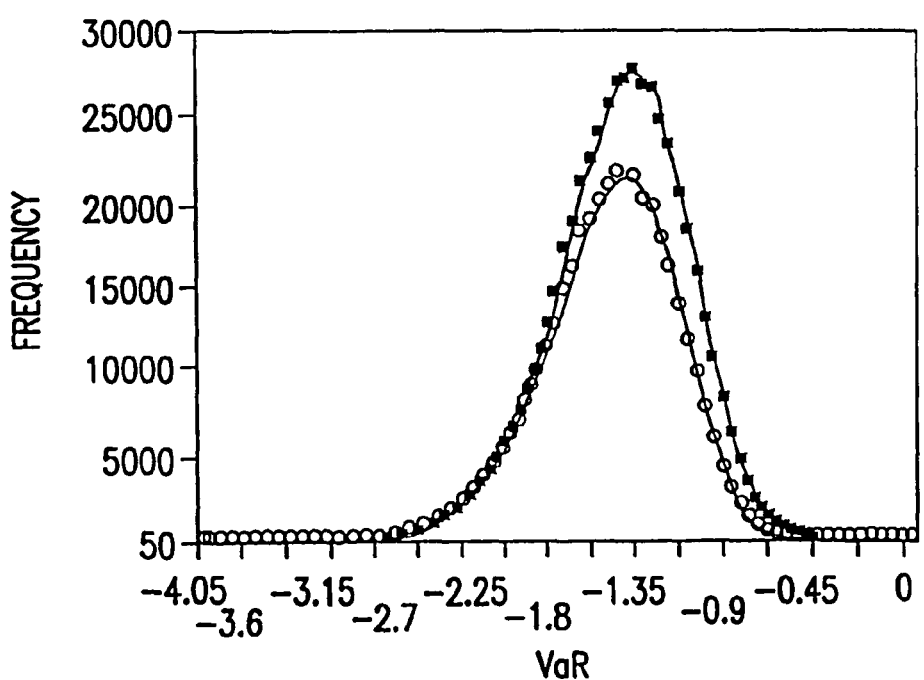
FIG. 20 displays the histograms that determine the number of children to draw from during execution of the method for evaluating and minimizing risk.

There are three features worth noticing in FIG. 20. First, the total number of portfolios that contain zero stocks in clusters has increased dramatically. This is because as you remove stocks, your chance of breaking up clusters increases exponentially. Second, the entire distribution has shifted to the left, meaning that the VaRs have gotten worse (mean −1.66). This is because their is value in diversity and diversity must decrease as portfolio size goes down. Third, the distribution of SIC=0 portfolios is still worse (mean=−1.72) than the distribution of all portfolios.

This third feature allows the modeler to determine the number of child portfolios necessary to ensure that some children still contain intact clusters. The number of children containing clusters is negatively binomially distributed as $$\begin{bmatrix} n \\ r \end{bmatrix} p^r (1-p)^{n-r}$$

where n is the number of children, r is the number of children that contain clusters, and p is the probability of randomly selecting a portfolio which is to the right of the 99% confidence interval of the SIC=0 histogram.

Using these facts, a preliminary model has been calibrated and successfully finds clusters on more than 95% of the runs.

The present invention also includes a method for portfolio modification. There are other methods to try to identify beneficial changes to a portfolio. Traditional VaR theory measures the effects of modifying (i.e. increasing or decreasing the holding) a position in one of the assets. As we have seen, if higher order combinations of assets are important then the effects of a single asset might be minor There is an important practical reason why traditional VaR focuses on the changes of only a single asset. If the portfolio is of size N and we consider changes involving m assets then on the order of $N^m$ stocks must be examines. Consequently, for practical reasons attention is usually restricted to m=1 or single asset changes.

Figure 21:
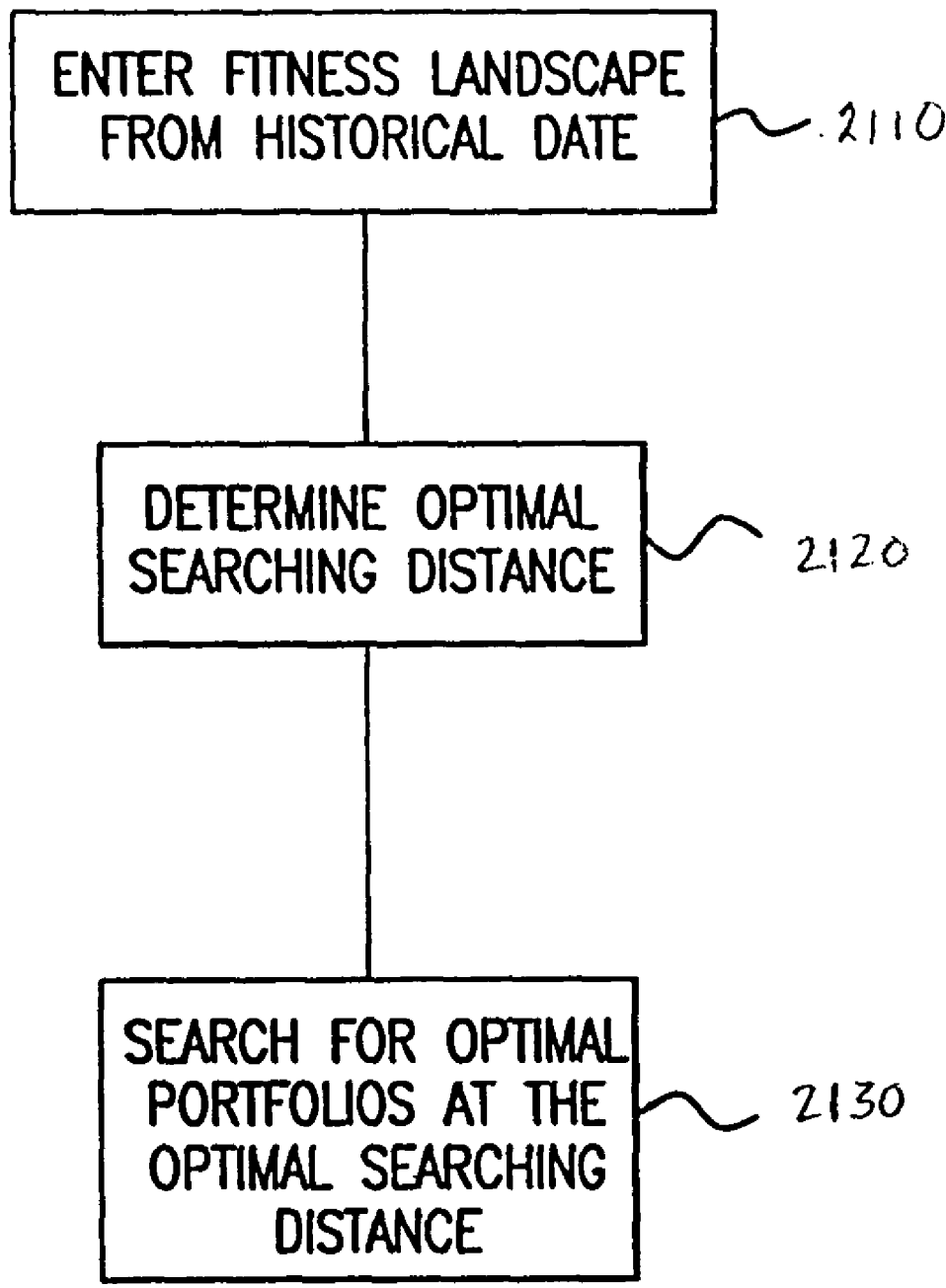
FIG. 21 displays a flowchart illustrating the method for portfolio modification.

In contrast, the present method determines the optimal number of assets to change while searching for an optimal portfolio. FIG. 21 displays a flowchart illustrating the method for portfolio modification. In step 2110, the method infers a fitness landscape from historical data. The landscape can be inferred from historical data as discussed above.

In step 2120, the method determines the optimal searching distance as described in co-pending international application No. PCT/US99/19916, titled, "A Method for Optimal Search on a Technology Landscape", filed Aug. 31, 1999,the contents of which are herein incorporated by reference. Once m is known, the method searches for optimal portfolios at the optimal searching distance in step 2130. For example, the method shown in FIG. 18 could be used to find an optimal portfolio after the method of FIG. 21 determines the optimal searching distance.

In this case, the landscape is defined over portfolios. The fitness is the VaR measurement of the portfolio and two portfolios are neighbors if they differ in the holding of a single asset. So for example a portfolio of five assets might be represented as [2, 1, 1, 3, 1] meaning that the portfolio consists of two units of asset one, one unit of assets two, three and five, and three units of asset four.

Portfolio Management—Optimization of Risk-Revenue

The present invention further includes additional techniques to optimize both risk and revenue for portfolio management. Portfolio optimization (management) normally includes two-fold problem, the control of risk which is usually associated with the volatility (and as it's recently understood with higher moments of the multivariate distribution of the return of the assets constituting the portfolio). This is a formidable problem and a variety of methods have been already proposed to treat it, mention for instance one-dimensional measures of risk in terms of the Value-at-risk (VAR). Also the problem of the so-called heavy tails has been discussed in the literature in order to manage higher order yet less probable risk.

Mathematically the problem is reduced to minimization of the variance and kurtosis of the weighted sum $$y = \sum_{i=1}^{n} \lambda_i x^i$$

of specified stocks under the wealth condition $$\sum_{i=1}^{n} \lambda_i = 1$$

In what we propose the problem posed is to first search for "good" families of stocks on the basis of all stocks available at the market. For instance a family of two stocks perfectly anticorrelated will simultaneously minimize variance as well as kurtosis (which defines the higher risk contribution) properly created from these stocks. Their image in the vector space of zero-mean deviations is and the angle is given by the correlation coefficient $$\rho_{ij} = \frac{cov(x_i x_j)}{\|x_i\| \cdot \|x_j\|}$$

with $\|x_i\|$ being the standard deviation, the norm in that space, and a vector $x_i = \{x_i^1, x_i^2, \ldots, x_i^m\}$ represents detrended time series of the stock "i".

By calculating the correlation matrix of the stock available at the market we can pick up the families consisting of a reference vector (stock) "a father" and strongly anticorrelated with it members "sons". These members could be statistically independent: $\rho_{ij}=0$ such that they are perpendicular to each other. Using standard window techniques robustness of the families is checked and most persistent members are chosen to constitute the basis from which optimal portfolios should be built. Minimization of the portfolio variance inside the family is achieved by means of standard procedure of linear programming or some other known technique. As a result, we have a set of "good" portfolios suitable to make search in order to optimize and expected return.

Given requirements for risk and return the techniques described allows to build up corresponding portfolios. The whole procedure is comprised of three phases:

Search for Good Families.

a) Creation of the correlation space, including shifted correlations.

b) Looking for "anticorrelated" families.

c) Checking robustness of the families.

Building Perspective Portfolios a) Creating two, three and four stock clusters with minimal variance.

b) Evaluating their risk

Optimization of Expected Return (Revenue) of a Portfolio Chosen from the Perspective Ones.

Figure 24:
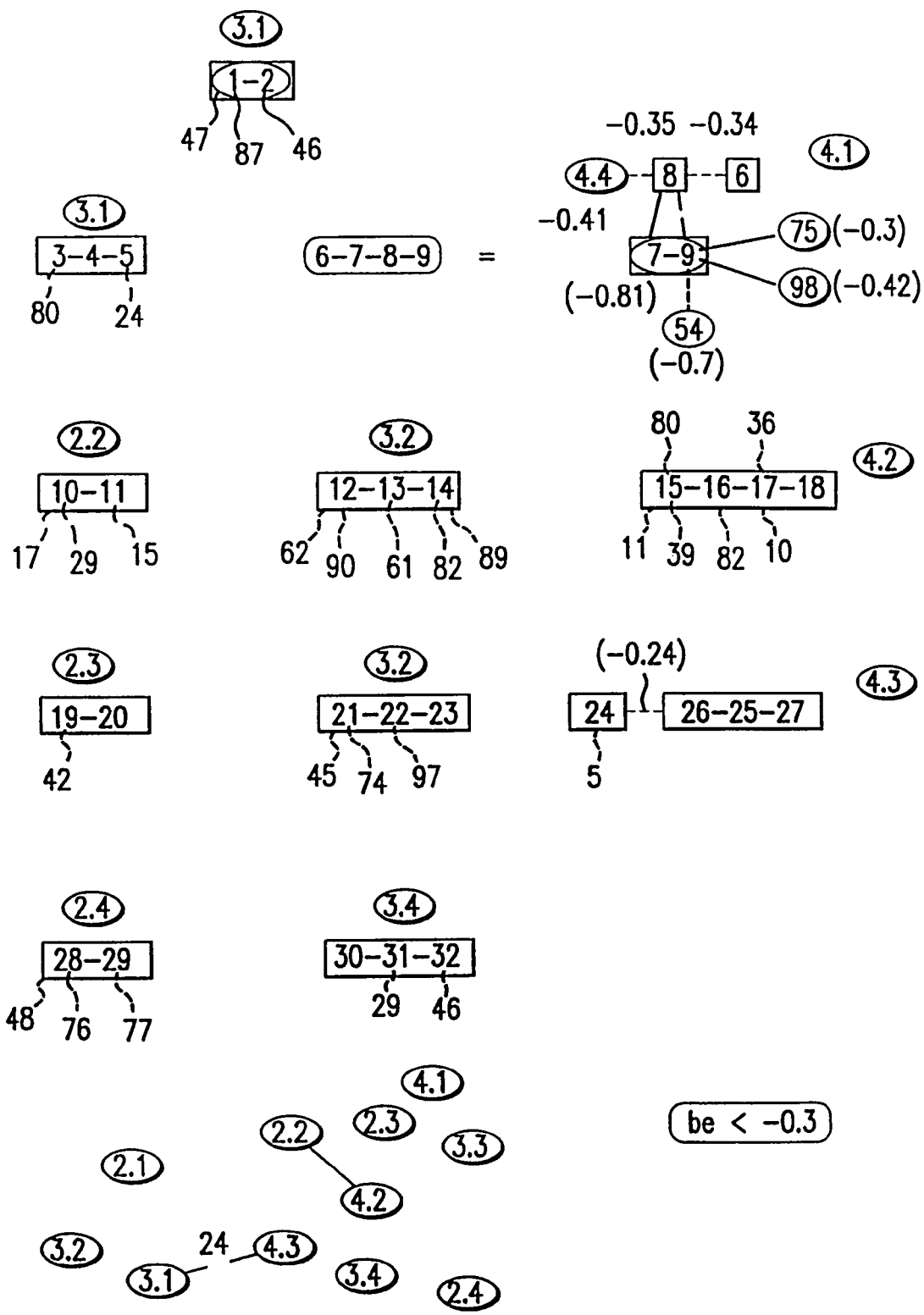
FIG. 24 displays a picture illustrating the anti-correlation relationship among family members that was generated by a method to create a portfolio of a plurality of assets with minimal risk.

The first most difficult part of the program has been checked on the samples consisting of 32 and 100 time series with intentionally created clusters in the first 32 of them. There were four 2-point clusters, four 3-point clusters, and three 4-point clusters comprising all the first 32 series. Applying the method described we identified all the clusters in the sample of 32 as well as in the sample of 100 series. Corresponding families are listed in FIG. 22, FIG. 23a and FIG. 23b for $$\rho_{ij} \leq -0.3$$

and on FIG. 24, where are also shown lesser couplings between the clusters and some other series. As far as the method is geometrical in character, identification of clusters for the both samples (32 and 100) only differs in time needed to build the correlation matrix, it is proportional to $n(n-1)/2$.

Portfolio Risk Management Using Multi-Gaussian Distributions

Portfolio Risk Management (PRM) is essentially based on the techniques applied to estimate probability of "bad events". For that one should know the corresponding probability distribution. During several years after Black and Scholes in finance business became widespread the VAR machinery which used Gaussian distribution, even though market data showed quite noticeable deviation from it. As a result, the so-called problem of fat tails arose along with a new fashion to treat it on the ground of Levy distribution (later on the truncated Levy distribution). Underline there is no evident reason to regard the latter the only possible cure. Moreover even its relation to the problem from the market point of view, has still remained foggy.

This invention addresses the problem by using a very well-known two-time scale formalism going back to Van der Paul and then Bogolubov and Mitropolskii.

In our case the method gives rise to the two-gaussian distribution (2-GD)

$$\rho_k(x) = \frac{n_1}{\sqrt{2\pi T_1}} e^{\frac{x^2}{2T_1}} + \frac{n_2}{\sqrt{2\pi T_2}} e^{\frac{x^2}{2T_2}} \qquad (1)$$

For the sake of simplicity we consider the symmetric distribution with zero mean and the normalization $$n_1 + n_2 = 1 \qquad (2)$$

$$n_1 T_1 + n_2 T_2 = 1 \qquad (3)$$

This approach allows us to represent market dynamics at a level of description intermediate between macroscopic modeling (one-factor models) and microscopic modeling (individual agent models or multi-factor models, general stochastic processes). Two-gaussian approach being the simplest exactly solvable model yet can catch certain specific features of the fat tails behavior. It describes two groups of investors acting at the market with different time scale behavior.

For comparison we are using the standard normalized distribution (the Black-Scholes approach)

$$g(x) = \frac{1}{\sqrt{2\pi}} e^{\frac{x^2}{2}} \qquad (4)$$

that implies the variance is measured in units of the σ. Let us consider the probability, sometimes called VAR, of negative deviations larger than a specified value "a"

$$P(x \leq -a) = \int_{-\infty}^{-a} \rho(x) dx \qquad (5)$$

and the difference $$\delta P_r(x \leq a) = \int_{-\infty}^{-a} \delta\rho(x) dx \equiv \int_{-\infty}^{-a} \rho_k(x) - g(x) dx \qquad (6)$$

Since the first two moments are same for the both distributions the difference is proportional to the kurtosis of 2-GD (1):

(7)

$$\delta P_r(x \leq a) \propto K = \frac{\langle x^4 \rangle}{\langle x^2 \rangle^2} - 3 = 3 n_1 n_2 (T_2 - T_1)^2$$

It can be shown that under conditions (2) and (3) the difference while expanding in the series over moments is (8)

$$\delta P_L \approx \frac{1}{\sqrt{2\pi}} e^{\frac{x^2}{2}} \frac{K}{24} (x^3 - 3x) + O(\langle x^6 \rangle)$$

This difference can be incorporated by the so-called implied volatility (variance) through considering the effective (implied) gaussian process $$g(x) = \frac{1}{\sqrt{2\pi\sigma_{im}}} e^{\frac{x^2}{2\sigma_{im}}}$$

where $\sigma_{im} = 1 + \delta\sigma$ is the implied variance:

$$\sigma_{im} = 1 + \frac{1}{24} K(a^2 - 3) \qquad (9)$$

In order to check out formula (8) we calculated δP by using the exact distribution (1) and (8) with the kurtosis given by (7). The approximate formula using implied volatility gives sufficiently good qualitative description and for certain values of K and "a" even quantitative one. But there is the region of a's where the approximate formula (8) along with the notion of implied volatility (9) works bad. Since the 2-GD is a very simple model containing enough parameters to fit the market data it can be used as an exact tool to calculate the "fat tail VAR". Moreover as far as pricing formulas for all the derivatives available at the market linearly depend on the distribution function the model (1) is exact solvable in the sense that all results are straightforward. For instance the option pricing formula is $$c = e^{-r(T-t)} \int_x^\infty (S_T - X) g(S_T) dS_T = SN(d_1) - Xe^{-r(T-t)} N(d_2)$$

where S is the current (stock) price of the underlying asset, $S_T$ is the maturity asset price and X is the strike (exercise) price. We see that the price is linear (proportional) over the distribution density and in the case of two gaussians it will contain four terms with the cumulative gaussian functions N(d) instead of two:

$$c = e^{-r(T-t)} \int_x^\infty (S_T - X)\, [n_1 g(T_1; S_T) + n_2 g(T_2; S_T)]\, dS_T +$$
$$n_2 N(T_2; d_2)]$$
$$= S[n_1 N(T_1; d_1) + n_2 N(T_2; d_1)] - X e^{-r(T-t)} [n_1 N(T_1; d_2)]$$

To make the model less restrictive one can consider three (and even more) gaussian distributions $$g_m(n_i, T_i) = \sum_{i=1}^m n_i g(1, T_i)$$

with the normalization conditions $\Sigma n_i = 1$ $\Sigma n_i T_i = 1$ $\Sigma n_i T_i^2 = 1$ such that the difference $$\delta P_m^r = \int_{-\infty}^{-a} [g_m(n_i, T_i) - g(1)]\, dx$$

can be made proportional to any specified moment.

Finally we give the next term in the expansion (8):

$$\delta P = \frac{e^{\frac{x^2}{2}}}{\sqrt{2\pi}} \frac{x}{24} \left[ K(x^2 - 3) + \frac{\langle \delta x^6 \rangle}{2}(15 - 10x^2 + x^4) \right]$$

with $\langle \delta x^6 \rangle = n_2(T_2^2 - T_1^2)(T_2 - 1) + K/3$ for the 2-GD.

Infrastructure Design

As explained throughout this application above, several new developments in the sciences of complexity, bear on an analysis of infrastructure robustness, and in particular on the probability of avalanching cascades of failures and means to achieve robust adaptive performance to avoid such "glitch" propagation. The present invention makes use of the following areas:

As previously discussed, there is a general phase transition for hard to solve problems, ranging from job shop scheduling problems to military operations and their logistic support, to the functional fragility of interconnected nodes and flows in many infrastructures settings. The phase transition is a sudden shift from a robust, reliable regime to a fragile regime as one tunes the attempt to achieve ever-higher efficiency on one or more "figures of merit". The general finding is that the insistence on too much efficiency removes redundancy from the system in question. In turn, this reduction in redundancy increases the conflicting constraints present in the operational system. In turn, at some point, this increase in conflicting constraints converts the problem from one that is easily solved, and robustly able to handle component failures by finding alternative neighboring solutions, to a system that is efficient but highly fragile, and in which finding solutions is very hard. In this latter case, failure at any point is likely to unleash very large cascading avalanches of propagating failure. This general phase transition has been confirmed in problems ranging from job shop problems to flow shop problems, to supply chain problems. An organization's flow shop could be on the wrong, fragile side of the phase transition. It is important to stress that, because there is a phase transition, the present invention can determine how much redundancy or added capacity needs to be added to be on the safe side of the phase transition, while addition of further capacity is of no real use. These operations management techniques have been described throughout this application above.

Underlying these phase transitions is the concept of a technology graph, and its use as a mathematical analytic framework to examine, in one mathematical space, product and process design or operations—whether of a commercial project or of military logistics, or for infrastructures problems. The technology graph enables the present invention to identify robust means to achieve specific logistic or functional goals, yet degrade gracefully to neighboring goals or tasks if need be.

For any given logistics, supply chain, or infrastructure problem, there are typically optimal pathways to carry out the desired task(s), and typically there are nearby pathways that are almost as good as the optimal pathway. The present invention, as discussed above, utilizes utilizing reinforcement learning, ant algorithms, and external dynamics—the latter invented by Dr. Per Bak—to find such families of nearby pathways to performance. The fact that these approaches find not only the optimal pathway, but also neighboring pathways indicates that they are complementary methodologies to find robust adaptive means of operations that will prevent avalanches of failures from propagating throughout the system, and will afford rapid recovery via neighboring adequate pathways. Techniques for finding optimal pathways using reinforcement learning and ant algorithms are described in detail above.

A cousin of the above procedures is operational risk management, which was also described in detail above. Here, the aim is to understand the cascading coupled risk factors due to the non-linear couplings between different parts of a system. It is just such coupled risk factors, which are likely to give way successively in the avalanches of failure mentioned above. Thus, operational risk management is again a companion procedure to identify means to achieve robust reliable operational modes.

In addition to the above, the present invention further includes means to analyze functionally coupled systems ranging from economic webs of complements and substitutes, to functionally coupled components in supply chains and elsewhere that should be applicable in infrastructure problems. The core ideas rest on descriptions of objects and operations in terms of their functional requirements, matching those requirements with other objects or operations, and building up functional wholes. Given the notion that neighboring objects or operations carry out similar tasks, it then becomes possible to utilize such models together with operational risk management to study the capacity for alternative members of a family of objects or operations to take over the role of a given object or operation that may have failed, hence to analyze the capacity of the functioning system to behave in a fault tolerant, robustly adaptive fashion. Techniques for synthesizing economic web are described in "A System and Method for the Synthesis of an Economic Web and the Identification of New Market Niches", U.S. application Ser. No. 09/080,040, the contents of which are herein incorporated by reference. FIG. 25 shows a flow diagram of an exemplary method 2500 that uses the determination of redundant pathways in a technology graph with techniques for operation risk management to design an infrastructure that is reliable and adaptive. In step 2510, the method 2500 determines one or more relations among a plurality of resources. The relations include complement and substitute relations. The resources comprises raw materials, intermediate products and operations. In step 2520, the method 2500 constructs a graph representation of the relations and the resources. In step 2530, the method 2500 determines one or more paths though the graph. Each of these paths represents a process for performing a task, such as manufacturing a finished product. In step 2540, the method 2500 determines a group of the resources lying along these paths that have a minimal risk using operational risk management techniques described above.

In summary, the present invention includes a number of novel related conceptual, algorithmic, mathematical, and software tools that can be combined to diagnose the capacity of a system to function in a fault tolerant way that is robustly adaptable, and also to design new, or modify existing systems to achieve such fault tolerant adaptive behavior.

Figure 26:
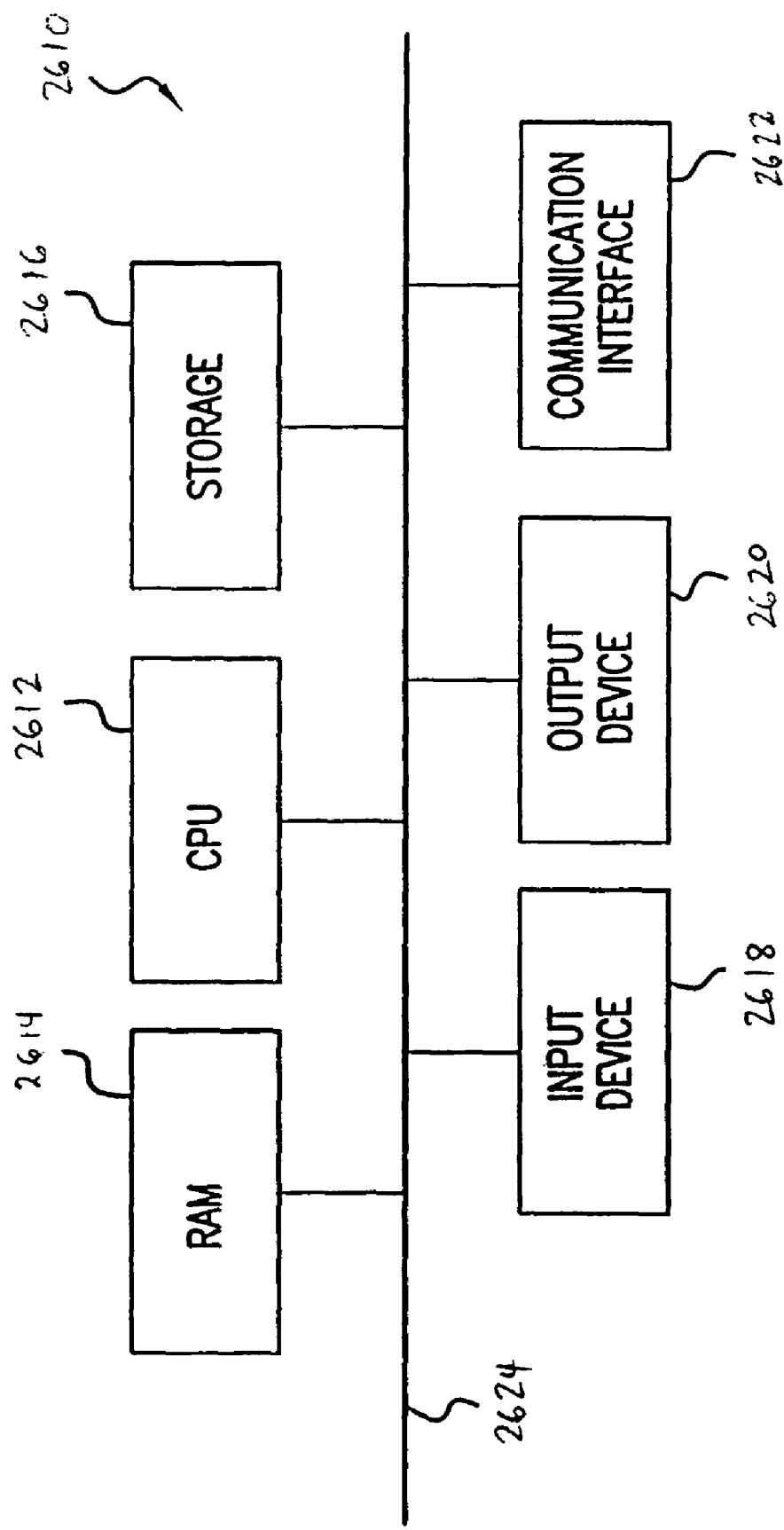
FIG. 26 discloses a representative computer system 2610 in conjunction with which the embodiments of the present invention may be implemented.

FIG. 26 discloses a representative computer system 2610 in conjunction with which the embodiments of the present invention may be implemented. Computer system 2610 may be a personal computer, workstation, or a larger system such as a minicomputer. However, one skilled in the art of computer systems will understand that the present invention is not limited to a particular class or model of computer.

As shown in FIG. 26, representative computer system 2610 includes a central processing unit (CPU) 2612, a memory unit 2614, one or more storage devices 2616, an input device 2618, an output device 2620, and communication interface 2622. A system bus 2624 is provided for communications between these elements. Computer system 2610 may additionally function through use of an operating system such as Windows, DOS, or UNIX. However, one skilled in the art of computer systems will understand that the present invention is not limited to a particular configuration or operating system.

Storage devices 2616 may illustratively include one or more floppy or hard disk drives, CD-ROMs, DVDs, or tapes. Input device 2618 comprises a keyboard, mouse, microphone, or other similar device. Output device 2620 is a computer monitor or any other known computer output device. Communication interface 2622 may be a modem, a network interface, or other connection to external electronic devices, such as a serial or parallel port.

While the above invention has been described with reference to certain preferred embodiments, the scope of the present invention is not limited to these embodiments. One skill in the art may find variations of these preferred embodiments which, nevertheless, fall within the spirit of the present invention, whose scope is defined by the claims set forth below.

The invention claimed is:

1. A method for designing an infrastructure to perform one or more tasks in an environment of resources comprising the steps of: determining one or more relations among the resources; constructing a graph representation of said relations and the resources; determining one or more paths through said graph representation wherein each of said paths represents a process for performing at least one of the tasks; determining at least one group of those of said resources that lie along said one or more paths, said at least one group having a minimal risk; determining a plurality of anti-correlated families wherein each of said anti-correlated families contains two or more of said resources lying along said one or more paths that are anti-correlated; and determining one or more perspective groups of said resources from said plurality of anti-correlated families.

2. A method for designing an infrastructure as in claim 1 wherein the one or more tasks comprise producing one or more products.

3. A method for designing an infrastructure as in claim 1 wherein the resources comprise at least one of the following: one or more raw materials, one or more intermediate products, and one or more operations.

4. A method for designing an infrastructure as in claim 1 wherein the relations comprise at least one of the following: one or more compliments, and one or more substitutes.

5. A method for designing an infrastructure as in claim 1 wherein said graph representation comprises a set of vertices corresponding to the resources and a set of edges corresponding to the relations.

6. A method for designing an infrastructure as in claim 1 further comprising the step of: receiving one or more time series corresponding to one or more of said groups of resources.

7. A method for designing an infrastructure as in claim 6 further comprising the step of: determining correlations among said resources.

8. A method for designing an infrastructure as in claim 7 wherein said determining a plurality of anti-correlated families step comprises the steps of: selecting at least one of said resources to be a first member of one of said anti-correlated families; determining one or more of said resources having a value of said correlation with said first member of said anti-correlated family that is less than a negative limit; and including said one or more resources having a correlation value that is less than the limit as additional members in said anti-correlated family.

9. A method for designing an infrastructure as in claim 8 further comprising the step of repeating said steps of claim 8 for another one of said plurality of resources to determine another of said plurality of anti-correlated families.

10. A method for designing an infrastructure as in claim 9 further comprising the step of: eliminating drift from said one or more time series to create corresponding one or more detrended time series.

11. A method for designing an infrastructure as in claim 10 wherein said correlations among said resources is determined from said one or more time series.

12. A method for designing an infrastructure as in claim 11 wherein said correlations are shifted in time.

13. A method for designing an infrastructure as in claim 12 wherein said determining one or more perspective groups step comprises the step of selecting one of said plurality of anti-correlated families; and determining percentages of said resources from said selected family to include in one of said perspective groups.

14. A method for designing an infrastructure as in claim 13 further comprising the steps of repeating said selecting step and said determining a percentage of each of said assets step with different ones of said anti-correlated families to determine said one or more perspective groups.

15. A method for designing an infrastructure as in claim 14 wherein said percentages of said resources from said selected family are determined from said perspective group with a minimal variance.

16. A method for designing an infrastructure as in claim 15 further comprising the step of choosing at least one of said perspective portfolios as said portfolios of assets.

17. A programmed computer system for designing an infrastructure to perform one or more tasks in an environment of resources comprising at least one memory having at least one region storing computer executable program code and at least one processor for executing the program code stored in said memory, wherein the program code includes code to determine one or more relations among the resources; code to construct a graph representation of said relations and the resources; code to determine one or more paths through said graph representation wherein each of said paths represents a process for performing at least one of the tasks; code to determine at least one group of those of said resources that lie along said one or more paths, said at least one group having a minimal risk; code to determine a plurality of anti-correlated families wherein each of said anti-correlated families contains two or more of said resources lying along said one or more paths that are anti-correlated; and code to determine one or more perspective groups of said resources from said plurality of anti-correlated families.

18. A computer program product for designing an infrastructure to perform one or more tasks in an environment of resources, the computer program product comprising a computer-readable storage medium having computer-readable program code stored therein, the computer program product being in operable communication with a remote kiosk, the computer-readable program code comprising:

an executable portion for determining one or more relations among the resources; said executable portion constructing a graph representation of the relations and the resources; said executable portion determining one or more paths through the graph representation wherein each of the paths represents a process for performing at least one of the tasks; and said executable portion determining at least one group of those of the resources that lie along the one or more paths, the at least one group having a minimal risk; said executable portion determines a plurality of anti-correlated families wherein each of the anti-correlated families contains two or more of the resources lying along the one or more paths that are anti-correlated; and said executable portion determines one or more perspective groups of the resources from the plurality of anti-correlated families.

* * * * *